United States Patent [19]

Rose et al.

[11] Patent Number: 5,297,203
[45] Date of Patent: Mar. 22, 1994

[54] DIGITAL CORDLESS TELEPHONE APPARATUS

[75] Inventors: Chris Rose, Vancouver; Charley Heung, Richmond, both of Canada

[73] Assignee: Video Technology Engineering, Ltd., Tai Po, Hong Kong

[21] Appl. No.: 1,026

[22] Filed: Jan. 6, 1993

Related U.S. Application Data

[62] Division of Ser. No. 707,324, May 29, 1991.

[51] Int. Cl.$^5$ .................. H04M 11/06; H04K 1/00
[52] U.S. Cl. .......................... 380/9; 380/23; 379/62; 379/61; 370/111
[58] Field of Search .......... 370/110.1, 111, 118; 379/61, 62, 63; 375/5, 104; 380/9, 23

[56] References Cited

U.S. PATENT DOCUMENTS

| | | | |
|---|---|---|---|
| 4,663,765 | 5/1987 | Sutphin et al. | 375/5 |
| 4,813,040 | 3/1989 | Futato | 370/110.1 |
| 4,939,785 | 7/1990 | Murata et al. | 455/54 |
| 4,972,510 | 11/1990 | Guizerix et al. | 375/5 |

FOREIGN PATENT DOCUMENTS

| | | |
|---|---|---|
| 0131919 | 1/1985 | European Pat. Off. ............ 379/62 |
| 0182762 | 5/1986 | European Pat. Off. . |
| 0318911 | 6/1989 | European Pat. Off. . |
| 0171240 | 8/1986 | Japan . |
| 0219730 | 9/1987 | Japan . |
| 2217151 | 10/1989 | United Kingdom . |

*Primary Examiner*—Jin F. Ng
*Assistant Examiner*—Dwayne D. Bost
*Attorney, Agent, or Firm*—Dick and Harris

[57] ABSTRACT

A digital cordless telephone apparatus comprising a microprocessor based battery powered portable handset unit and a microprocessor based stationary base unit which each transmit and receive digital voice data and digital command data to and from one another over multiple RF channel frequencies in the 902-928 MHz band, is disclosed. The user's voice is digitized, scrambled and modulated for transmission and upon reception, the modulated digital voice data signal is demodulated, descrambled and decoded. A command data - voice data interface inserts command data packets into the stream of digital voice data prior to transmission and locates and captures command data packets from the incoming stream of received digital data. A silence sequence replaces the captured command data packet such that no audible sound is heard by the user. A link check command signal is also periodically transmitted by the base unit and acknowledged by the handset unit to evaluate the quality of the RF link toward triggering an automatic channel change or signaling an out-of-range condition.

6 Claims, 68 Drawing Sheets

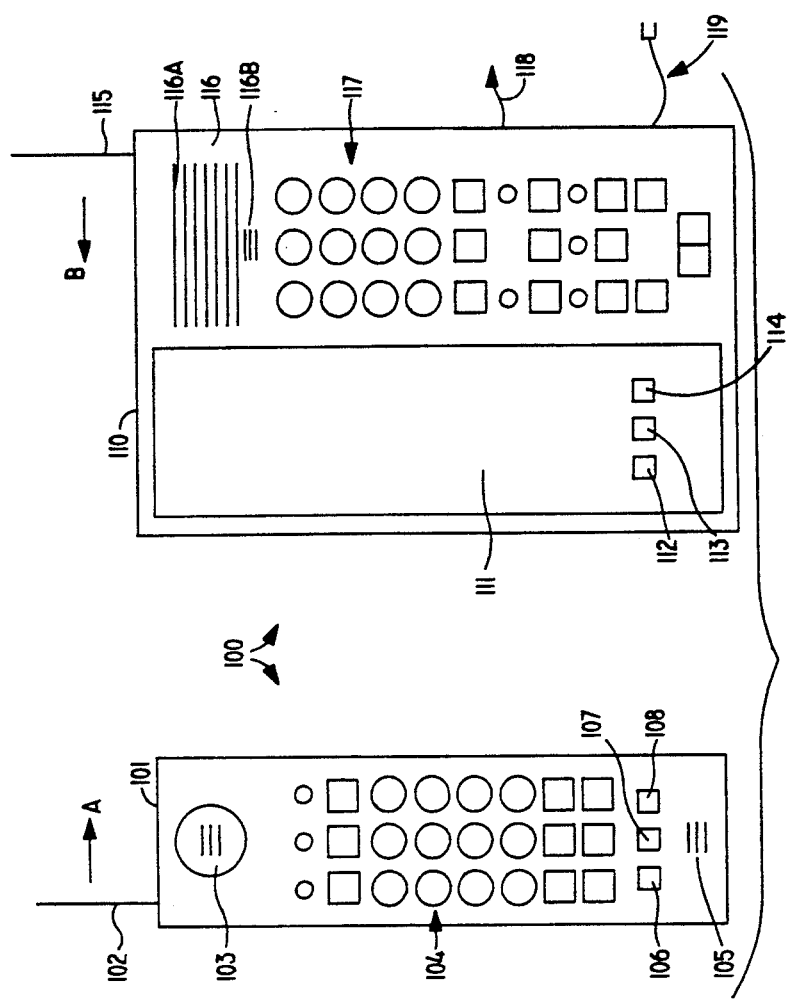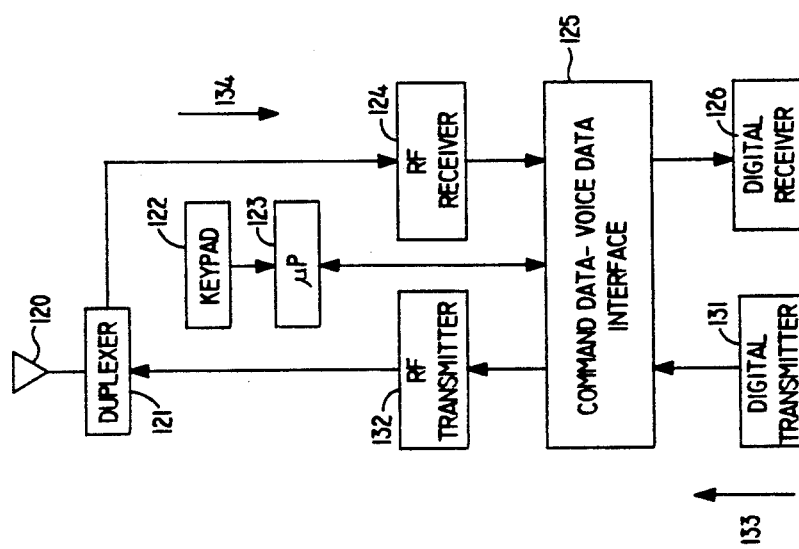

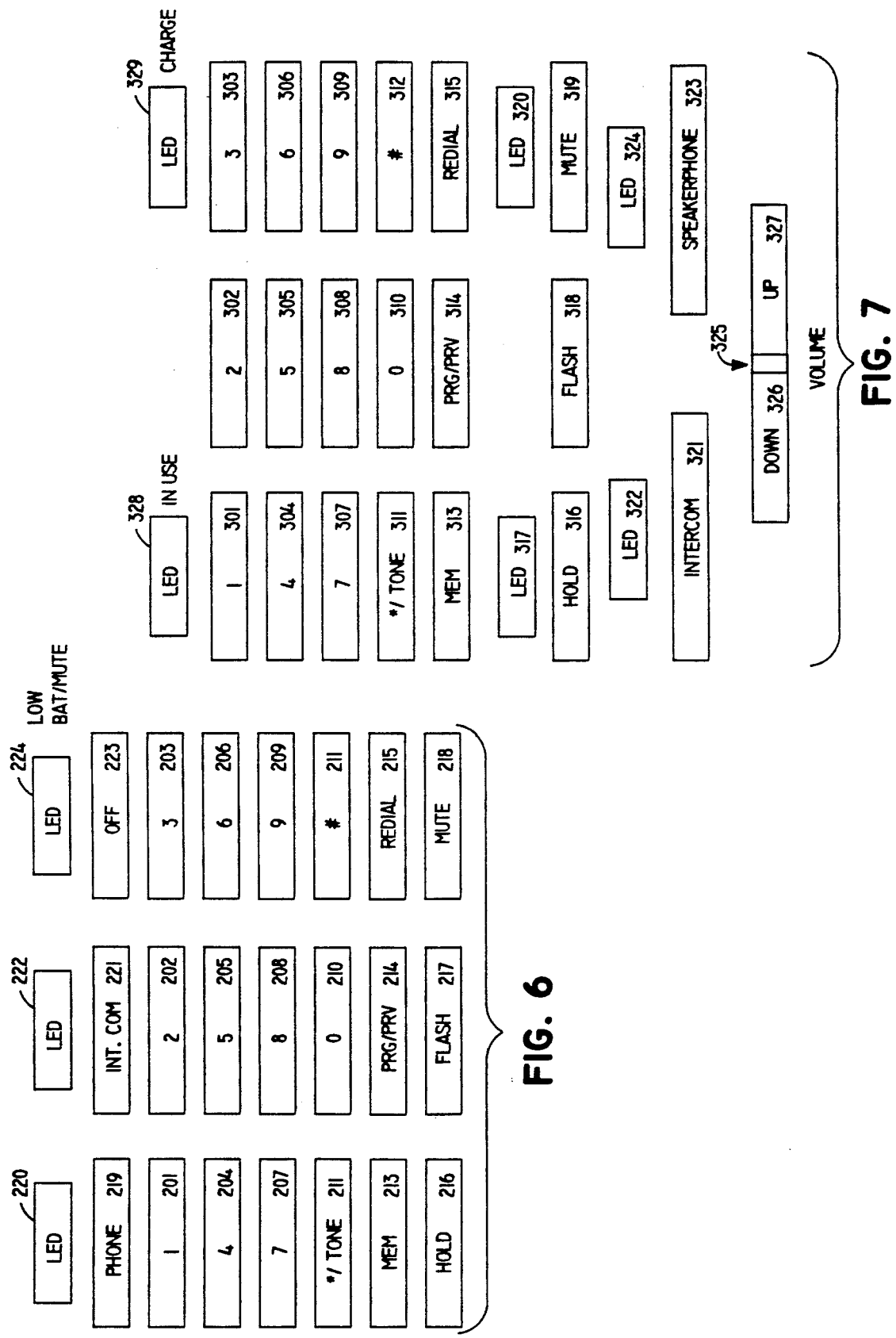

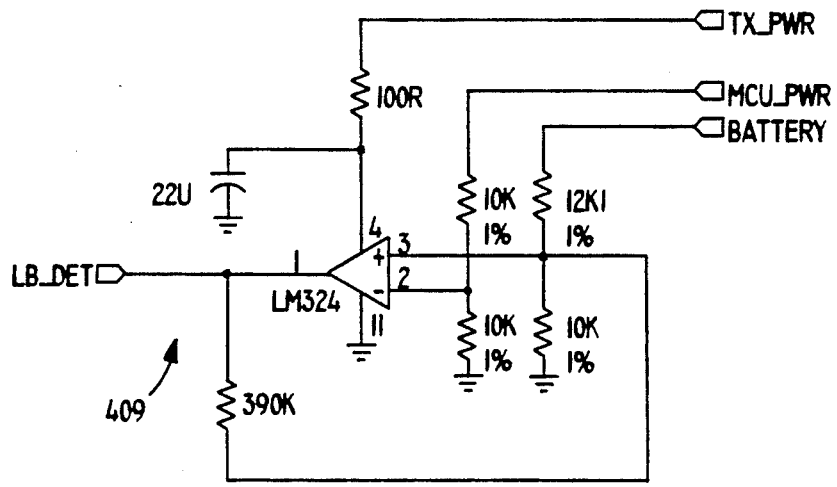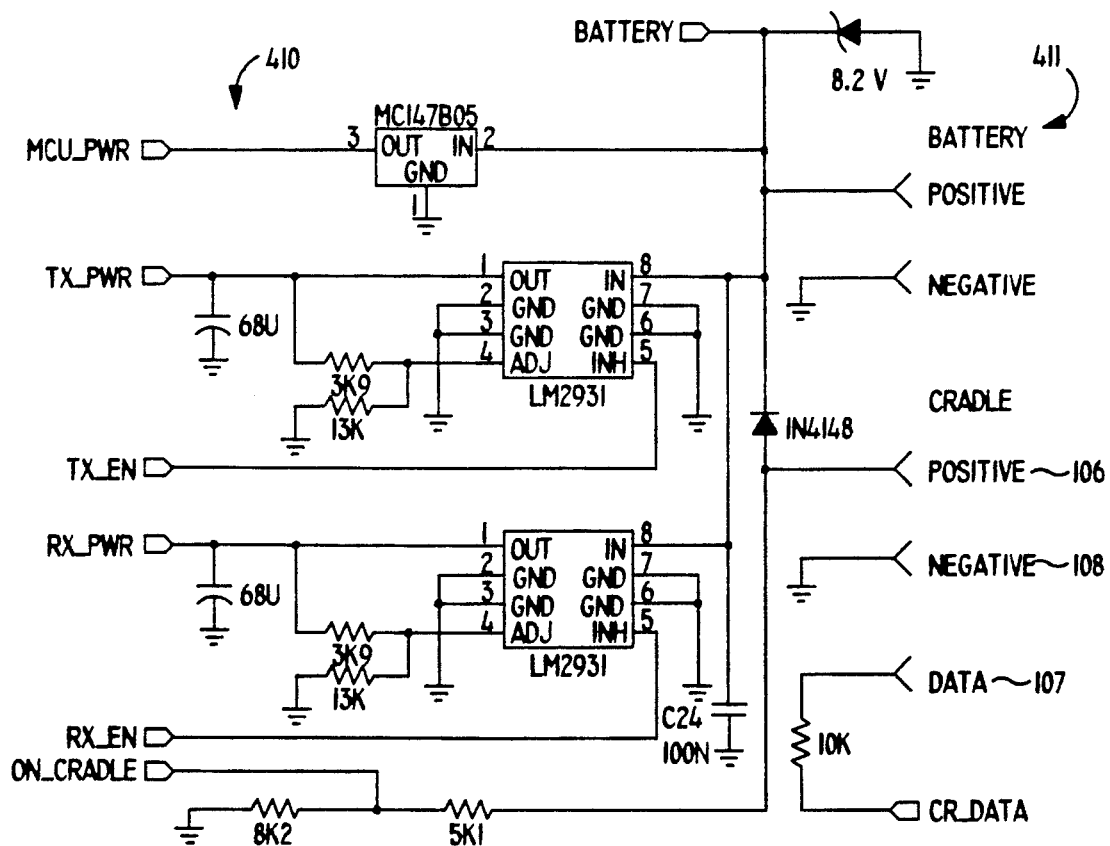
FIG. 10b

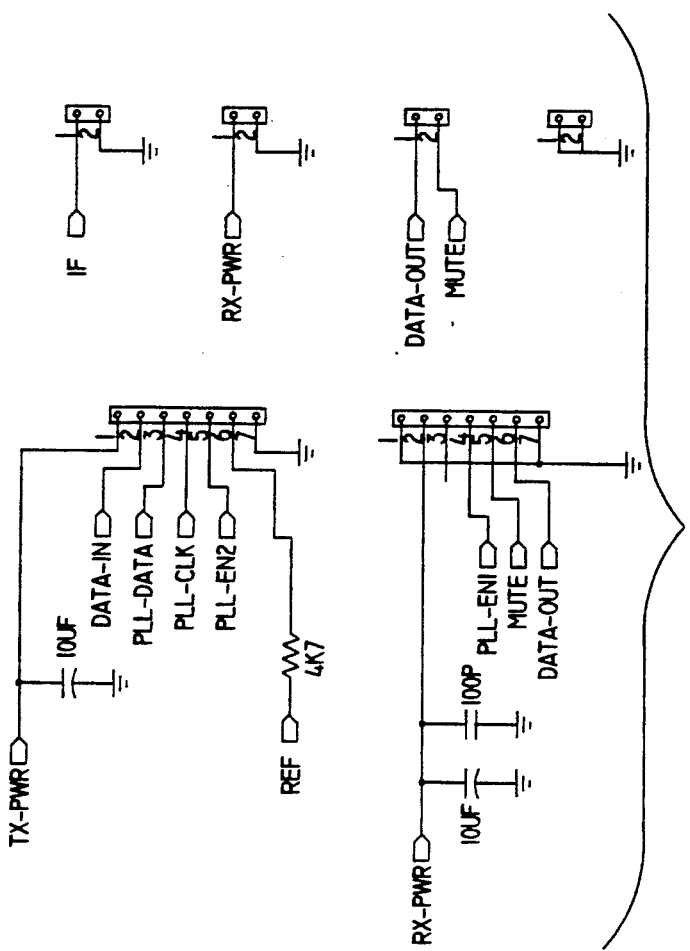
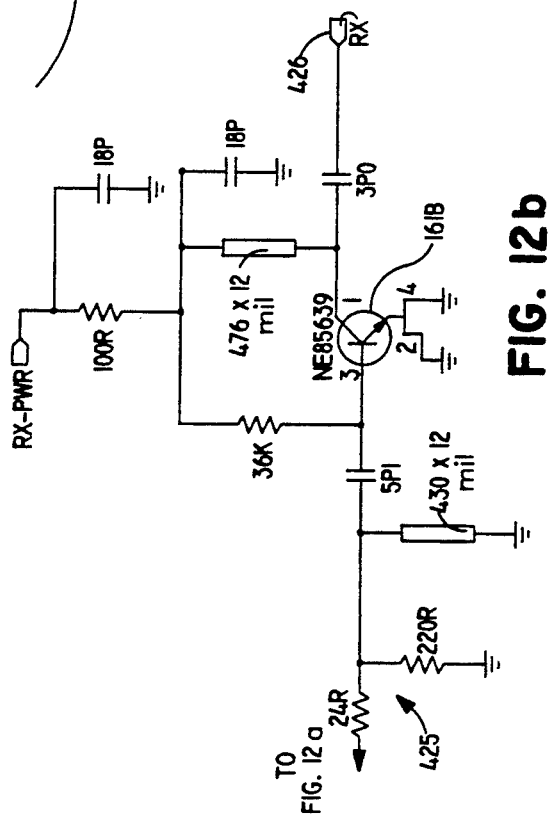
FIG. 12c
FIG. 12b

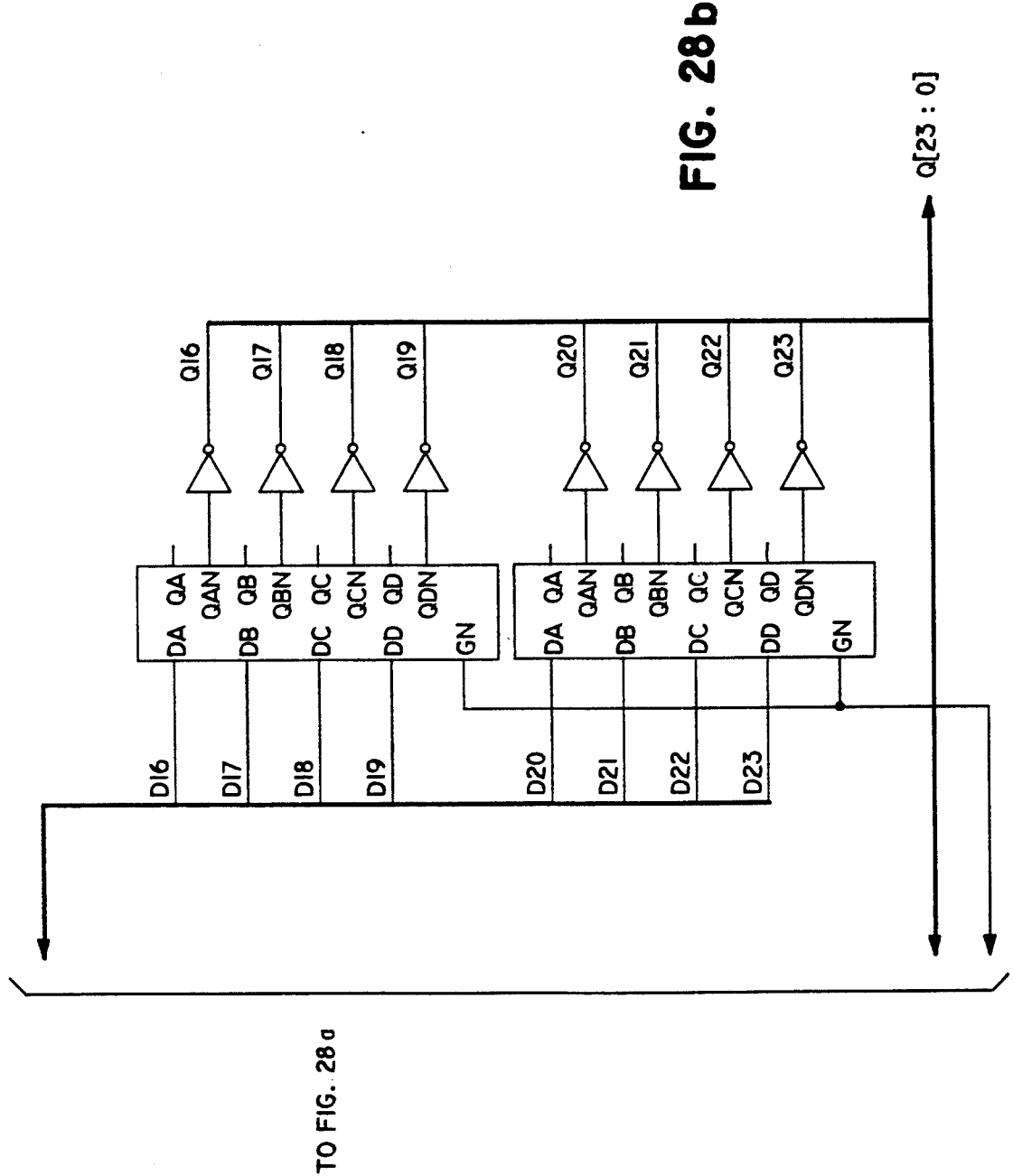

DIGITAL CORDLESS TELEPHONE APPARATUS

This is a division of application No. 07/707,324 filed on May 29, 1991.

BACKGROUND OF THE INVENTION

The present invention relates generally to the transmission and reception of a telephone signal between a remote battery powered cordless handset unit and fixed hard wired base unit, and in particular, to a microprocessor based digital cordless telephone apparatus capable of transmitting both digitized voice data and digitized command data between a hand unit and a base unit. In the present cordless digital telephone apparatus the handset and base unit communicate with one another using FSK modulated digital signals transmitted on an RF carrier in the 902-928 MHz band.

The function of the conventional prior art cordless telephone is to provide the user with the ability to freely move about while speaking on the telephone without the hindrance of being "tied" down by the coiled cord connecting the handset to the conventional telephone set. The typical prior art cordless telephone comprises a base unit which is physically connected to the user's telephone company lines and a hand-held handset unit. The physical hard wire connection between the conventional handset and telephone set is replaced by an radio frequency (RF) link, usually in the 46 and 49 MHz bands. The spoken voice is usually communicated between the base and handset by first converting the user's voice into an analog electrical signal and modulating the signal using an RF carrier for radio transmission to the receiver, typically through the use of a Narrow-Band Frequency Modulation (NBFM) technique. At the receiver the modulated analog voice signal is demodulated and directed to a speaker through which the voice is heard. The various command functions which must be communicated between the handset and the base are instead communicated in the digital format. To accommodate both formats of data the digital command signal is usually modulated as either a 600 Hz or 1 kHz square wave and transmitted as an "in-band" signal on top of the analog voice signal.

One shortcoming of the in-band transmission of digital command data is that the command data is part of the voice data signal and thus is inherently audible to the user when the analog voice signal is demodulated and listened to. Moreover, the command data in addition to being audible to the user is also transmitted very slowly precluding implementation of channel monitoring. Another limitation inherent in transmitting an analog voice signal using the NBFM technique is the often occurring static, interference and otherwise poor reception which accompanies the transmission and reception of the analog voice signal. While some recent cordless telephone designs have sought to include "enhanced" circuitry to improve the transmission and reception of the analog voice, hoping to obtain a "corded" sound quality, many are still subject to troublesome static and interference.

One way in which the prior art has attempted to overcome static and interference has been by providing the user with the ability to select among several different RF channel frequencies in hopes of finding a "clearer" RF link. While the ability to change channels is useful, prior art devices require that channel changing be done manually by the user who must elect to change channel based upon how much interference he or she perceives. Should the interference be in the transmission from the handset only, it will usually not be heard by the handset user, but may be very annoying to the party at the other end of the line.

When a handset is transmitting command data to a base, such as when the user accesses an outgoing line and dials a telephone number, it is essential that the base receive the complete command if the cordless telephone is to operate as intended. Static and interference in the RF link may obscure the flow of command data and cause the complete command data not to be received. The user will learn of the missing or lost command data only as a result of the device's failure to respond to the user's command request or the execution of an unintended command.

Moreover, while virtually every RF communication device has a physical range limitation beyond which a transmitter and receiver cannot communicate with one another, the implication of this limitation represents a significant shortcoming in the operation of a cordless telephone. For example, when the handset is physically located at the outer edge of the communication range the received signal is often weak and interference from other signals may result in intermittent loss of the RF link when a conversation is in progress In addition, when the handset unit is in a "standby mode" awaiting receipt of an incoming telephone call and the user moves out of range from the base unit, the user is unable to receive an incoming telephone call from the base unit and more importantly is totally unaware of being out of range unless an attempt is made to use the handset at which time the out of range condition would be discovered due to the inability to establish communication with the base unit When the prior art handset unit is in a standby mode it must nevertheless be able to receive an incoming call from the base unit and accordingly at least the receiver circuits of the handset must remain energized. The need to maintain power to the receiver as well as other portions of the handset, even when in a standby mode, places a continuing power drain on the handset batteries and will ultimately serve to deplete the handset battery charge necessitating that the handset be returned to the base unit for recharging even if no telephone conversations have been made or received.

Accordingly, the present invention seeks to address the foregoing limitations of the prior art cordless telephone by providing a cordless telephone apparatus which comprises a base unit and handset unit which each transmit and receive digitized voice signals toward providing true noise free conversations with significantly greater immunity to static and interference, and with increased range.

Another object of the present invention is to provide for the combined communication of digitized voice signals and digital command signals toward the wireless transmission and reception of such signals on an RF band of 902-928 MHz taking advantage of revised FCC regulations which have allocated portions of this band for just such an application.

Moreover, the present invention seeks to provide for the seamless intermixing of digital command data into the stream of digital voice data flowing between the base unit and the handset.

It is an associated object of the present invention to provide a means by which transmitted digital command data is received and captured by the receiving unit from the stream of incoming digital data and replaced with a quiet sequence so as to prevent the command data from causing an otherwise undesirable audible sound to be heard by the user.

It is a still further object of the present invention to implement a command data protocol incorporating positive acknowledgment with retransmission technology in order to insure that each transmitted command is acknowledged when received and if lost or damaged is repeated until acknowledged all before further commands are transmitted.

It is yet another object of the present invention to provide a command data protocol which incorporates a randomly generated security code which prevents an unintended person from gaining access to the user's telephone line and placing unauthorized telephone calls.

It is additionally an object of the present invention to provide for the selection and changing of RF channel frequencies without intervention by the user in response to the automatic detection of interference in the RF link or a total loss of the RF link.

Another object of the present invention is to provide twenty frequency channels for operation of the handset at operating frequencies of 925.5 to 927.4 MHz and twenty paired frequency channels for operation of the base unit where such channels are paired in a manner which permits rapid channel scanning.

It is yet a further object of the present digital cordless telephone apparatus to provide for the transmission of a link check command signal by the base unit and the acknowledgment of receipt by the handset unit in order to continually monitor the viability and existence o the RF link while a call is in progress as well as to detect an out of range condition toward signaling the user at the handset of the inability to make or receive a telephone call.

Yet another object of the present invention is to provide a means by which the handset and base unit can communicate data between one another through a physical connection when the handset unit is in its storage cradle within the baseset unit, thereby precluding the need to modulate the recharge power source as a way of establishing communication between the handset and the base unit when in storage.

It is yet a further object of the present invention to provide a power saving mode wherein the handset unit automatically powers down when a call is not in progress and periodically automatically awakens to check for the presence of an incoming call, incoming link check command signals or the actuation by the user of the keypad, thereby serving to extend handset battery life.

An additional object of the present invention is to provide for the scrambling of the digital voice signal prior to transmission and for the unscrambling of the digital voice signal upon reception in order to minimize the possibility that the telephone conversation may be monitored by unintended persons listening to the RF channel frequency.

These and other objects of the invention will become apparent in light of the present specification and drawings.

SUMMARY OF THE INVENTION

The present invention includes a microprocessor based transportable battery powered handset unit and a microprocessor based stationary base unit which cooperate with one another and together comprise a digital cordless telephone apparatus. The handset unit provided is a cordless battery powered hand-held instrument which incorporates a numeric telephone dial pad as well as other function keys and light emitting diode status indicator.

The base unit provided is intended to be located in a fixed position, connected to an external source of electrical power and hard wire connected to the user's telephone company lines via the conventional telephone jack present in most households and businesses. The base unit includes a handset storage cradle for storing the handset unit. While in its storage cradle, two pairs of metallic contacts located respectively on the handset face and within the storage cradle contact one another to provide power to the handset for recharging its internal batteries and a third contact provides a physical data link between the handset unit and base unit. A speakerphone and telephone dial pad are provided in the base unit to enable one to make and receive telephone calls from the base unit, as well as to permit an intercom communication between the base unit and handset unit to take place.

The handset unit and the base unit are each microprocessor based devices which incorporate computer software routines which govern the operation of various operations of the apparatus and execute the various command functions which the user may initiate during operation of the apparatus.

The base unit and handset unit communicate with one another via a radio frequency (RF) link which is established between the two units thereby permitting the handset unit to make and receive telephone calls to and from the telephone company's "outside lines". Both the handset unit and base unit each include an antenna for transmitting and receiving RF signals.

In order to provide for full duplex operation of the digital cordless telephone apparatus, two radio frequency links are established between the base unit and handset unit. One RF link, a handset channel, is the frequency at which the handset transmits, and thus at which the base unit receives, digital voice and command data signals. The second RF link, a base unit channel, is the frequency at which the base unit transmits, and thus at which the handset unit receives, digital voice and command data signals. Accordingly, both RF links may be active simultaneously such that the human voice may be both spoken and heard at the handset and base unit at the same time.

A total of 20 channels in he base unit operating frequency band of 905.6–907.5 MHz, and 20 channels in the handset operating frequency band of 925.5–927.4 MHz, are provided. For fast channel scanning handset channels are paired with base unit channels and are divided into four groups of five channels as shown in Table 1. Each adjacent channel within a group is separated by 400 kHz.

| FREQUENCY NUMBER | | CHANNEL GROUP | | | |
|---|---|---|---|---|---|
| | | 0 | 1 | 2 | 3 |
| 0 | BU | 905.6 MHz | 905.7 MHz | 905.8 MHz | 905.9 MHz |
| | HS | 925.5 MHz | 925.6 MHz | 925.7 MHz | 925.8 MHz |
| 1 | BU | 906.0 MHz | 906.1 MHz | 906.2 MHz | 906.3 MHz |
| | HS | 925.9 MHz | 926.0 MHz | 926.1 MHz | 926.2 MHz |
| 2 | BU | 906.4 MHz | 906.5 MHz | 906.6 MHz | 906.7 MHz |
| | HS | 926.3 MHz | 926.4 MHz | 926.5 MHz | 926.6 MHz |
| 3 | BU | 906.8 MHz | 906.9 MHz | 907.0 MHz | 907.1 MHz |
| | HS | 926.7 MHz | 926.8 MHz | 926.9 MHz | 927.0 MHz |

-continued

| FREQUENCY NUMBER | | CHANNEL GROUP | | | |
|---|---|---|---|---|---|
| | | 0 | 1 | 2 | 3 |
| 4 | BU | 907.2 MHz | 907.3 MHz | 907.4 MHz | 907.5 MHz |
| | HS | 927.1 MHz | 927.2 MHz | 927.3 MHz | 927.4 MHz |

Each channel frequency can be referenced by a coordinate (channel group, frequency number) where channel groups are either 0, 1, 2 or 3 and frequency numbers are 0, 1, 2, 3 or 4.

When the handset unit is placed into the handset storage cradle of the base unit a cradle initialization software routine is activated. The base unit software and microprocessor randomly select a channel group and startup frequency. This information is transferred to the handset unit microprocessor via the physical data contact adjacent to the battery recharge contacts on the handset face and in the handset storage cradle. The handset, in turn, acknowledges receipt of channel group and startup frequency information through the RF link.

The principal type of data which is exchanged between the base and handset is voice data corresponding to the spoken conversation taking place between the user operating the handset and the other party to the conversation connected to the handset via the baseset. Unlike prior art cordless telephone devices which typically utilize a narrow band frequency modulation technique and transmit an analog voice signal, the present invention transmits purely digital voice signals. Accordingly, the handset and base unit each digitize the spoken word to be transmitted to the other, the handset digitizing the user spoken word and the base digitizing the analog voice signal coming from the telephone company line. A second type of data is exchanged between the handset and the base unit and is referred to herein as digital command data. While the present apparatus principally exchanges digital voice data between the handset and base, commands must also be exchanged for the apparatus to function and for the user to access the various options contained within the apparatus.

The transmission and reception of the spoken voice takes place as follows. The handset microphone picks up the user's voice and converts it into an analog baseband electrical signal which is then amplified and filtered. The baseband analog signal is next digitized using the Adaptive Delta Modulation technique thereby generating a baseband digital voice data signal. The baseband digital voice data passes through a command data - voice data interface where it is recognized as being voice data. The signal is then scrambled and modulated onto a carrier frequency in the 925.5-927.4 MHz band for transmission to the base unit via the handset antenna.

The modulated digital voice data signal is received by the base unit antenna and amplified and filtered before it is down converted from 926 MHz to 10.7 MHz. The down converted digital voice signal is a modulated signal which is filtered and then demodulated into a baseband digital voice signal which is thereafter descrambled and then passed through a command data - voice data interface, where it is recognized as digital voice data. The signal is thereafter decoded into a baseband analog voice signal. The decoded analog voice signal is further filtered and amplified before being connected to the telephone company line via a standard telephone interface circuit.

Voice signals are transmitted from the base unit to the handset unit in a like manner except that they are transmitted in the frequency band of 905.6-907.5 MHz. The digital modulated voice signals are also received by the handset unit in a like manner except for the receiving frequency being in the frequency band of 905.6-907.5 MHz The command data signals exchanged between the handset unit and the base unit differ from voice data signals in that they are not part of the voice communication between the user and the other party to the conversation, but rather, take the form of instructions and/or status checks which are exchanged between the handset and base unit. The dialing of a telephone number from the handset is a representative task and can be used to illustrate the use and operation of command data in the present digital cordless telephone apparatus.

In order to place an outgoing telephone call one must access the local telephone company's lines. In a conventional hard wired telephone set one merely picks up the handset thereby releasing a switch hook which makes connection to the telephone company lines. Dialing a telephone number is done by pressing a sequence of push buttons, each of which generates a DTMF tone which are, in turn, read by the telephone company switch to complete the desired telephone call. In rotary dial telephones a fixed number of pulses are generated in response to the particular digit dialed by the user.

With a cordless telephone the user perceives the operation of the device to be essentially identical to the operation of a conventional corded telephone set. In actuality certain critical differences exist. When the user wishes to make a telephone call from the handset unit an RF link must first be established between the handset and base unit in order for the handset unit to obtain a dial tone. Once the dial tone is heard, the user dials the desired phone number depressing the numerically labeled buttons on the handset dial pad. The selection of a dial tone and the dialing of a telephone number are each command functions which must be transmitted from the handset to the base unit. In the present apparatus the "switch hook" is located in the base unit and is remotely activated by the handset when the user selects an outgoing line. This selection is performed by pressing the "phone" key located on the handset keypad. The user will then hear the dial tone and may dial the desired phone number using the dial pad in the conventional manner. A DTMF tone generator is located in the base unit and is thus remotely activated by the handset. Should the user press the "intercom" key, a conversation may take place between the handset unit and the base unit speakerphone. In an intercom call no telephone line is accessed.

The remote selection of an outgoing line and generation of DTMF tones, as well as other command functions described herein are accomplished by transmitting command data signals between the handset and the base unit. In the typical prior art cordless phone command data is transmitted in the digital format over an RF link. In order to permit both data and command data to be transmitted over the same link the digital data is modulated on top of the analog voice data signal prior to transmission and is recovered at the receiving device but nevertheless is audible to the listener and consumes significant time in transmission and recovery.

In the present invention where voice data and the command data are both in the digital format a unique design has been created to facilitate the intermixing of digital voice data and digital command data being based upon the interruption of the flow of digital voice data to permit command data to be inserted into the data path and thus transmitted over the RF link. In addition, in the present apparatus, the transmission of command data is accomplished using a data protocol incorporating a verified transmission scheme to insure that transmitted command data has been received by the intended unit and that no new command is transmitted until the prior command is acknowledged as received.

The transmission of digital command data is performed by inserting a command data packet into the digital voice data stream for transmission to the base unit. Commands may be initiated either by the user depressing the handset keypad or by the handset microprocessor generating link check commands. When it is necessary to transmit a command between the handset and base unit the handset microprocessor transmits the command code to a command data - voice data interface. This interface then interrupts the flow of digital voice data and inserts a command data packet. When the digital data is received by the target unit another identical command data - voice data interface checks for the presence of a command data packet in the stream of incoming digital data, and if one is found, captures the command data packet and replaces the data packet with a quiet data sequence which then is then treated as digital voice data by the receiving unit. The quiet data sequence is treated as silence and thus causes a short undetectable dropout of about one millisecond in the otherwise continuous stream of spoken words heard by the user through the speaker. The command data - voice data interface then transfers the captured data packet to the receiving unit's microprocessor which interprets and executes the command code contained within the command data packet.

Commands are transmitted from the handset to the base unit, and from the base unit to the handset in the form of a command data packet which conforms to the following protocol. The command data packet is composed of a 48 bit code. The first 8 bits are a preamble and are all "ones". The next 16 bits comprise the security code. The security code is selected randomly from one of approximately 65,000 possible codes by the base unit microprocessor and is downloaded into the command data-voice data interfaces in the handset and the base unit. The remaining 24 bits of the command data packet comprise an 8 bit data word repeated three times. The first 8 bit data word is composed of an initial "0" bit followed by a 5 bit data code, a 1 bit transmit sequence counter number and a 1 bit receiver sequence counter number. The initial bits of the second and third data words are either both "0's" or "1's" depending on whether the base or handset, respectively, is sending so as to prevent a feedback situation where a device may inadvertently receive a command it just transmitted to the other device. When the user presses a button on the handset keyboard which necessitates that a command be transmitted, the microprocessor transmits the command to the handset command data-voice data interface which assembles the 48 bit command data packet. The interface then interrupts the otherwise continuous flow of digital voice data and inserts the 48 bit command data packet in place of 48 bits of digital voice data. The command data packet then travels to the base unit, effectively a part of the digital voice data.

At the base unit, all incoming digital data passes through a command data-voice data interface identical to that in the hand set unit which continuously scans the flow of incoming digital data. When the interface finds that any consecutive 24 bits match the predetermined preamble and security code, a command data packet has been located since the trailing 24 bits are, by definition, digital command data which is then captured and transferred to the base unit microprocessor whose software executes the command corresponding to the received command code. The command data - voice data interface having captured a 48 bit command data packet replaces the 48 bits with a 48 bit quiet data sequence which comprises 48 bits of alternating ones and zeros. The quiet data sequence then flows as part of the surrounding digital voice data to the digital to analog converter. The quiet data sequence becomes a momentary period of silence when converted by the digital-to-analog converter and results in a mere one millisecond dropout of voice when played into the speaker.

The foregoing method of combined digital and command data transmission and reception permits the implementation of several new and useful features.

For each command which is sent between the base and handset, a corresponding acknowledgment is returned to the transmitting device signaling that the target device received the command. The PAR (Positive Acknowledgment with Retransmission) protocol is implemented such that the transmitting unit sends a single command and then waits for an acknowledgment before proceeding to send the next command. The transmitter sequence counter number bit and the receiver sequence counter number bit of the command data packet facilitate implementation of this feature. When the cordless phone is first powered up, or otherwise initialized by being placed into the handset storage cradle of the base unit, the software in the handset and base unit initialize the transmit and receive sequence counter numbers to zero. When, for example, the handset transmits a data packet to the base unit, the first sequence number is zero. A software timer is initiated upon transmission of a command data packet. When the base unit receives the data packet, the base unit transmits an acknowledgment with a sequence counter number of zero. An acknowledgment is another "command" and thus is transmitted as part of a command data packet. The receiver in the base unit increments its sequence number by Modulo 2, such that zero becomes one and one becomes zero. The handset unit receives the acknowledgment with a sequence zero and stops and resets the software timer and then increments its sequence counter number by Modulo 2.

Two possible types of error can occur. One is that the command data packet was received incorrectly or otherwise lost. The second is that the acknowledgment packet transmitted by the receiving device was received incorrectly or lost by the transmitter device. If the command data packet was incorrectly received or lost the base unit will not send back an acknowledgment. The handset software timer will time out after a certain amount of time and automatically cause the command data packet to be resent with the same sequence number. If the second type of error occurs, the base unit will have received a correct data packet and will have sent out a corresponding acknowledgment. The base unit will have incremented its received sequence counter number. If the acknowledgment packet is subsequently lost or damaged, the handset unit will time out and send the command data packet again. The base unit will then receive the command data packet with the old sequence number and will assume that the previous acknowledgment transmitted by the base unit did not arrive at the handset. Accordingly, the incoming command data packet will be ignored and the acknowledgment with the old sequence number will be resent. This will continue until both handset and base unit have received their correct data packets.

An additional feature of the present invention is the transmission by the base unit of a link check signal and the subsequent transmission by the handset of an link check acknowledgement signifying reception of the link check signal toward deter mining if there is an acceptable RF channel and if unacceptable to initiate an automatic change of the RF frequency channel. If several consecutive link check signals are not received by the handset, or if several link check acknowledgement signals are not returned to and received by the base unit it is assumed that the RF channel selected is no longer usable, either due to poor reception caused by interference or due to the handset unit being out of range of the base unit. If link check command signals are not received by the handset unit or link check acknowledgement signals are not received by the handset unit within a predetermined time the handset and base units will each commence to perform their channel scanning routines in an attempt to find a clear RF channel and reestablish the RF link.

During standby operation, a link check command is sent once every ten seconds from the base to the handset. This timing is selected to minimize the handset power consumption during the standby mode. If the base does not receive a link check acknowledgement from the handset within five milliseconds, it will start sending link check commands continuously to the handset for a period of 200 milliseconds. If there is no reply, the base unit will start its scanning sequence. If an outgoing call is in progress or an intercom conversation is under way, a link check command is sent four times per second from the base unit to the handset. If the base does not receive any reply for the last eight link checks, it will start its scanning sequence. Eight missed link check acknowledgements is the threshold beyond which it is assumed that the RF line quality is unacceptable and another channel must be sought out and is selected such that short fades in the RF link are ignored so that unnecessary channel changes are avoided. The handset utilizes a time out approach. If the handset does not receive any link check for two seconds (8 link checks), it will start its scanning sequence. If the handset does not receive any link checks for more than one second, it will beep to indicate an out-of-range condition. The beeping continues until any key is pressed or a link check command is received.

The handset scanning sequence is as follows. The handset scans all five frequencies within the channel group at a rate of 200 milliseconds per channel. The entire scanning cycle is one second. The handset will only monitor the base unit for valid link check command signals. The handset will not transmit a link check acknowledgement until a valid link check command is received. Once received, the scanning sequence will stop and the RF link is set up for communication.

The base scans all five frequencies within the channel group at a rate of one second per channel. This will enable the two scanning sequence to overlap with each other. After the base unit has switched to the next channel, it will "listen" for 30 milliseconds to check if the channel is noise-free and unused. During this time the base unit will not send any link check commands to the handset in order to insure that the handset is not transmitting. If there is interference, the base unit will switch to the next channel and repeat scanning on the noise-free or unoccupied channel. Once a free channel is identified the base will transmit link checks at a rate of 100 times per second continuously. Once it receives a link check acknowledgment from the handset it will stop the scanning sequence and resume its normal operation. Since link checks must be sent and acknowledged both RF links are evaluated and the possibility that the handset user may be unaware that his transmission is noisy does not exist.

The present apparatus implements a power saver or "sleep" mode in order to conserve handset battery power thus minimizing the frequency of battery recharge. When the handset unit is not in use, such as when no call is in progress, the unit is placed into a sleep mode during which the oscillator of the handset microprocessor is disabled, thereby prolonging battery life. Power is however maintained to a timer circuit in the command data-voice data interface which periodically reactivates the microprocessor. For example, a duty cycle may be selected such that the microprocessor may "awaken" for a tenth of a second once every second. When the microprocessor is awakened, the handset is able to receive an incoming call and is able to accept and acknowledge an incoming link check signal generated by the base unit. Additionally, when awakened, the microprocessor scans the handset keypad checking to see if the user has depressed any keys. Should the user attempt to initiate a phone call from the handset by depressing the phone key or the intercom key, the microprocessor is automatically awakened if asleep.

The present digital cordless telephone apparatus is a microprocessor based system which provides software control of the hardware and maintains communications between the handset and base unit. The handset software resident in the microprocessor within the handset performs the following functions. Each time the handset is returned to the handset storage cradle within the base unit the handset software performs an initialization which copies a new security code, generated by the base unit microprocessor, into the command data-voice data interface. Information relative to the channel group and frequency number for setting the phase locked loops of the modulator and demodulators in the transmitter and receiver paths is also copied to the handset unit. The software further maintains operation of handset status such as idle, on-line, intercom and hold. The software causes the microprocessor to scan the keypad looking for a keypad command to be pressed as well as executes the keypad functions and transmits key commands to the base unit. The software additionally receives command data from the voice data-command data interface transmitted from the base unit and processes the received data including maintaining the transmission sequence and receiver sequence counter numbers for providing positive acknowledgment with retransmission in the event of error. The software further implements channel scanning if communication with the base unit is lost as well as maintains the timers for the power saving mode and other "time out" functions.

Inputs to the handset are achieved through one of three methods. The first is through the handset keypad which is in a matrix configuration. Keypad scanning is performed by rapidly polling the keypad rows. The second input to the handset microprocessor is via the command data-voice data interface. When the interface identifies a match between the security code and any consecutive 24 bits, the interface will trigger the microprocessor through a timer capture interrupt to signal the microprocessor to read in the trailing 24 bits which by design are the command data words. Lastly, when the handset is placed in the handset storage cradle, the base unit will initialize the handset with a new security code, channel group and frequency number via the cradle data contact.

The handset software uses a central processing routine to maintain the handset status and a priority flow control depending upon the particular input to the handset. The handset operates in nine different modes: standby, on, cradle, phone, page, paged, intercom, program, hold and test. In the standby mode, the handset is idle and is waiting for a valid keypad input or a valid command from the base unit. In order to receive this information, the power to the microprocessor and receiver section must be on and in operation. This will consume power constantly and accordingly reduce the battery life while the handset is not in the cradle. Therefore, the periodic power shutdown is implemented in the standby mode in order to extend the battery life while maintaining the capability to receive data inputs.

After switching to the standby mode, the microprocessor will wait for inputs for 50 milliseconds. If no inputs are received, the microprocessor will turn off the receiver and transmitter power and then hold its own operation. The control data-voice data interface remains powered and the watchdog timer contained therein will time out after one second if not receiving any further inputs from a microprocessor. If the watch dog timer times out, it will reset the microprocessor thereby waking it up. Upon restarting, the microprocessor will turn on the receiver power to allow the command data-voice data interface to read in data from the base unit as well as scan the keypad. If no input is detected the power saving sequence is executed again. During the sleep mode, the "phone" and "intercom" keys remain enabled such that actuation of either of them by the user will cause an immediate interrupt and reset of the microprocessor and an immediate carrying out of the particular function.

Each time the handset is returned to the handset storage cradle within the base unit, the microprocessor detects, that the handset is on the cradle and will terminate all operation and commence a cradle initialization. During initialization data is received from the base unit through the cradle data contact automatically. When the security code, channel group and frequency numbers are transferred from the baseset microprocessor to the handset, the handset will acknowledge the base unit after the data is received and remain in that state until the handset is removed from the cradle.

When the user wishes to initiate a call from the handset or answer an incoming call from the base unit, the software will cause the handset to go into the "phone" mode. The transmitter power will be turned on to enable communications with the base unit. The microprocessor will accept inputs from all keys except the "intercom" key which is disabled while a call is in progress and activated only if the call is placed on hold.

The "page" mode can be entered by pressing the intercom button when the handset is in a standby or hold mode. This will enable the microprocessor to page the base unit. If the page is answered by the baseset the handset will enter an intercom mode permitting communication between the handset and speaker phone in the baseset.

The paged mode can be entered by receiving a page command from the base set while the handset is in the standby or hold mode. The hold mode can be entered by pressing the hold key if the handset is already in the phone mode or by receiving a hold command by the base all towards placing an in-progress call on hold.

The program mode can be entered only by pressing the program key on the handset while in the standby mode. This mode allows the user to program phone numbers into memory as well as programing ring types. A test mode is provided and is accessed only during production testing of the device.

The base unit microprocessor contains a comparable software routine to control the functions of the base unit corresponding and/or complementary to those carried out by the handset unit. In addition, the base unit software will perform the functions relative to memory storage and redial, security code generation and channel group and frequency selection, during the initialization routine, sensing on-hold phone lines and selecting different types of ringing tones.

BRIEF DESCRIPTION OF THE DRAWINGS

FIG. 1 of the drawings is a top plan view of the handset unit and the base unit which together comprise the present digital cordless telephone apparatus;

FIG. 2 of the drawings is a simplified functional block diagram of the various stages in the transmit path and reception path of the circuitry found in both the handset unit and the base unit;

FIG. 3 of the drawings is diagram of the 48 bit command data packet;

FIG. 4 of the drawings is a diagram of the 8 bit base unit data word;

FIG. 5 of the drawings is a representation of the 8 bit handset unit data word;

FIG. 6 of the drawings is a functional layout of the handset unit keypad and light emitting diodes;

FIG. 7 of the drawings is a functional layout of the base unit keypad and light emitting diodes;

FIG. 10B of the drawings is a portion of a schematic circuit diagram of the microprocessor, command data-voice data interface, power regulator and low battery indicator circuitry of the handset unit;

FIG. 12B of the drawings is a portion of a schematic circuit diagram illustrating the bandpass filter, duplexer and transmit antenna of the handset unit transmitter path as well as the bandpass filter and RF amplifiers of the receiver path of the handset unit;

FIG. 28B of the drawings is a portion of a schematic circuit diagram of the security code register of the command data - voice data interface;

DETAILED DESCRIPTION OF THE DRAWINGS

Figure 8:
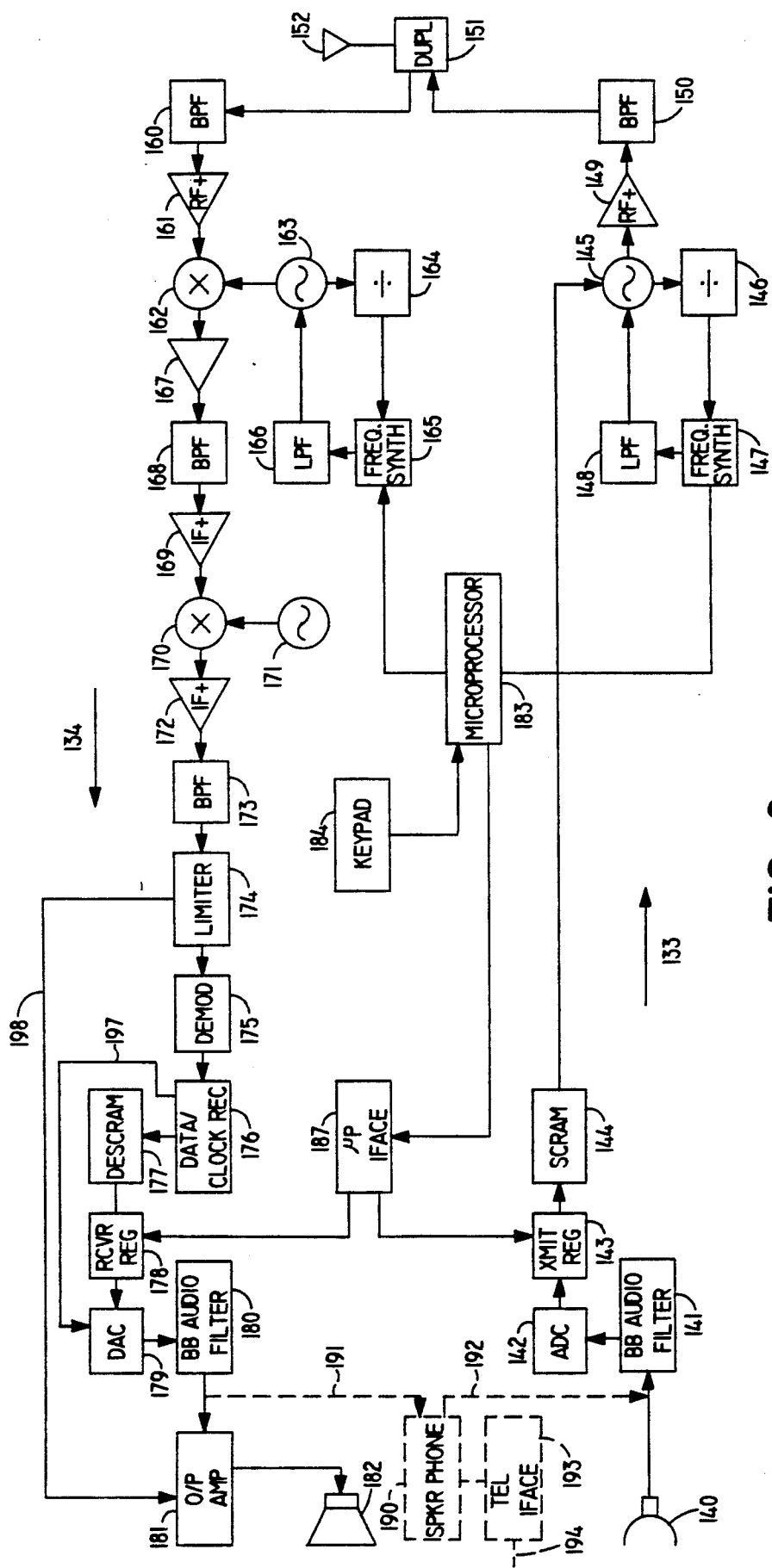
FIG. 8 of the drawings is a detailed functional block diagram common to the handset unit and base unit of the present apparatus.

While this invention is susceptible of embodiment in many different forms, there are shown in the drawings and will herein be described in detail a specific embodiment, with the understanding that the present disclosure is to be considered as an exemplification of the principals of the invention and is not intended to limit the invention to the embodiment illustrated.

FIG. 1 of the drawings illustrates handset unit 101 and base unit 110 which together form the present digital cordless telephone apparatus 100. Handset unit 101 is shown comprising a hand held telephone instrument which communicates with base unit 110 via radio frequency (RF) links "A" and "B" established between antenna 102 of handset unit 101 and antenna 115 of base unit 110. Handset unit 101 is shown including microphone 105 into which the user speaks and speaker 103 through which the user listens. Keypad 104 is shown incorporating both the push button keys and light emitting diodes through which the user operates the digital cordless telephone apparatus 100 and monitors its status. Contacts 106, 107 and 108 are shown positioned on the face of handset unit 101. Contacts 106, 107 and 108 are metallic terminals which provide connection to the internal batteries and microprocessor.

Base unit 110 is shown comprising a housing which is intended to remain fixed in place and hard-wire connected to the user's local telephone network via connector cord 118 which is designed to plug into the RJ 11 type wall jack found in most homes and businesses. Base unit 110 includes handset storage cradle 111 which is designed to receive and retain handset unit 101 for storage and recharging of the handset batteries. When in its storage position, in a face-down position, contacts 106, 107 and 108 of handset unit 101 along with and juxtapose contacts 114, 113 and 112, respectively, such that recharge power may be supplied to handset unit 101 via contacts 112 and 114 and such that a physical data link may be established between the microprocessor resident in each of handset 101 and base unit 110. Base unit 10 further includes key pad 117 which permits the user to actuate and access the local telephone service using speakerphone 116 which includes speaker 116A and microphone 116B. Base unit 110 is shown connected to an external source of power via power connector 119.

FIG. 2 of the drawings is a simplified block diagram of the functional stages which make up the present digital cordless telephone apparatus 100. As shown in FIG. 1, the present digital cordless phone apparatus 100 comprises handset unit 101 and base unit 110 which is hard-wired connected to the user's local telephone company exchange in the same manner as is a conventional telephone set.

Two types of digital data are exchanged between base unit 110 and handset 101. The first type of data is referred to herein as digital voice data and represents the spoken conversation which takes place between the user operating handset 101 and the other party to the conversation represented by base unit 110. The second type of data which is exchanged between base unit 110 and handset 101 is referred to herein as digital command data. Digital command data represents the instructions and/or status requests which are transmitted between handset unit 101 and base unit 110 to facilitate operation of digital cordless telephone apparatus 100.

Each of handset 101 and base unit 110 include two data paths indicated by arrows 133 and 134. Data path 133 corresponds to the transmission of voice and command data while data path 134 corresponds to the reception of voice and command data. To avoid unnecessary duplication, the transmission of a spoken voice from handset unit 101 to base unit 110 and reception by base unit 110 from handset unit 101 will each be described with the understanding that the corresponding transmission by and reception from base unit 110 occurs in the same manner with the exception that handset 101 transmits on the RF link frequency received by base unit 110 and base unit 110 transmits on the RF link frequency received by handset 101.

The transmission of a human voice from handset unit 101 to base unit 110 occurs as follows. The user speaks into microphone 105 of handset unit 101 which picks up the user's voice and generates an analog electrical signal onto line 129 in response to the user's voice. The analog electrical signal is amplified and put through a lowpass filter both contained in transmitter baseband audio stage 130. The output of stage 130 is a baseband analog voice signal. The analog voice signal is then digitized by digital transmitter stage 131 which includes an analog-to-digital converter the output of which is a baseband digital voice data signal. In the present digital cordless telephone apparatus 100 the Adaptive Delta Modulation digitization technique is utilized. It is contemplated that any one of a variety of other available digitization techniques could be utilized. The baseband digital voice data signal is passed through command data voice data interface 125 which recognizes the signal intended to be transmitted as being a digital voice signal (as opposed to a command signal) and scrambles the baseband digital voice data for transmission to base unit 110. The scrambled baseband digital voice data is then modulated by RF transmitter stage 132 onto a 926 MHz carrier using Frequency Shift Keying (FSK) modulation.

Duplexer 121 serves to isolate transmission path 133 from reception path 134 of handset unit 101 through the use of a high impedance network which induces the digitally modulated RF signal to antenna 120 and prevents the transmitted digitally modulated RF voice data from being fed into reception path 134. The modulated digital voice data is then transmitted to base unit 110 via antenna 120.

Base unit 110 functions to transmit and likewise receive digital voice data and accordingly reference will be made to FIG. 2 to describe this function. Base unit 110 receives the modulated digital voice signal via antenna 120 and directs the received digital voice signal to RF receiver stage 124 by way of duplexer 121. RF receiver stage 124 amplifies and filters the incoming modulated digital voice signal and down converts the signal from 926 MHz to 10.7 MHz where it is filtered and demodulated into a baseband digital voice signal. The baseband digital voice signal is passed through command data - voice data interface 125 which first unscrambles the digital voice data and then recognizes the received signal as a digital voice signal. The baseband digital voice signal is then converted into a baseband analog voice signal by digital receiver stage 126 which incorporates a digital-to-analog converter. The output, a baseband analog voice signal, is then filtered and amplified by receiver baseband audio stage 127 before being sent out on line 128 to the local telephone company telephone lines, via a telephone interface, not shown.

Analog voice signals presented to base unit 110 via either the telephone interface or speakerphone 116 are transmitted to handset unit 101 using the same process used by handset unit 101 to transmit to base unit 110 except that base unit 110 will transmit at a frequency of 906 MHz.

In addition to transmitting digital voice data signals to base unit 110, handset unit 101 transmits digital command signals to base unit 110. The command data signals differ from voice data signals in that they are not part of the voice communication between the user and the other party to the conversation, but rather, take the form of instructions and/or status checks which are exchanged between handset 101 and base unit 110.

The remote selection of an outgoing line and generation of DTMF tones, as well as other command functions described herein are accomplished by transmitting command data signals between handset 101 to base unit 110.

In the present invention where the voice data and the command data are both in the digital format a unique solution has been created to facilitate the intermixing of digital voice data and digital command data through the interruption of the flow of digital voice data to permit command data to be inserted into the data path and thus transmitted over the RF link. In addition, in the present apparatus, the transmission of command data is accomplished using a unique data protocol incorporating a verified transmission scheme to insure that transmitted command data has been received by the intended unit.

The transmission of digital command data is performed by inserting a command data packet into the digital voice data stream for transmission to base unit 110. Commands are initiated by either the user pressing keypad 122 or by microprocessor 123 under software control. When it is necessary to transmit a command between handset 101 and base unit 110 the microprocessor 123 transmits the command code to command data - voice data interface 125. Interface 125 then interrupts the flow of digital voice data generated by digital transmitter stage 131 and inserts a command data packet. As the digital data is received by the target unit command data - voice data interface 125 checks for the presence of a command data packet in the stream of incoming digital data, and if one is found, captures the command data packet and replaces the data packet with a quiet data sequence which is then treated as digital voice data by apparatus 100. The quiet data sequence is treated by digital receiver stage 126 as silence and thus causes a short dropout in the otherwise continuous stream of spoken words heard by the user through the speaker. Command data - voice data interface 125 transfers the captured data packet to microprocessor 123 which interprets and executes the command contained within the data packet.

The format of the command data packet is illustrated in FIG. 3. The data packet is 48 bits in length and comprises an 8 bit preamble followed by a 16 bit security code and then an 8 bit command word repeated three times. The preamble comprises 8 bits all set to "1". The security code consists of 16 bits of random data.

The command data is repeated three times. If all three data packets are not the same an error is assumed to have occurred and the data is ignored. A "majority rules" type of arrangement could also be implemented.

The base unit 110 command data packet is illustrated in FIG. 4 and is shown comprising an initial bit, which is set to "0" in the first data word 135 and is set to "0"

in the second and third data words 136 and 137, a 5 bit command code, a 1 bit transmission sequence counter number 138 and a 1 bit reception sequence counter number 139. The handset 101 data format is illustrated in FIG. 5 and comprises an initial bit, which is set to "0" in the first data word 135 and set to '1' in the second and third data words 136 and 137, a 5 bit command code, a 1 bit reception sequence counter number and a 1 bit transmission sequence counter number In apparatus 100, base unit 101 loads one of approximately 65,000 possible security codes into handset 101 each time handset 101 is returned to handset storage cradle 111 in base unit 110. The security code is generated by software resident in base unit 110 and is used by handset 101 and base unit 110 to insure the stability and integrity of the RF link.

The data formats illustrated in FIGS. 4 and 5 indicate that since the data format include both transmit and receive sequence counter numbers the information may be piggy-backed onto each data sequence sent.

FIG. 6 of the drawings is a functional layout of keypad 104 of handset 101, a review which is useful towards understanding and interaction of handset 101 and base unit 110. Keys 201 through 212 correspond to keys numbered 1 through 9 plus the "*", zero and "#" keys found on typical "touch tone" telephone sets. Additionally illustrated in FIG. 6, are keys 219, 221 and 223 labeled "phone", "intercom" and "off", respectively. Phone key 219 is used by the user to initiate the call from handset 101 whereby the user would depress phone key 219 in order to establish an RF link between handset 101 and base unit 110 and access a telephone line. LED 220 positioned above phone key 219 is illuminated when an outside line is being used.

Intercom key 221 is provided towards permitting the user to establish an RF link between handset 101 and base unit 110 for the purpose of conducting an intercom call between handset 101 and base unit 110 such that an outgoing line is not accessed. As illustrated in FIG. 1, the user with the handset 101 would be conversing through the speaker and microphone present in handset 101 while the other party to the intercom call would be conversing through microphone 116A and speaker 116B of speakerphone 116 present in base unit 110. Once the user depresses intercom key 221, a voice conversation can be carried on between handset 101 and base unit 110.

Off key 223 is provided and is utilized to disconnect access to a telephone line as well as to disconnect and discontinue an intercom conversation. If a three-way conversation is being carried on (the use of an outside line, speakerphone and handset) depressing off key 223 will disconnect the handset from the conversation and leave the party at the speakerphone connected to the outside line.

When keys 201 through 210, 1 through 9 plus 0 are depressed and an outside line has been previously selected by depressing phone key 219, a DTMF tone is transmitted over the line and is echoed back to handset speaker 103. If keys 201 through 210 are continually depressed, the tone is continuously sent. For pulse lines, depression of any key 201 through 210 causes the appropriate pulse pattern to be sent out over the line as well as being echoed back through handset speaker 103.

Star/tone key 211 is provided and permits the user to cause handset 101 to operate in the tone mode if base unit 110 has been placed into the pulse mode. Pressing the tone key 211 will cause DTMF tones to be generated upon the depression of keys 201 through 210 and 211 and 212 for the duration Of a call. "Pound" key 212 is provided and when depressed generates the appropriate DTMF tone. If handset 101 is in the pulse mode, this key is inactive. Pound key 212 is also used to program the ringer type.

Additionally, six function keys are provided. Memory key 213 is provided and is used by the user to program phone numbers into the memory storage resident in base unit 110. Ten memory locations, 0–9, are provided, each of which may store up to sixteen digits. To store a phone number in memory, the user first presses program button 214 then selects a memory location by pressing one of keys 201 through 210, and using the keypad 104 enters the number that the user desires to store in memory. When complete, the user presses memory key 213 which assigns the phone number to the key location selected. To dial a phone number from its memory location, the user merely selects an outgoing line by pressing "phone", thereby getting a dial tone, and then pressing memory key 213 followed by the storage location number, 0–9.

Redial key 215 is provided and automatically dials the number which the user has dialed most recently. To use the redial, the user simply selects a dial tone by pressing phone key 219 and then presses redial key 215.

Hold key 216 is provided for placing an outgoing call on hold. To take a call off hold, the user merely presses phone key 219. As a safety feature, if the user has placed a call on hold by first pressing hold key 216, pressing off key 223 will not disconnect a call. If a call is on hold and handset 101 is put into the storage position in base unit 110, the call is still held. If the user then goes to another phone and picks up the phone, the call is automatically taken off hold and the cordless phone 100 is released. Once the user hangs up the other phone, the call is disconnected and nothing further need be done to disconnect cordless phone 100. If a three-way conversation is taking place between handset 101, base unit 110 and an outgoing call, depressing hold key 216 will cause both handset 101 and base unit 110 to be put on hold such that pressing phone key 219 or speakerphone key 323 will disable the hold function. In order to signal to the party placed on hold that a connection is still in place, cordless phone apparatus 100 generates a tone pulse which is sent out every five seconds. In addition, handset 101 will beep once every ten seconds to alert the user a call has been placed on hold. Depressing the hold key when attempting to store a phone number into a memory location, as previously described, will cause a pause to be inserted into the dialing sequence as may be necessary when accessing certain telecommunication devices and/or systems.

Program/privacy key 214 serves two functions. When an outside line has been selected by handset 101, depressing program/privacy key 214 results in speaker 116A resident in base unit 101 to be toggled from an enabled to a disabled status for the duration of the call. This allows the user to have a conversation from handset 101 to an outgoing call without anyone listening into the conversation through speakerphone 116 in base unit 110. Depressing program/privacy key 214 again will toggle the speakerphone 116 from disabled to enabled. Once the call is completed by depressing off key 223, speakerphone 116 is automatically reset to enabled. When handset 101 is off line and has not accessed an outgoing line, pressing program/privacy key 214 causes handset 101 to be placed in the program mode. In the program mode, the user can store phone numbers as previously described or may select the ringer type. To set the ringer type, the handset 101 and base unit 110 must be off. The user first depresses the program/privacy 214, then depresses pound key 212 and then depresses a key 1 through 4, 201 through 204, in order to select a ringer type. Once a ringer type has been selected, handset 101 will ring once to indicate to the user the type of ring that has been selected. In addition, the user may select between a high and a low volume ring by depressing the privacy key, the pound key 212 and then the zero key to toggle between a high and low volume ringer. Once selected, the ringer stays in its mode until reprogrammed. Flash key 217 is provided and has the same affect as momentarily pressing the switch hook on a conventional telephone set. This function is used with such services as call waiting and/or call forwarding as supplied by local telephone companies.

Mute key 218 is provided and serves to disable handset microphone 105. When disabled, low battery/mute LED 224 will flash. Depressing mute button 218 will again disable the mute feature.

Low battery/mute LED 224 serves to indicate to the user that the battery charge of handset 101 is low. When the battery i detected as being low, a warning tone is emitted from handset 101 when a call is first activated. During a call the low battery LED 224 will remain lit indicating to the user that the unit 101 needs to be recharged. In addition, volume up and down buttons are provided on the side of handset 101 (not shown) which controls the volume of speaker 103 and may be increased/decreased between low, medium and high settings.

FIG. 7 of the drawings is a function layout of keypad 117 of base unit 110. Keys 301 through 315 function identical to handset 101 keys 201 through 215. Intercom key 321, hold key 316, flash key 318 and mute key 319 also function is accordance with their counterpart keys resident in keypad 104 of handset 101. Present in base unit and not present in handset 101 is speakerphone key 323, which operates in several different modes. When an outgoing line is not selected, pressing speakerphone key 323 will cause base unit 110 to retrieve an outside line. Once selected, LED 324 will illuminate. A telephone number may then be called manually by depressing keys 301 through 312 or by depressing redial key 315. When a phone line is engaged by handset 101, depressing speakerphone key 323 will cause a threeway conversation to take place between handset 101, base unit 110 and the outgoing line. If this feature is selected, handset 101 will be alerted to its selection by the emission of an audible tone and the flashing illumination of the intercom LED 222 on handset 101. Should the user of handset 101 elect not to permit a three-way conversation to occur, the user may simply press privacy key 214 to disconnect the speakerphone 116 of base unit 110. If a phone line has been engaged only by base unit 110, pressing speakerphone 323 will disengage the line. If an outgoing line is engaged by both handset 101 and base unit 110, pressing speakerphone button 323 during a three-way conversation will disconnect speakerphone 116 from the conversation. Handset 101 and the outside line will continue to be connected. If a call has been placed on hold by having pressed hold key 316, pressing speakerphone key 323 will take the call off hold. In addition, if the speakerphone is being used and handset 101 is in handset storage cradle 111, retrieving handset 101 from cradle 111 will automatically disconnect speakerphone 116. Base unit 110 may be activated by merely pressing speakerphone key 323. Charge LED 329 is provided and when lit indicates to the user that the handset 101 is resident in cradle 111 and is charging. Speakerphone volume control 325 is composed of a down button 326 and an up button 327 which serves to provide variable control of speakerphone 116.

FIG. 8 of the drawings is a functional detailed block diagram of the handset unit 101 and base unit 110 of the present digital cordless telephone apparatus 100. Portions of the block diagram which are common to both handset unit 101 and base unit 110 are shown by solid lines whereas the remaining portions, shown in dash lines, are applicable only to base unit 110. As can be seen from the drawing, two data paths designated by arrows 133 and 134 exist respectively between microphone 140 and antenna 152, and antenna 152 and speaker 182. Data path 133 corresponds to the transmitter portion of handset 101 whereby the spoken word is received and transmitted via antenna 152 while data path 134 corresponds to the receiver portion of handset 101 wherein the radio frequency signal is received antenna 152 and made audible at speaker 182.

In operation, microphone 140 of handset 101 picks up the user's spoken voice and converts it into an analog electrical signal. This signal is then amplified and filtered by transmitter baseband audio stage 141 the output of which is a baseband analog audio signal. This baseband analog signal then passes to analog-to-digital converter 142 which serves to digitize the incoming analog signal such that the output of analog-to-digital converter 142 is a baseband digital audio signal. The digital audio signal passes through transmitter register 143 and is then scrambled by scrambler 144. The digitization technique utilized in the present invention is the Adaptive Delta Modulation (ADM) technique. If the output of analog-to-digital converter 142 were to be modulated onto a carrier frequency and transmitted by antenna 152 without scrambling, it is possible that due to the modulation technique utilized the radio signal if intercepted might to some degree be audible such that the voice transmission would be discernible and understandable by the intercepting party. Accordingly, scrambler 144 serves to scramble the digital voice data such that the transmitted radio signal if intercepted would not be able to be directly understood.

The output of scrambler 144 is sent to voltage controlled oscillator (VCO) 145 which modulates a carrier using Frequency Shift Keying (FSK) modulation. The actual carrier frequency is dependent upon the DC voltage from lowpass filter 148. Lowpass filter 148 comprises part of a PLL frequency synthesizer circuit consisting of voltage controlled oscillator 145, lowpass filter 148, frequency synthesizer 147 and divider 146. Frequency synthesizer 147 basically determines what frequency the VCO 145 is operating at by dividing its frequency down with a divider 146. This signal is then compared against a reference frequency by frequency synthesizer 147 and an error voltage is applied through lowpass filter 148 which corrects any drift in the VCO 145. The net result is that at the output of VCO 145 there is a modulated carrier at a frequency determined by microprocessor 183.

The output of VCO 145 is thus a modulated carrier at one of 20 frequencies from 925.5 MHz to 927.4 MHz. The modulated digital voice signal is then amplified by RF amplifier 149 and filtered by bandpass filter 150 which serves to pass only those frequencies between 925.5 and 927.5 MHz. The filtered output of bandpass filter 150 is then applied to antenna 152 via duplexer 151 where it is broadcast to base unit 110.1.

Incoming modulated digital data having been transmitted from base unit 110 at one of 20 different frequencies is received by antenna 152. The frequency channels are from 905.6 MHz to 907.5 MHz. The modulated digital voice signal is induced into antenna 152 and filtered by bandpass filter 160. The filter is centered on 906 MHz and is about 2 MHz wide such that it only passes those frequencies between 905.5 MHz and 907.5 MHz. Accordingly, desired frequencies are passed while undesired frequencies are attenuated.

The output of bandpass filter 160 is a modulated digital voice signal which is then amplified by RF amplifier 161 and passed to mixer 162. Mixer 162 serves to down convert the incoming 900 MHz signal bringing it to a 60 MHz signal through the use of a PLL circuit comprising voltage controlled oscillator 163, lowpass filter 166, frequency synthesizer 165 and divider 164. The frequency synthesizer 165 basically determines what frequency VCO 163 is operating at by dividing its frequency dow with divider 164 comparing it against a reference frequency by frequency synthesizer 165 such that an error voltage is applied through lowpass filter 166 which corrects drift in VCO 163. Microprocessor 183 thus serves to select the precise frequency at which the signal will be down converted corresponding to one of the 20 possible frequency channels. The circuit takes in the appropriate "channel number" from microprocessor 183 making it possible for microprocessor 183 to specify the particular channel that is to be received toward permitting auto channel changing under microprocessor control. The output of mixer 162 is amplified by IF amplifier 167, filtered by bandpass filter 165 and again amplified by IF amplifier 169 before it is further down converted by mixer 170 driven by fixed oscillator 171 operating at 49.3 MHz. Mixer 170 and oscillator 171 serve to provide a fixed amount of down conversion bringing the received modulated digital voice signal down to 10.7 MHz where it is amplified and further filtered by amplifier 172 and bandpass filter 173. The output of bandpass filter 173 passes through limiter 174 which serves to remove any amplitude modulated noise. Limiter 174 further generates a mute signal on line 198 should a poor voice signal be detected. Demodulator/comparator stage 175 serves to demodulate the baseband digital voice signal by the FSK method. The output of demodulator 175 is thus a baseband digital signal Data/clock recovery stage 176 serves to recover the data and clock signal from the incoming digital baseband wave form signal The data signal is then sent to descrambler 177 which descrambles the baseband digital data performing the inverse operation of that performed by scrambler 144 and the clock signal is connected to digital-to-analog converter 179 by line 197. The descrambled digital data and the recovered clock signal generated by clock/data recovery stage 176 are fed to receiver register 178 and then to digital-to-analog converter 179 which serves to convert the incoming digital voice signal into a baseband analog signal. The analog signal is then filtered by a baseband receiver audio filter 180 and is amplified by amplifier 181 before being directed to speaker 182. Mute line 198 from limiter 174 serves to mute amplifier 101 if a poor signal is detected to thereby prevent static from being heard through speaker 182.

Base set unit 110 operates in the same fashion as that just described except for the following differences. The receiver section of base unit 110 operates in the 925.5 to 927.5 MHz range corresponding to the frequency channels at which handset 101 is transmitting. Conversely, the transmitter portion of base unit 110 operates in the 905 to 907 MHz range corresponding to the frequency channels which are being received handset 101.

In addition, in order to provide an interface to the telephone company lines, telephone interface 193 is provided for connection to telephone jack 194. Interposed between telephone interface 193, input 191 to speaker 182 and output 192 of microphone 140 is a standard speakerphone hybrid circuit.

Digital command data is transmitted and received in the following manner When the user pushes a button on keypad 184, microprocessor 183 transmits a corresponding command code to microprocessor interface 187. Microprocessor interface 187 in turn transfers the command code to transmitter register 143 which together with associated circuitry assembles a command data packet from the security code and command code and inserts the command data packet into the stream of digital voice data. The command data packet thus replaces a small portion of the digital voice data. The digital voice data with intermixed command data packets is connected to scrambler 144 toward being transmitted on the RF link.

Digital command data is recovered from the digital voice data stream as follows. The output of descrambler 177 is a data stream consisting of demodulated digital voice signal with intermittently spaced command data packets which is connected to receiver register 178. Receiver register 178 and associated circuitry continually scans the incoming stream of digital data looking for a match between the 24 bit preamble and security code and any corresponding number of bits in the data stream. When a match is found the trailing 24 bits by design comprise the command data packet which is transferred by receiver register to microprocessor interface 187. Microprocessor interface in turn transfers the command data packet to microprocessor 183 which executes the command associated with the command code contained in the command data packet. Receiver register 178 further replaces the command data packet with a quiet data sequence packet which interposed into the data stream is passed to digital-to-analog converter 179. Digital-to-analog converter 179 treats the quiet data sequence packet as silence which is not noticeable to the user due to the small number of voice data bits which are replaced FIG. 9–FIG. 12 of the drawings comprise the schematic circuit diagrams of the transmitter path 133 of handset 101.

Figure 9:
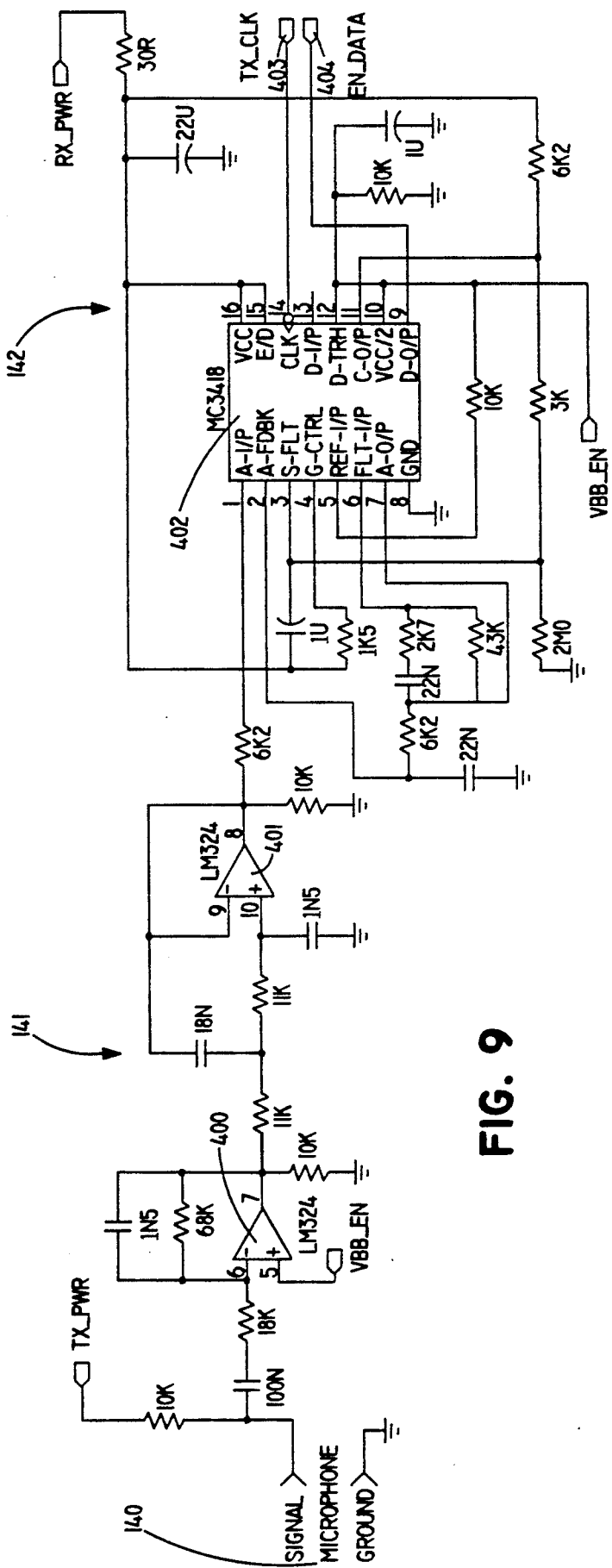
FIG. 9 of the drawings is a schematic circuit diagram of the microphone, transmitter baseband audio stage and analog-to-digital converter of the handset unit.

FIG. 9 of the drawings illustrates connection of microphone 140 to transmitter baseband audio stage 141. The output of microphone 140 is an analog electrical signal corresponding to the user's voice This analog electrical signal is fed to transmitter baseband audio stage 141 wherein amplifier 400, an LM324 type device, amplifies the analog baseband voice signal which is then filtered by filter 101 also based around a type LM324 device. The output, an analog voice signal is shown connecting to analog-to-digital converter 402, based upon an MC3418 integrated circuit. As configured, this device converts the incoming baseband audio signal into a baseband digital signal using the adaptive delta modulation technique. The output of analog-to-digital converter 402 is a baseband digital signal on line 404 as well as the corresponding clock signal on line 403, which signals carry onto FIG. 10 of the drawings.

Figure 10A:
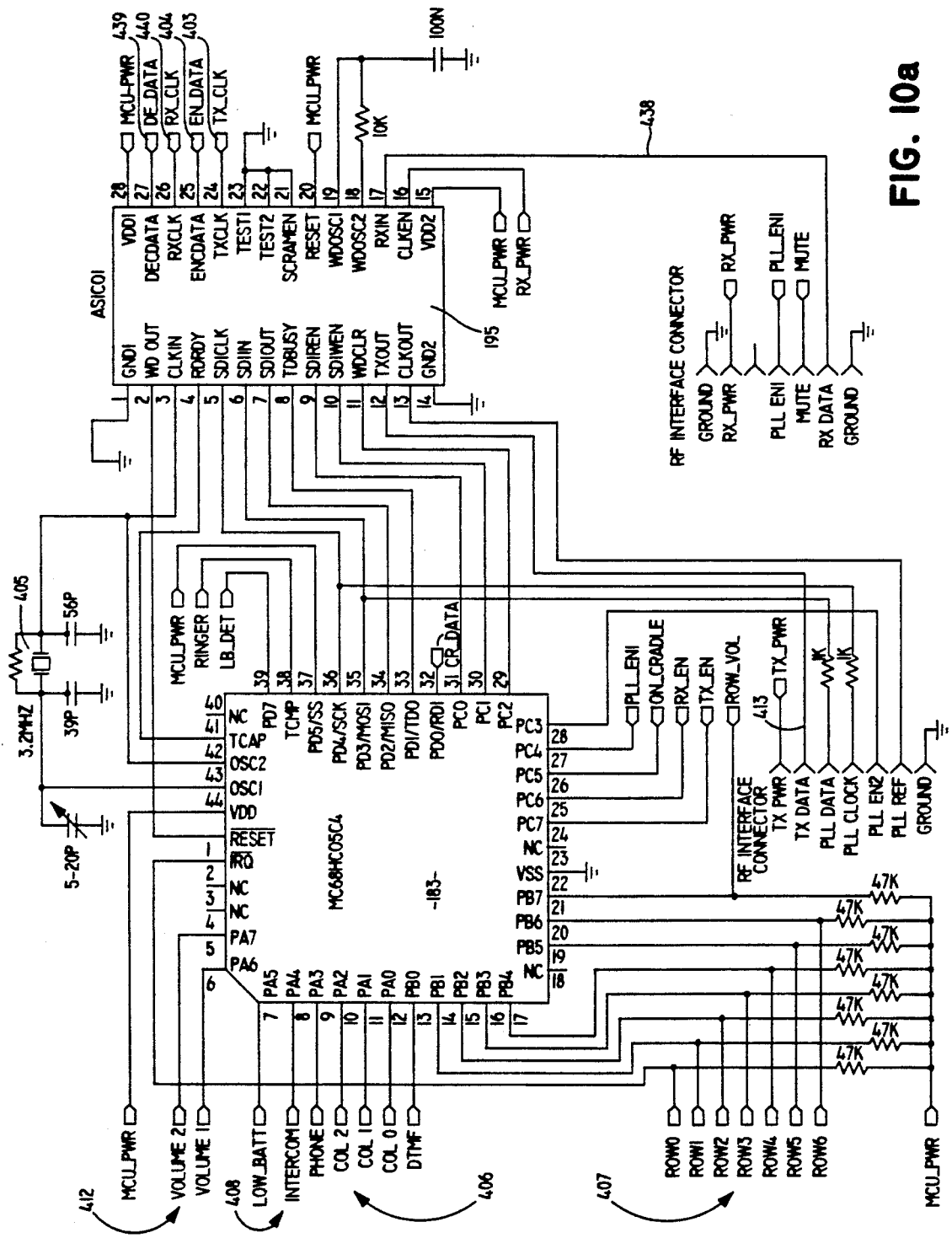
FIG. 10A of the drawings is a portion of a schematic circuit diagram of the microprocessor, command data-voice data interface, power regulator and low battery indicator circuitry of the handset unit.

FIG. 10 of the drawings illustrates microprocessor 183 together with command data-voice data interface 125 and watchdog timer shown implemented on an application specific integrated circuit 195. Microprocessor 183 is shown comprising a type MC68HC05C4 integrated circuit, "a microcomputer on a chip" type device incorporating internal RAM and ROM storage. Crystal 405 serves to supply the clock signals to microprocessor 183 and command data-voice data interface 125 and the reference frequency for frequency synthesizers 147 and 165. Baseband digital voice signal 404 and clock signal 403 are shown connected to command data-voice data interface 195, the output of which appears on line 413 and is labeled TXData corresponding to the digital voice data signal and which carries onto FIG. 11.

Figure 11:
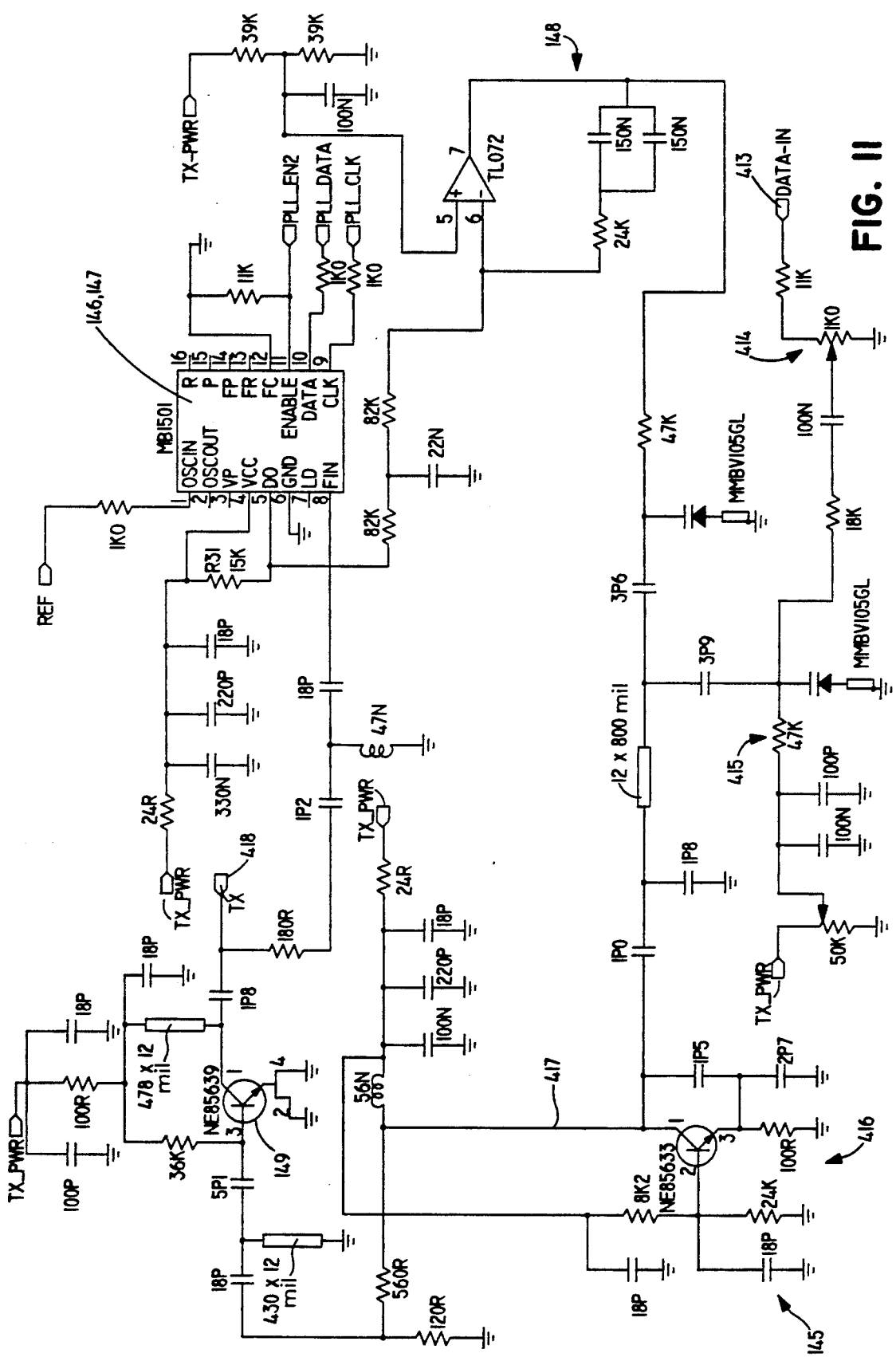
FIG. 11 of the drawings is a schematic circuit diagram of the PLL based modulator stage of the handset unit shown comprising the modulator, transmit oscillator, divider, frequency synthesizer and low pass filter.

Further shown in FIG. 10 are connections 406 and 407 which provide the row and column connections for matrix keypad 104 of handset unit 101. Additionally shown are volume input lines 412 which connect to the volume buttons on handset unit 101. The power supply for handset unit 101 is supplied by battery 411 which drives voltage regulators 410 configured around LM2931 devices which provide a regulated five volt output. In addition, low battery circuit 409 serves to monitor the charge status of battery 411 in order that a low battery condition may be signaled to the user. Additionally shown are contacts 106 and 108 through which base unit 110 may recharge battery 411 and 107 through which a "physical" data link may be established with base unit FIG. 11 of the drawings continues the transmission data path 133 of handset 101 wherein the digital voice data signal appears on line 413 having come from command data-voice data interface 195 of FIG. 10. FIG. 11 of the drawings illustrates voltage controlled oscillator 145 shown comprising modulator 414, coarse frequency adjustment 415 and transmit Oscillator 416. Further illustrated is lowpass filter 148 and frequency divider 146 and frequency synthesizer 147 implemented on a single MB1501 integrated circuit. Inputs 416 are shown and provide connection to microprocessor 183 towards the selection of the particular channel/frequency at which handset unit 101 is to transmit. Pin 5 of frequency synthesizer 147 generates an error voltage which passes through lowpass filter 148 toward performing channel selection by affecting the frequency of the transmit oscillator 146. The output of mixer 145, on line 417, passes the modulated digital voice data to RF amplifier 149 based upon a type NE85639 transistor. The output of RF amplifier 149 on line 418 continues on FIG. 12 of the drawings.

Figure 12A:
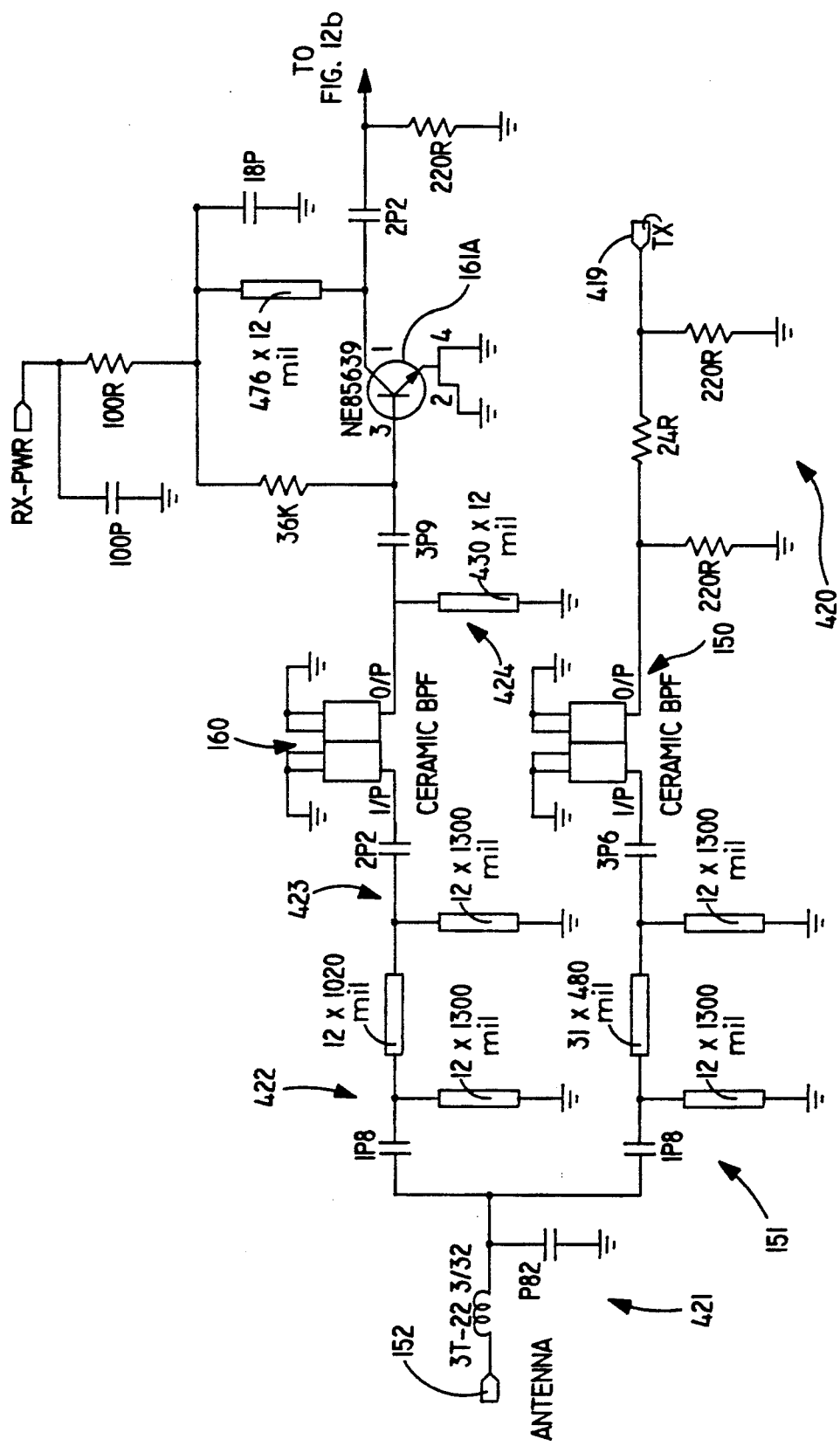
FIG. 12A of the drawings is a portion of a schematic circuit diagram illustrating the bandpass filter, duplexer and transmit antenna of the handset unit transmitter path as well as the bandpass filter and RF amplifiers of the receiver path of the handset unit.

FIG. 12 of the drawings illustrates the balance of transmitter data path 133 beginning with input line 419. The modulated digital voice signal passes through the four dB pad 420 and bandpass filter 150, a ceramic type bandpass filter. The output of bandpass filter 150 is connected to duplexer 151 which is a high impedance network. The output of bandpass filter 150 sees the receiver data path 134 commencing with circuits 422 and 423 as a high impedance network such that the signal is induced through antenna matching circuit 421 onto antenna 152. As shown, duplexer 151 is constructed of microstrip devices.

Figure 13A:
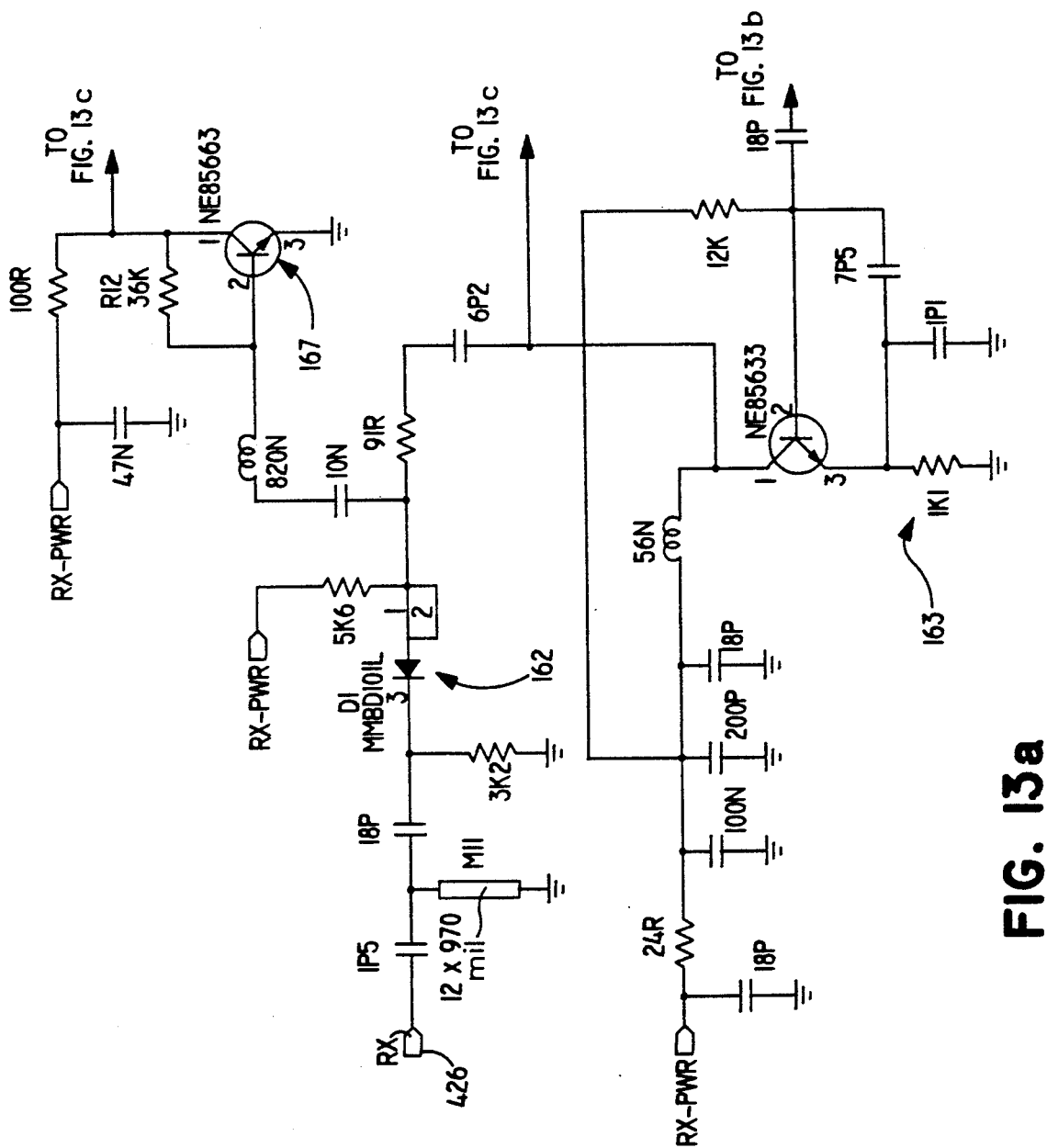
FIG. 13A of the drawings is a portion of a schematic circuit diagram illustrating PLL based down converter comprising the mixer and associated oscillator, divider, frequency synthesizer and lowpass filter, as well as IF amplifier, bandpass filter and second IF amplifier in the receiver path of the handset unit.
Figure 13B:
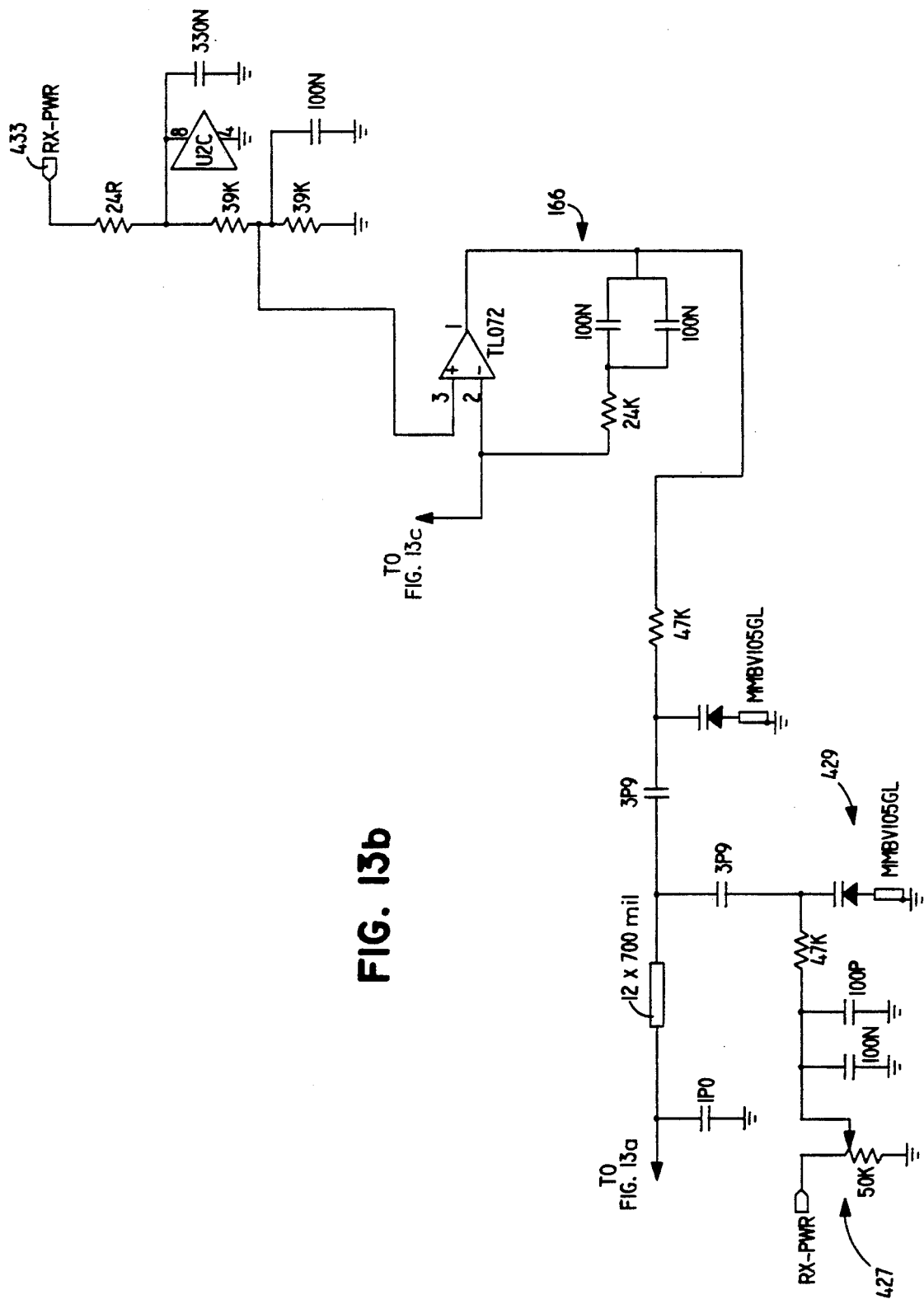
FIG. 13B of the drawings is a portion of a schematic circuit diagram illustrating PLL abased down converter comprising the mixer and associated oscillator, divider, frequency synthesizer and lowpass filter, as well as IF amplifier, bandpass filter and second IF amplifier in the receiver path of the handset unit.
Figure 13C:
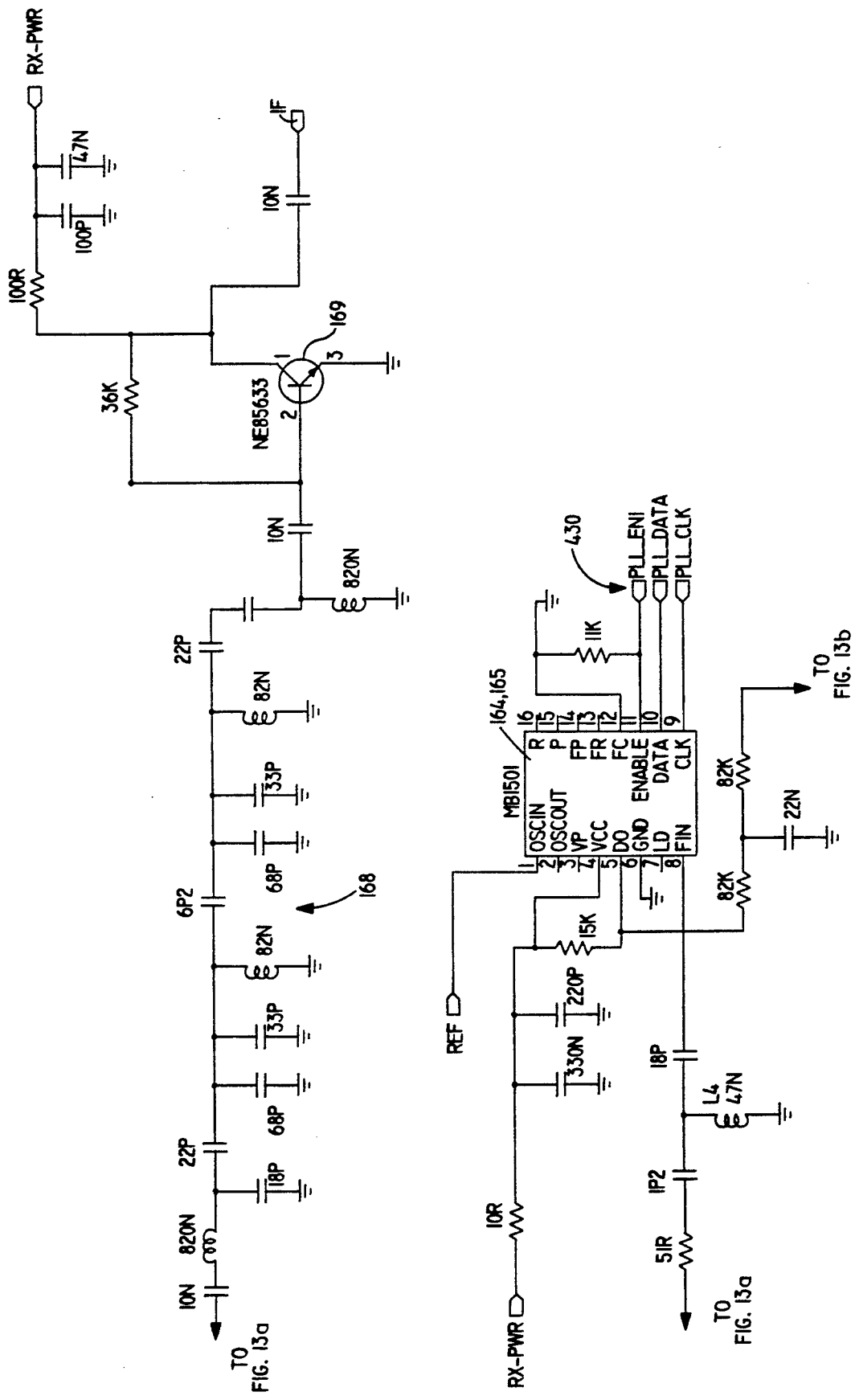
FIG. 13C of the drawings is a portion of a schematic circuit diagram illustrating PLL based down converter comprising the mixer and associated oscillator, divider, frequency synthesizer and lowpass filter, as well as IF amplifier, bandpass filter and second IF amplifier in the receiver path of the handset unit.

Incoming modulated digital voice data is received by antenna 152 and is connected to bandpass filter 160 via duplexer circuit 151. Just as the transmitted signal sees a high impedance and low impedance path the incoming signal likewise is induced into the receiver path 134 as opposed to transmitter path 133. Circuit 422 converts a 50 ohm impedance to a 90 ohm impedance whereas circuit 423 converts back to a 50 ohm impedance prior to bandpass filter 160 shown comprising a ceramic bandpass filter. Microstrip device 424 is illustrated and serves to provide matching of bandpass filter 160 to RF amplifier 161. RF amplifier 161 is illustrated as a two-stage RF amplifier circuit wherein the first stage 161a is based upon a type NE85639 transistor which provides 13.5 dB of gain with a noise figure (NF) of approximately 2.0 dB. A four dB pad 425 provides isolation between RF amplifiers 161a and 161b to prevent oscillation between the two, reducing gain and providing better stability. The second stage RF amplifier 161b is also based on a NE85639 transistor and provides 13.5 dB of gain. The output of which appears on line 426 and continues on FIG. 13 of the drawings.

Figure 14A:
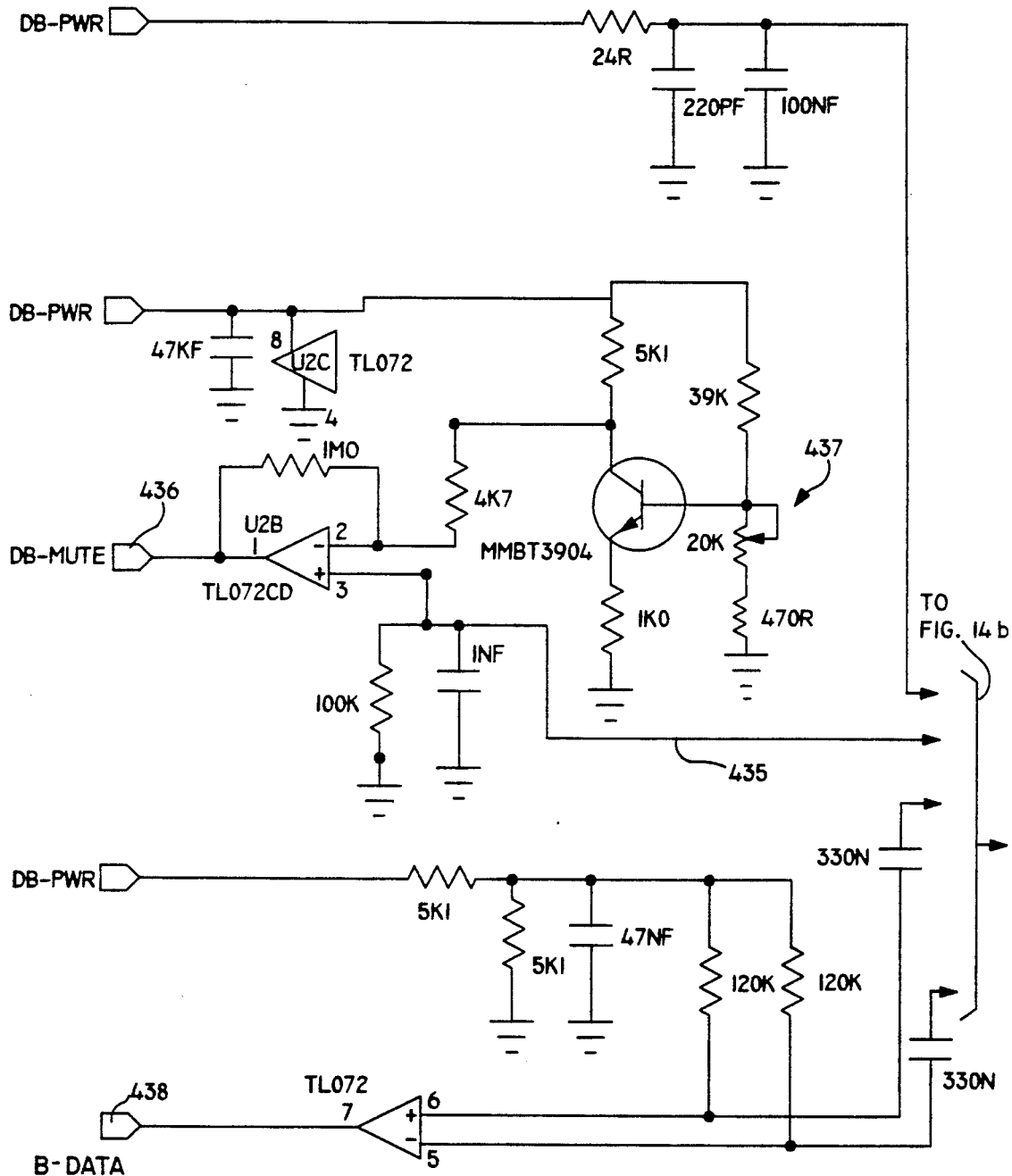
FIG. 14A of the drawings is a portion of a schematic circuit diagram of the second down converter stage comprising the second mixer and local oscillator, as well as bandpass filter, limiter, and demodulator circuitry of the handset unit.
Figure 14B:
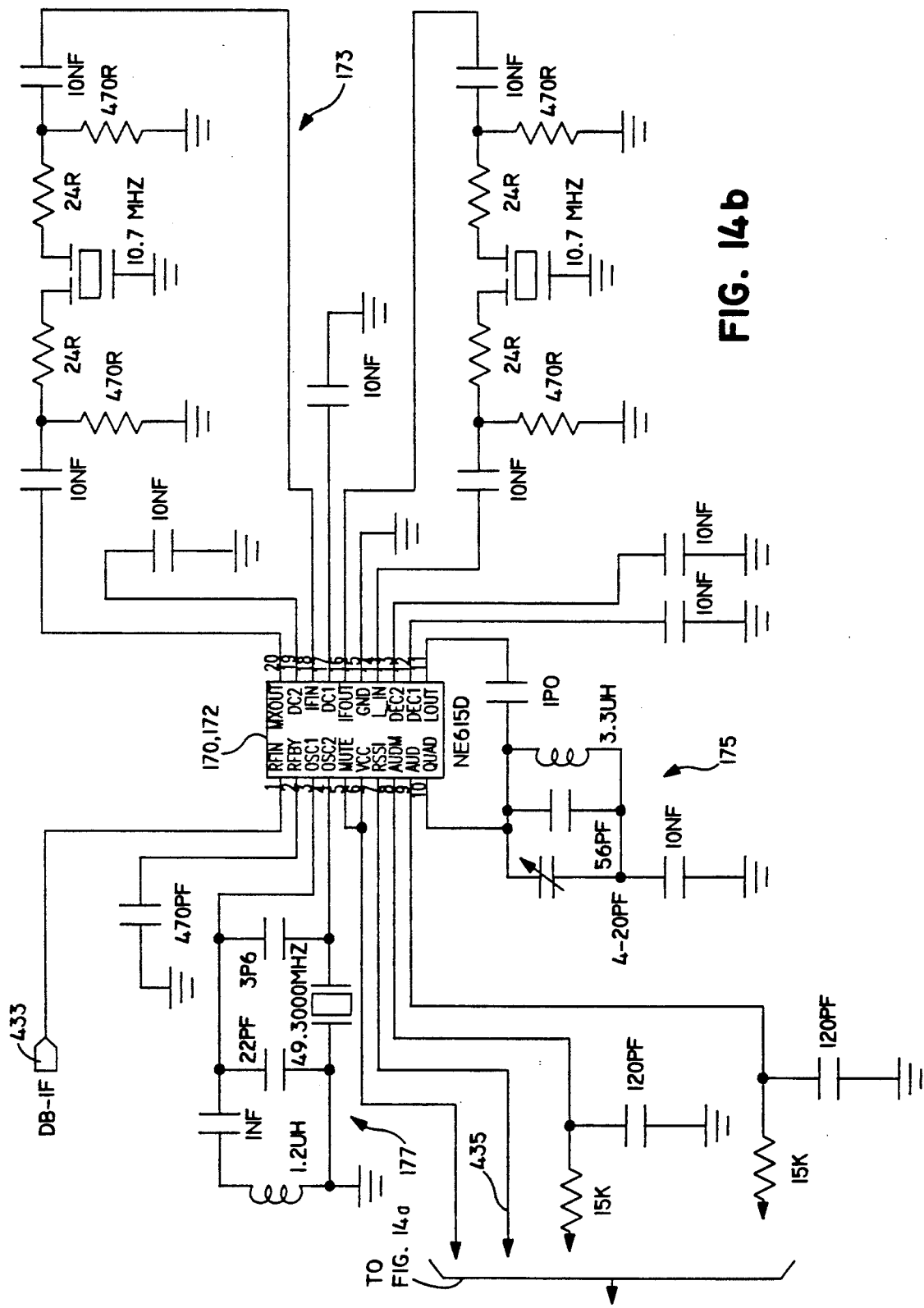
FIG. 14B of the drawings is a portion of a schematic circuit diagram of the second down converter stage comprising the second mixer and local oscillator, as well as bandpass filter, limiter, and demodulator circuitry of the handset unit.
Figure 14C:
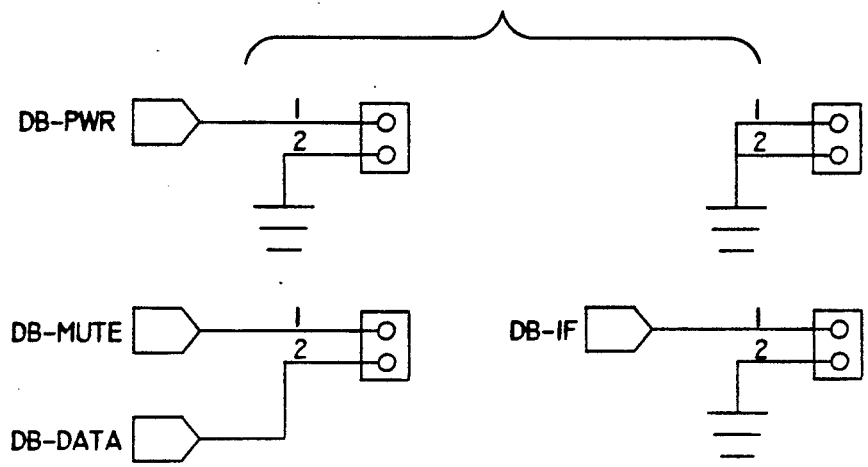
FIG. 14C of the drawings is a portion of a schematic circuit diagram of the second down converter stage comprising the second mixer and local oscillator, as well as bandpass filter, limiter, and demodulator circuitry of the handset unit.

Input line 426 is shown connected to mixer 162 which imparts a 10 dB conversion loss with a noise figure (NF) equal to 10 dB. Voltage controlled oscillator 163 is illustrated and comprises course frequency adjustment 427 together with oscillator 428. Variable capacitance diode 429 comprises the tank circuit. Fine tuning of the frequency is provided by the microprocessor using input lines 430 to frequency synthesizer and divider 164 and 165 which together are present on the MB1501 integrated circuit device. The inputs 430 from microprocessor 183 serve to designate the particular channel frequency to be received by handset 101. Lowpass filter 166 is illustrated as two-pole loop filter based upon the TL072 device. The output of mixer 162 on line 431 passes through lowpass filter 432 having a 60 MHz lowpass setting, the output of which is connected to IF amplifier 167 based on the NE85633 transistor. IF amplifier 167 provides a plus 23 dB gain at 60 MHz. Bandpass filter 168 is illustrated with a 60 MHz center frequency and 50 ohm impedance. IF amplifier 169 is shown comprising an NE85633 transistor which provides 23 dB of gain and generates a 50 ohm output which consists of an amplified filtered digital signal. This signal is an FSK modulated digital signal which passes on line 433 to FIG. 14 for demodulation. The incoming 60 MHz input on line 433 is shown connected to the RF-IN terminal pin of the NE615 integrated circuit which comprises a mixer with local oscillator designated 170 and 171. Within this integrated circuit is an IF amplifier designated 172. The 60 MHz input is thus down converted by the internal oscillator and mixer to a 10.7 MHz signal. The internal oscillator 171 is operating at 49.3 MHz per crystal 171. Also shown connected is bandpass filter 173. The mute pin of the integrated circuit of line 435 provides a recovered signal strength indicator which is connected to dB mute line output 436. Coupled thereto is a mute adjust circuit 437. Output 438 is illustrated and comprises a demodulated digital signal which is connected to the command data-voice data interface 125. FIG. 10 shows the output of the command data-voice data interface appearing on 439 and 440 which continue to FIG. 15 of the drawings.

Figure 15B:
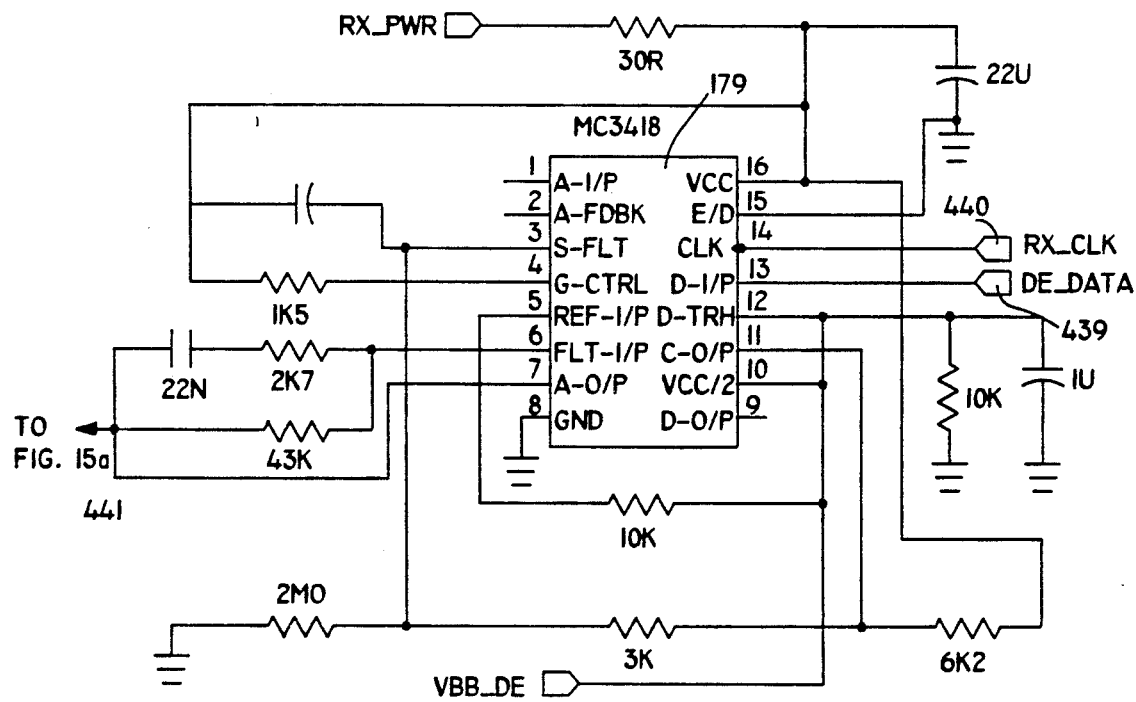
FIG. 15B of the drawings is a portion of a schematic circuit diagram of the digital-to-analog converter, receiver baseband audio section output amplifier/filter and speaker of the handset unit.
Figure 15A:
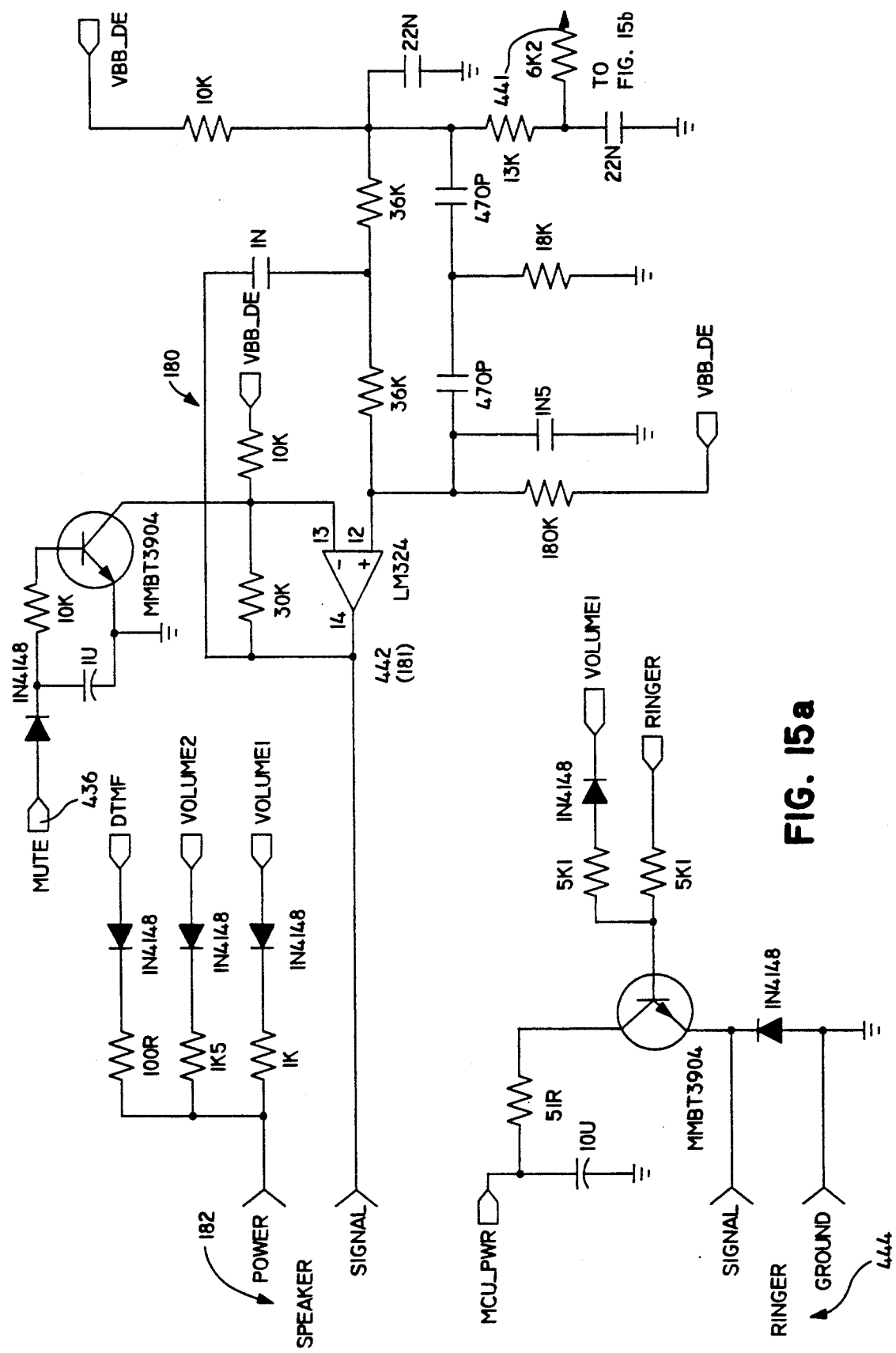
FIG. 15A of the drawings is a portion of a schematic circuit diagram of the digital-to-analog converter, receiver baseband audio section output amplifier/filter and speaker of the handset unit.

FIG. 15 of the drawings illustrates the digital-to-analog converter 179 comprising an MC3418 type integrated circuit, the output of which on line 441 is a analog baseband audio voice signal corresponding to the voice signal transmitted by handset 101. The output of digital-to-analog converter 179 is connected to receiver lowpass audio stage 180. The output of receiver baseband audio stage 180 is connected to speaker 182. Further shown is incoming mute signal 436 from FIG. 14 which serves to disable baseband stage 180 thereby muting speaker 182 if the signal strength drops below the level set by mute adjustment 437.

Further shown in FIG. 15 is ringer circuitry 443 which receives an input from microprocessor 183 on FIG. 10 for triggering ringer 444 signaling an incoming call.

Figure 16:
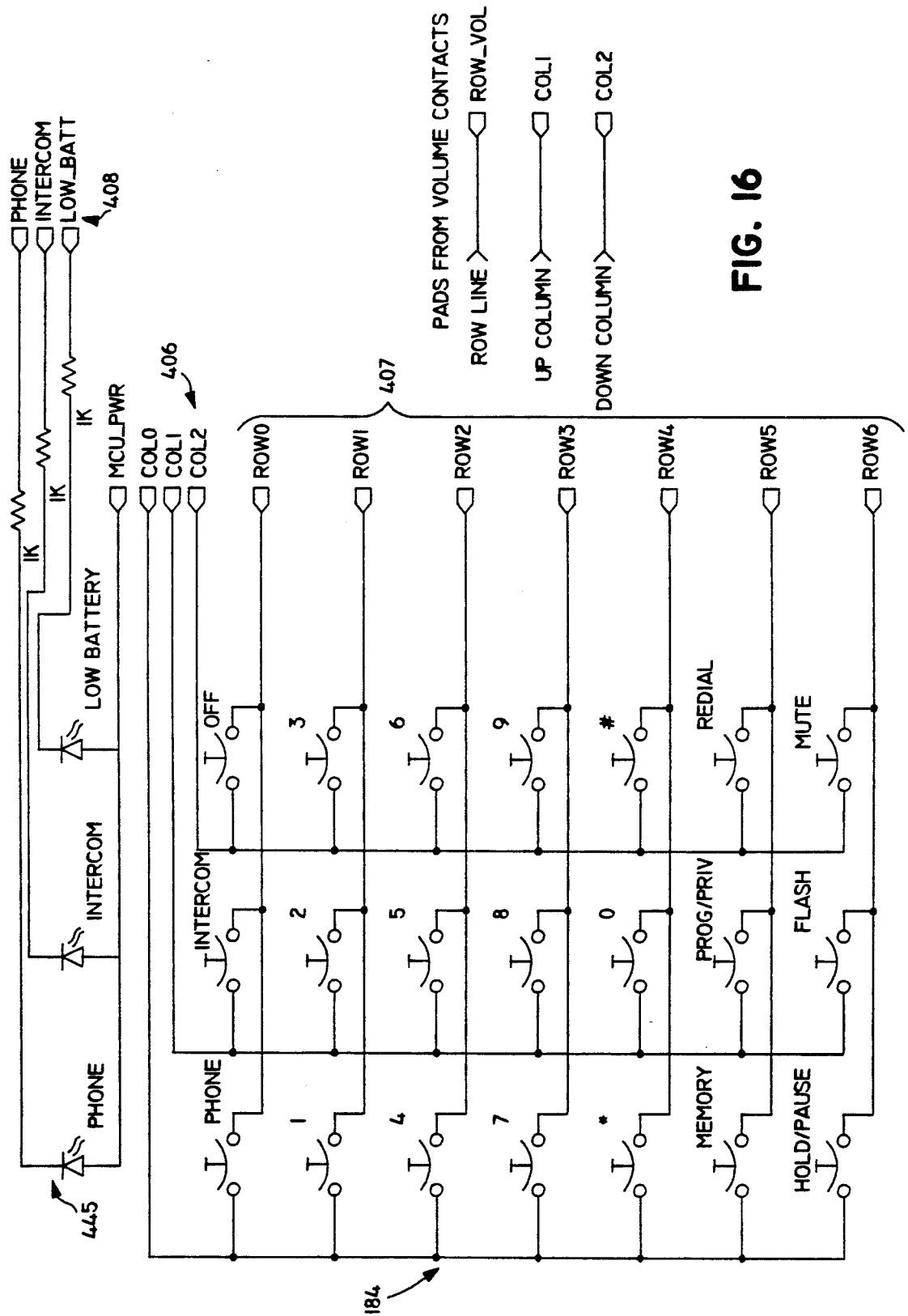
FIG. 16 of the drawings is a schematic circuit diagram of the keypad and status LEDs of the handset unit.

FIG. 16 of the drawings illustrates key pad 184 and its connections 406 and 407 to microprocessor 183. Additionally shown are LEDs 445 and connection point 408 for connection to microprocessor 183.

The foregoing description of FIGS. 9–16 while described in the context of handset unit 101 are equally applicable to base unit 110 with the additions and/or modifications illustrated in FIGS. 17–21.

Figure 17A:
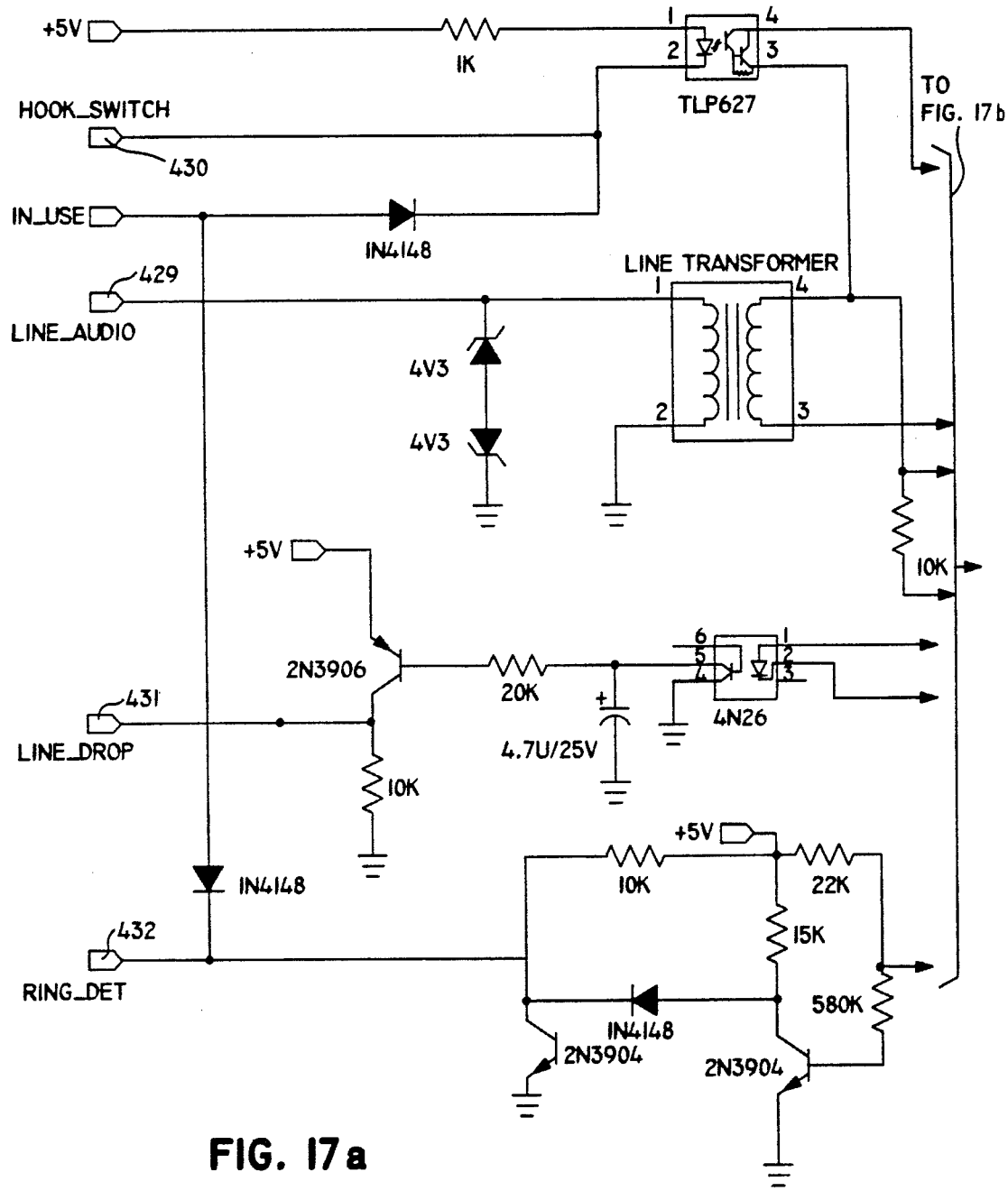
FIG. 17A of the drawings is a portion of a schematic circuit diagram of the telephone interface of the base unit.
Figure 17B:
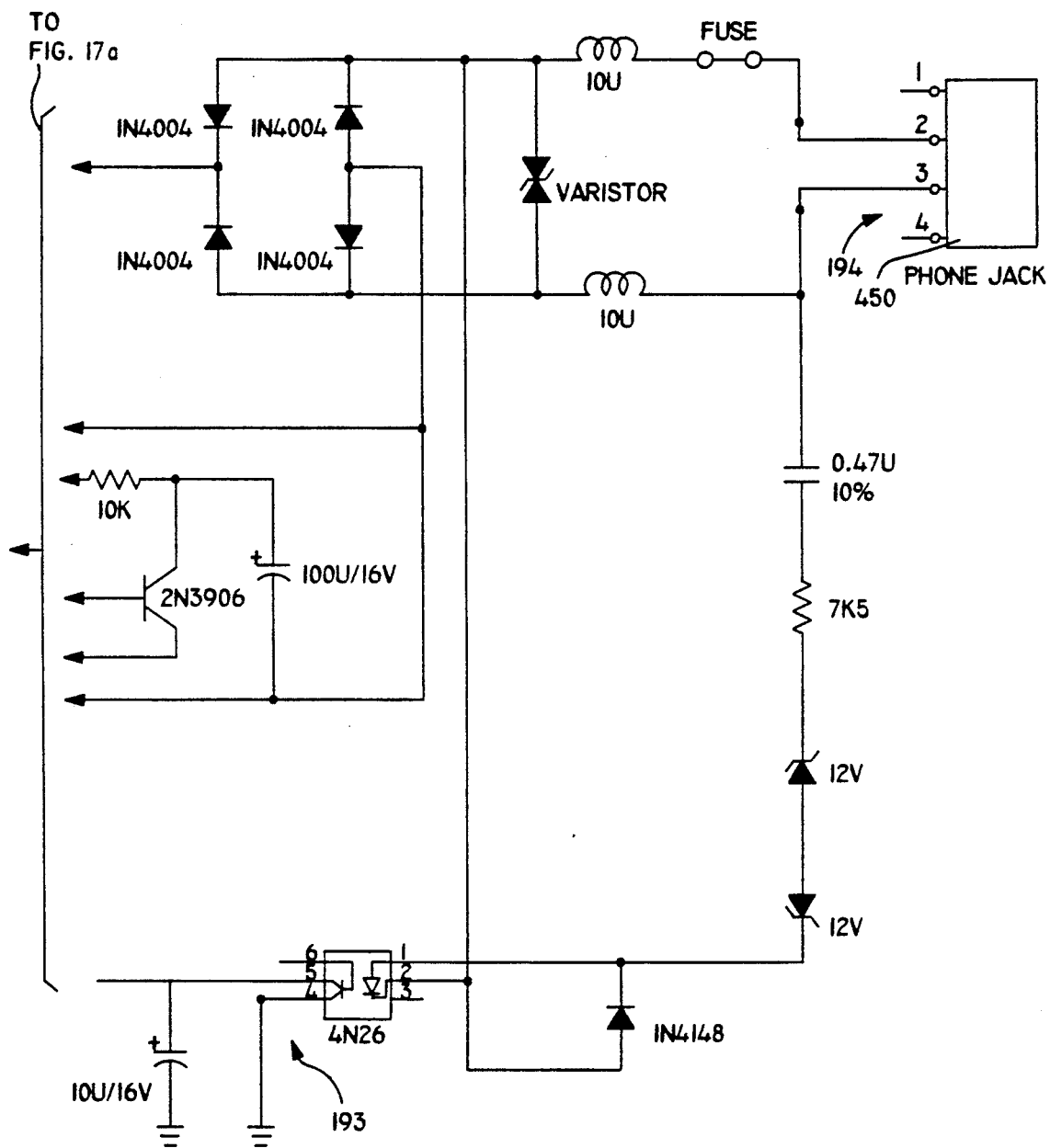
FIG. 17B of the drawings is a portion of a schematic circuit diagram of the telephone interface of the base unit.

FIG. 17 of the drawings illustrates telephone interface 193 which provides connection to RJ 11 jack 450 through lines 194. Telephone interface illustrated in this FIG. 17 is a standard telephone interface readily understandable to those skilled in the art.

Figure 18A:
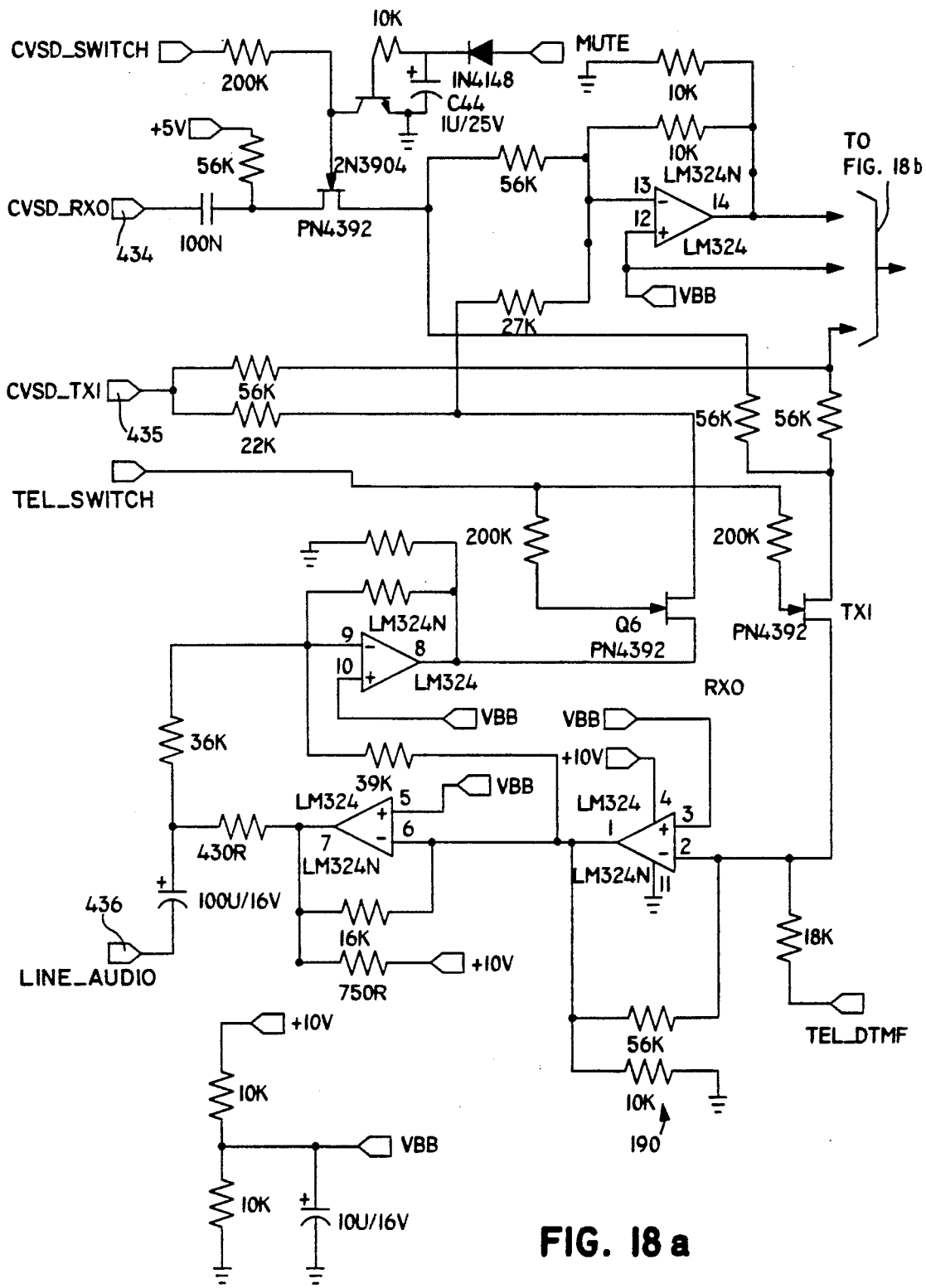
FIG. 18A of the drawings is a portion of a schematic circuit diagram of the speakerphone and hybrid of the base unit.
Figure 18B:
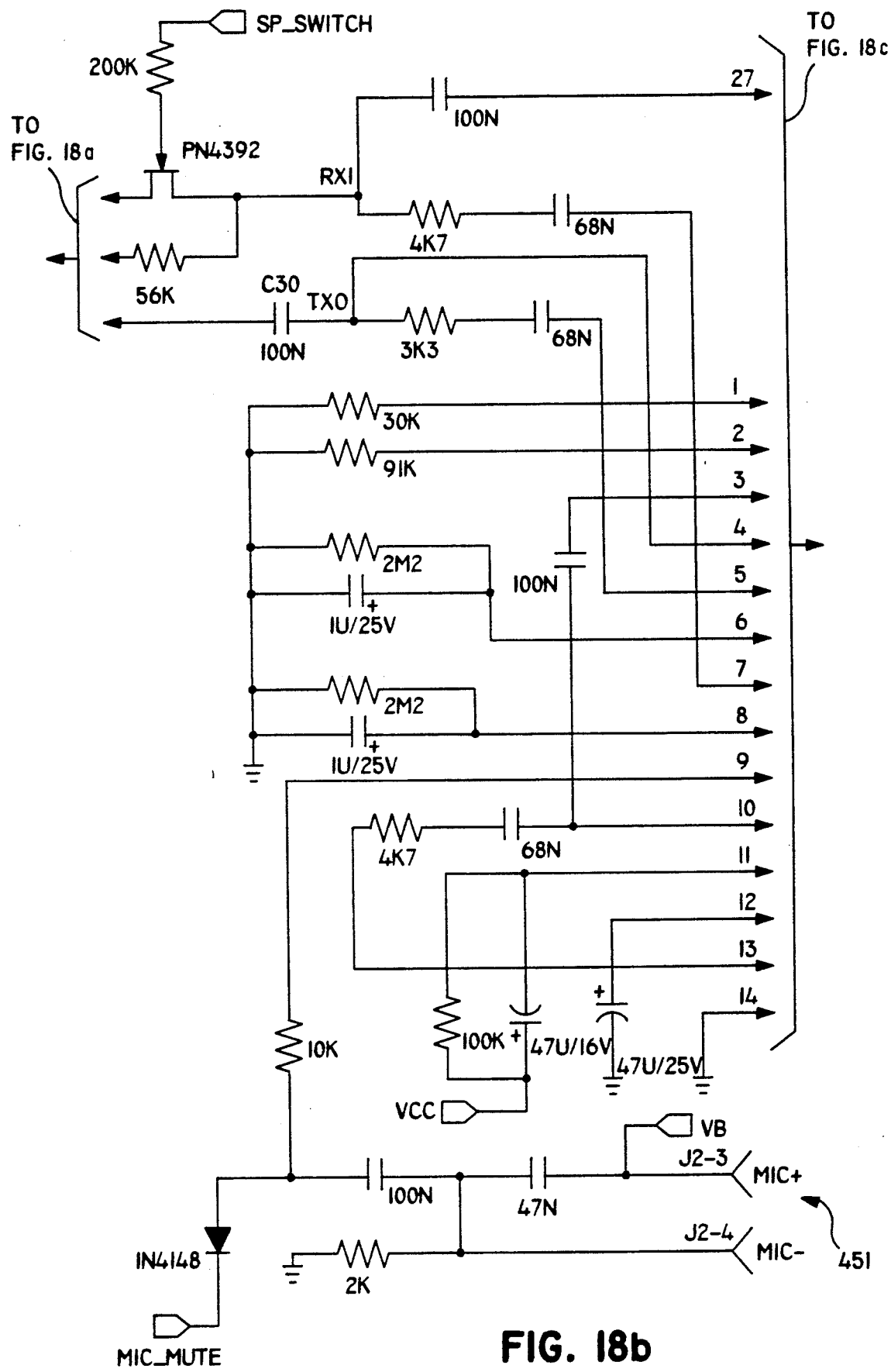
FIG. 18B of the drawings is a portion of a schematic circuit diagram of the speakerphone and hybrid of the baseunit.
Figure 18C:
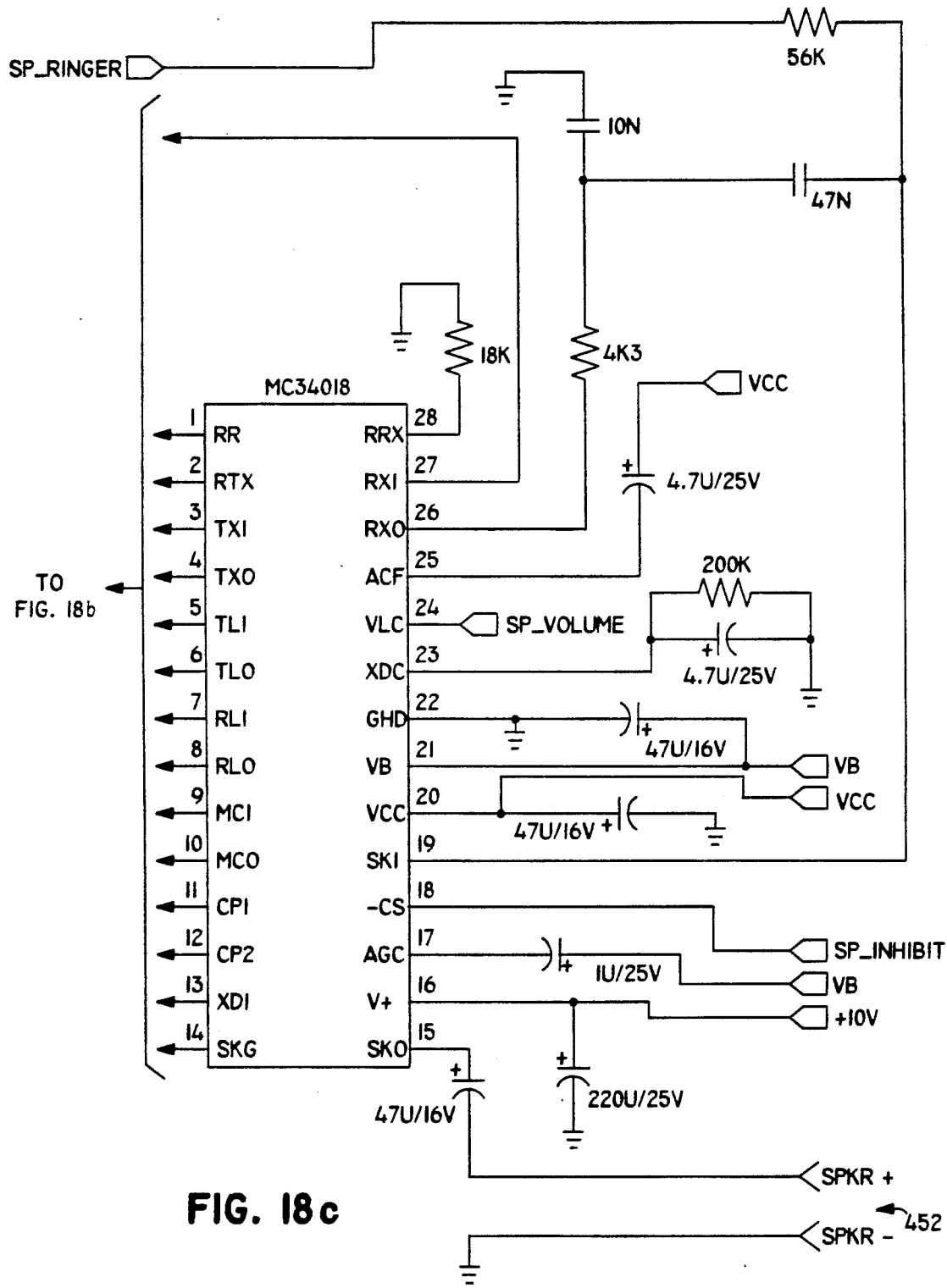
FIG. 18C of the drawings is a portion of a schematic circuit diagram of the speakerphone and hybrid of the base unit.
Figure 19A:
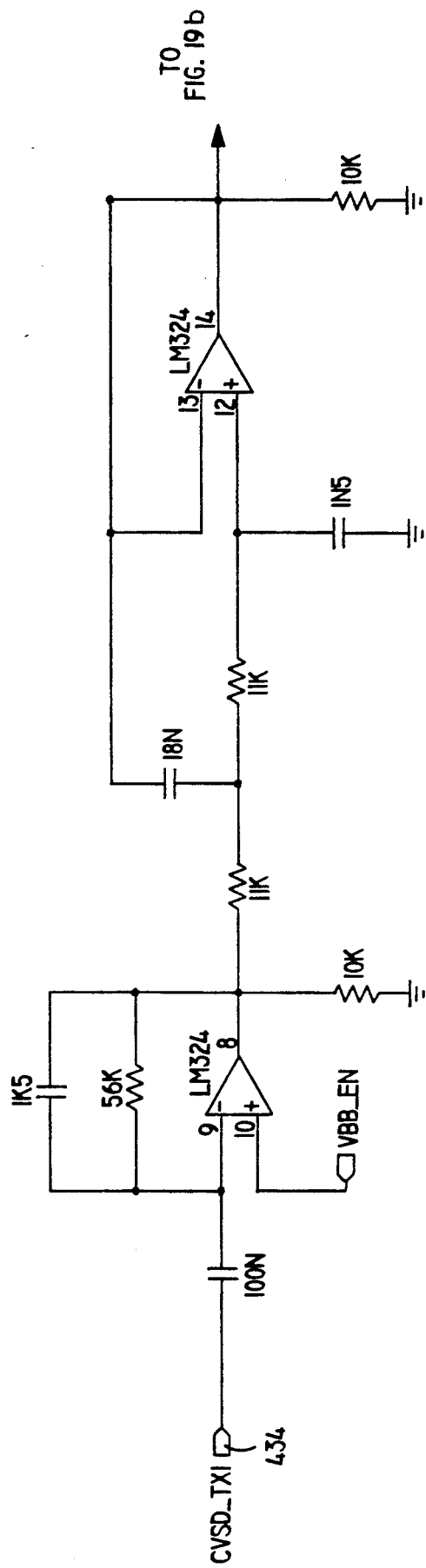
FIG. 19A of the drawings is a portion of a schematic circuit diagram of the analog-to-digital converter and digital-to-analog converter circuitry of the base unit.
Figure 19B:
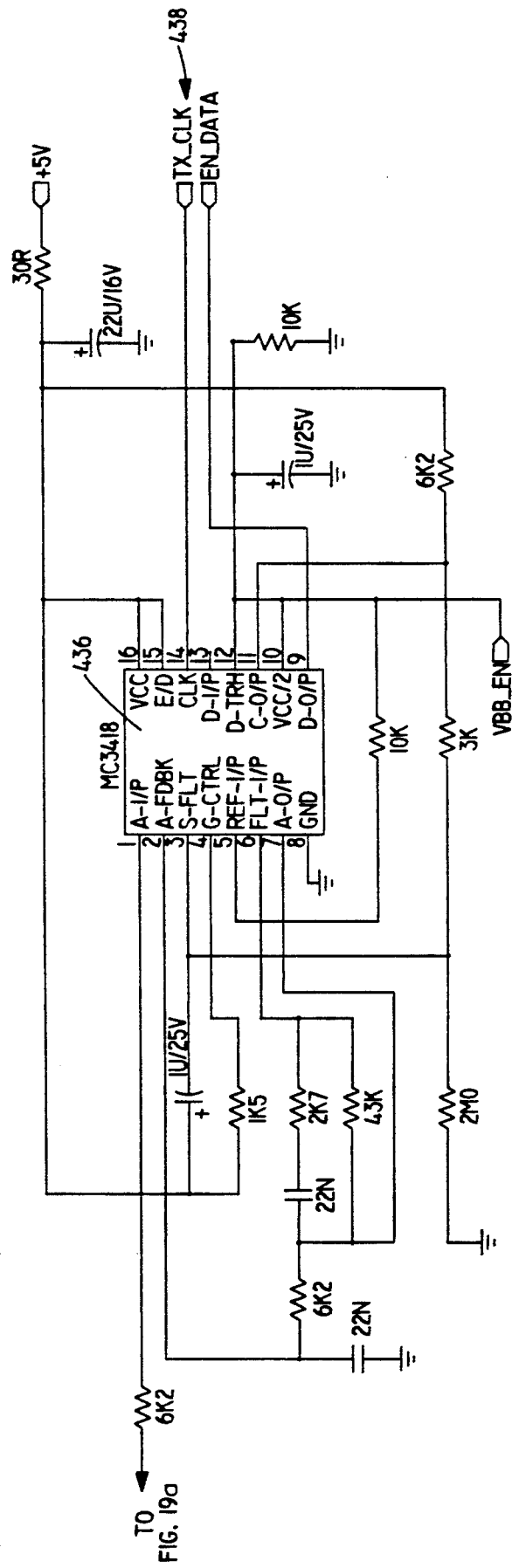
FIG. 19B of the drawings is a portion of a schematic circuit diagram of the analog-to-digital converter and digital-to-analog converter circuitry of the base unit.
Figure 19C:
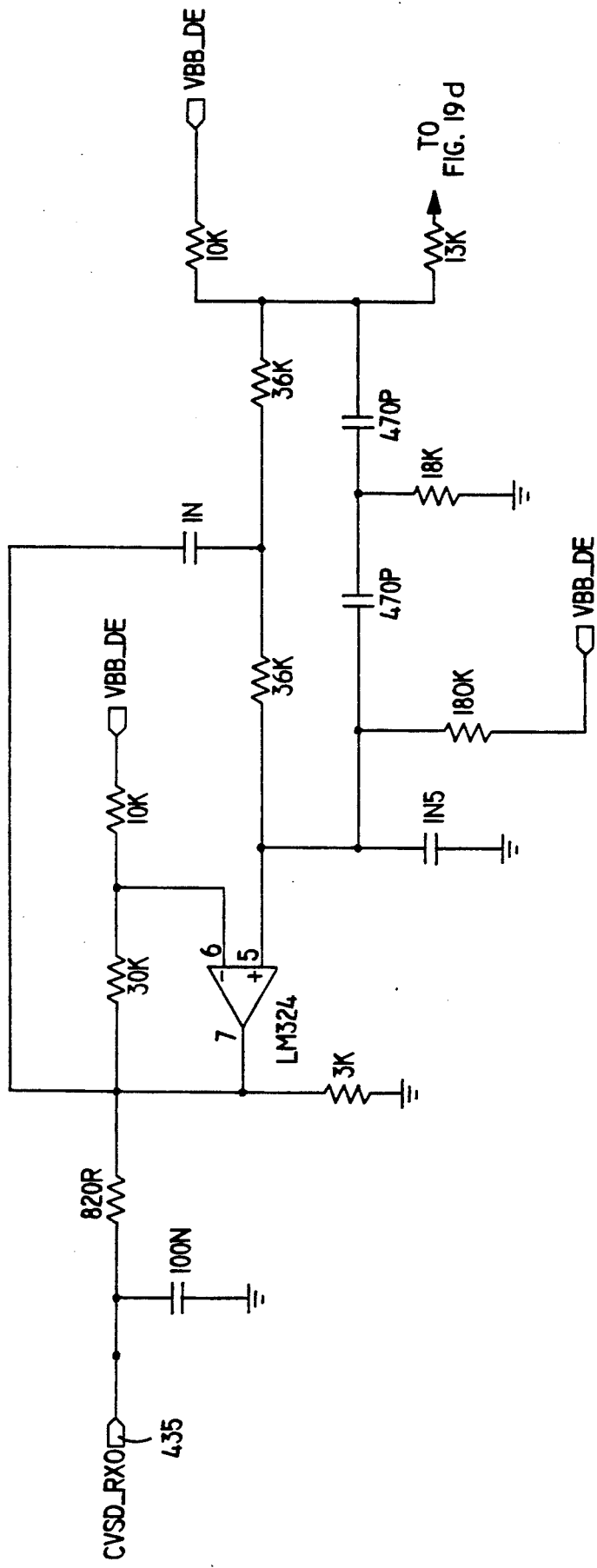
FIG. 19C of the drawings is a portion of a schematic circuit diagram of the analog-to-digital converter and digital-to-analog converter circuitry of the base unit.
Figure 19D:
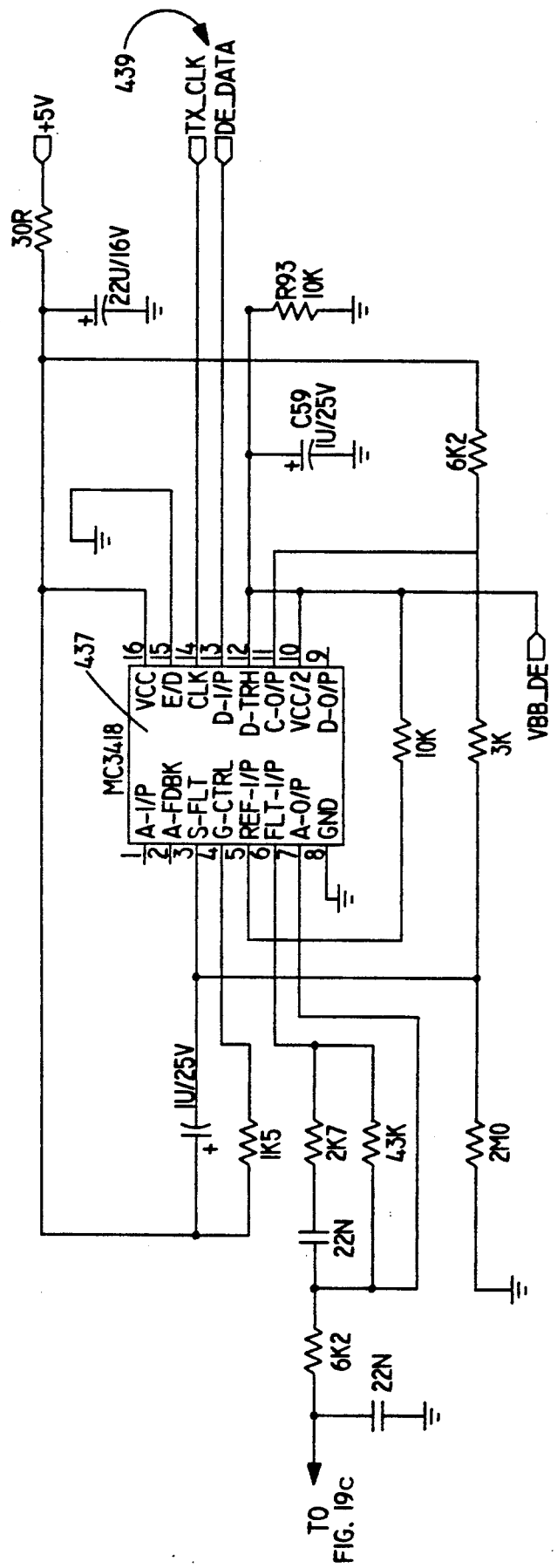
FIG. 19D of the drawings is a portion of a schematic circuit diagram of the analog-to-digital converter and digital-to-analog converter circuitry of the base unit.
Figure 20A:
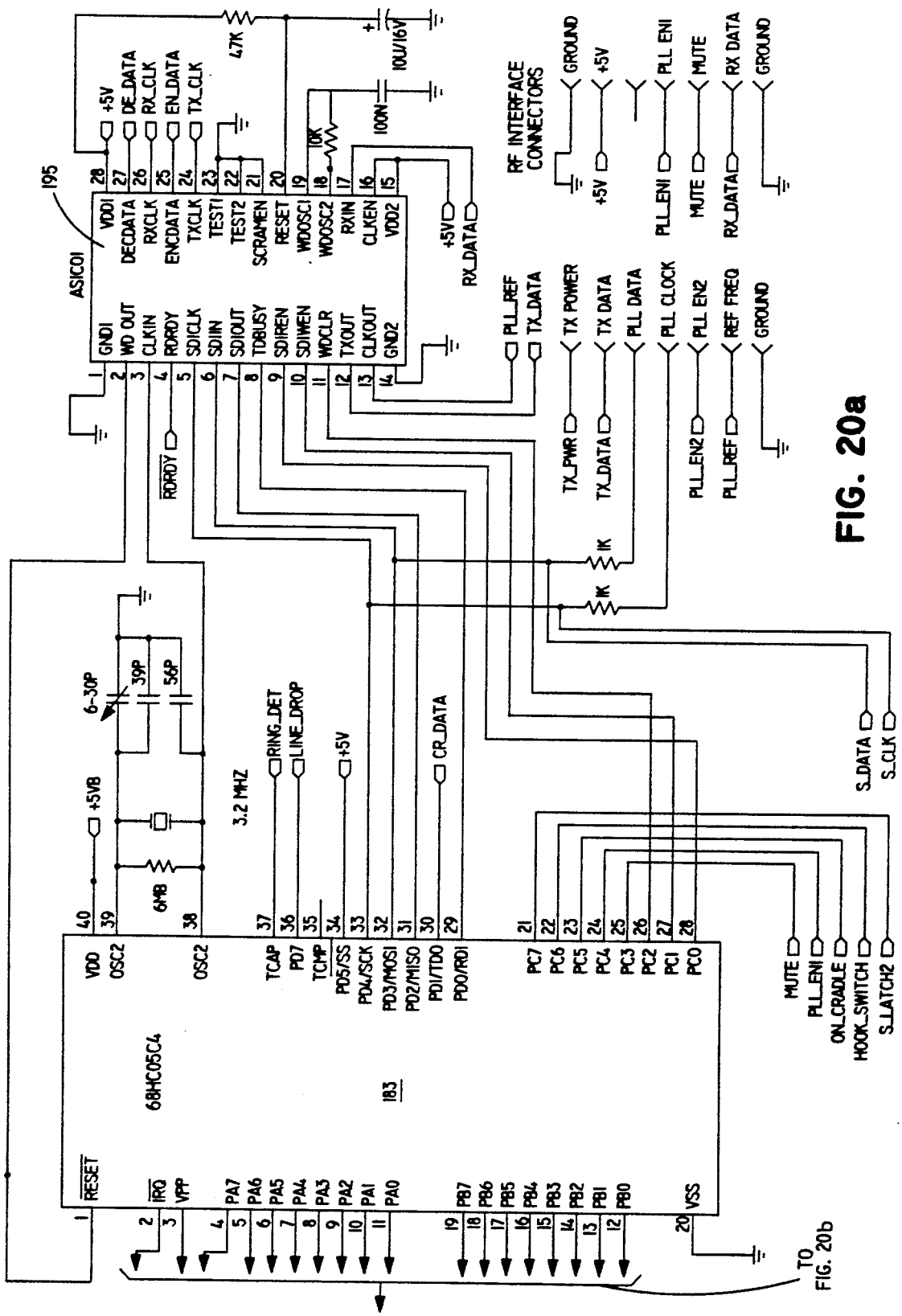
FIG. 20A of the drawings is a portion of a schematic circuit diagram of the microprocessor, command data-voice data interface, DTMF tone generator and on-cradle indicator circuit of the base unit.
Figure 20B:
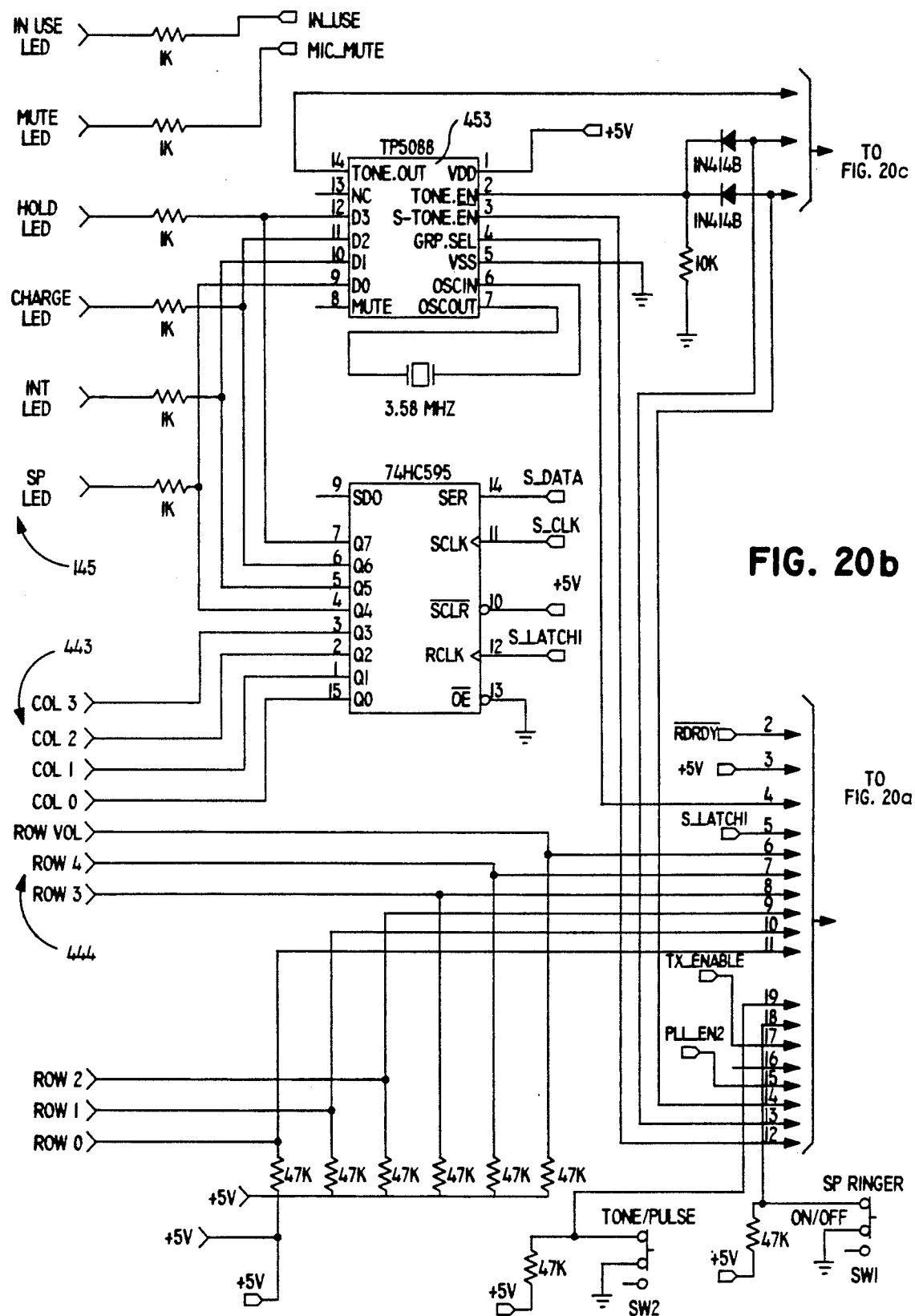
FIG. 20B of the drawings is a portion of a schematic circuit diagram of the microprocessor, command data-voice data interface, DTMF tone generator and on-cradle indicator circuit of the base unit.
Figure 20C:
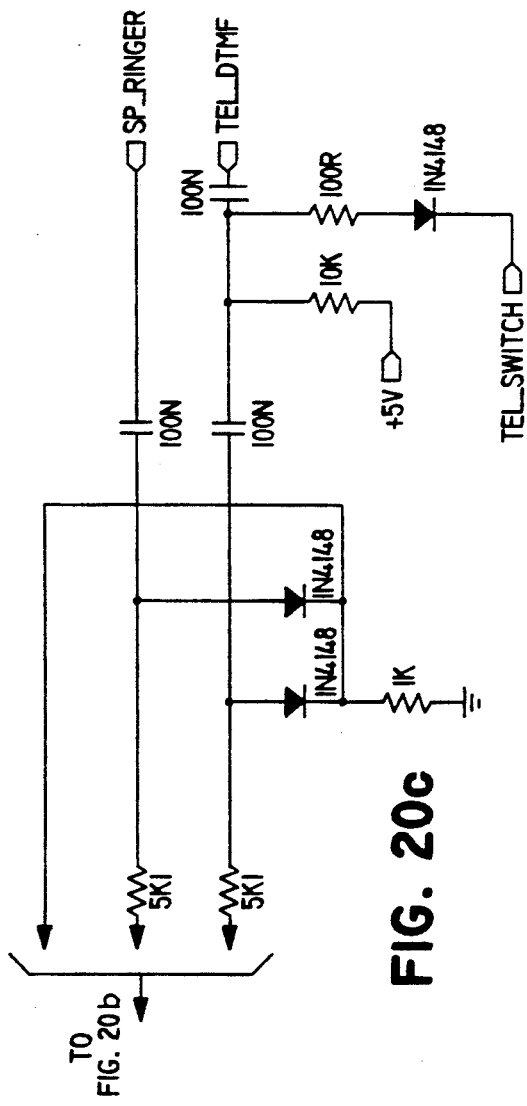
FIG. 20C of the drawings in a portion of a schematic circuit diagram of the microprocessor, command data-voice data interface, DTMF tone generator and on-cradle indicator circuit of the base unit.
Figure 20D:
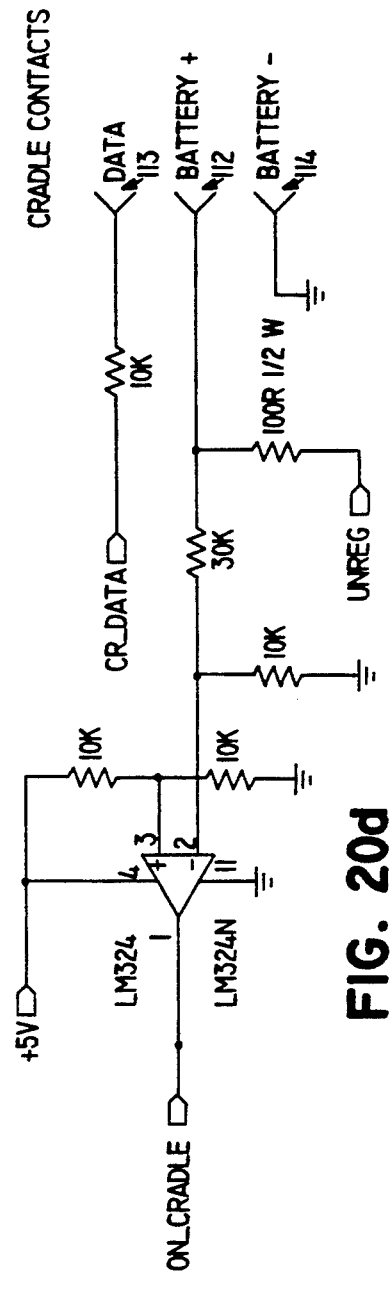
FIG. 20D of the drawings is a portion of a schematic circuit diagram of the microprocessor, command data-voice data interface, DTMF tone generator and on-cradle indicator circuit of the base unit.

FIG. 18 of the drawings is schematic circuit diagram of the speakerphone and hybrid which drives microphone 451 and speaker 452 which together form speakerphone 116. As with FIG. 17, FIG. 18 discloses a conventional speakerphone and hybrid readily understandable by those skilled in the art.

FIG. 19 of the drawings are the schematic circuit diagrams of the delta modulator (analog-to-digital converter) and demodulator (digital-to-analog converter) of base unit 110 and illustrate the minor changes made thereto when resident in base unit 110.

FIG. 20 of the drawings illustrates microprocessor 183 and command data-voice data interface 195 as installed in base unit 110. Further illustrated is DTMF tone generator 453, power con tacts 112, 114 and data contact 113.

Figure 21A:
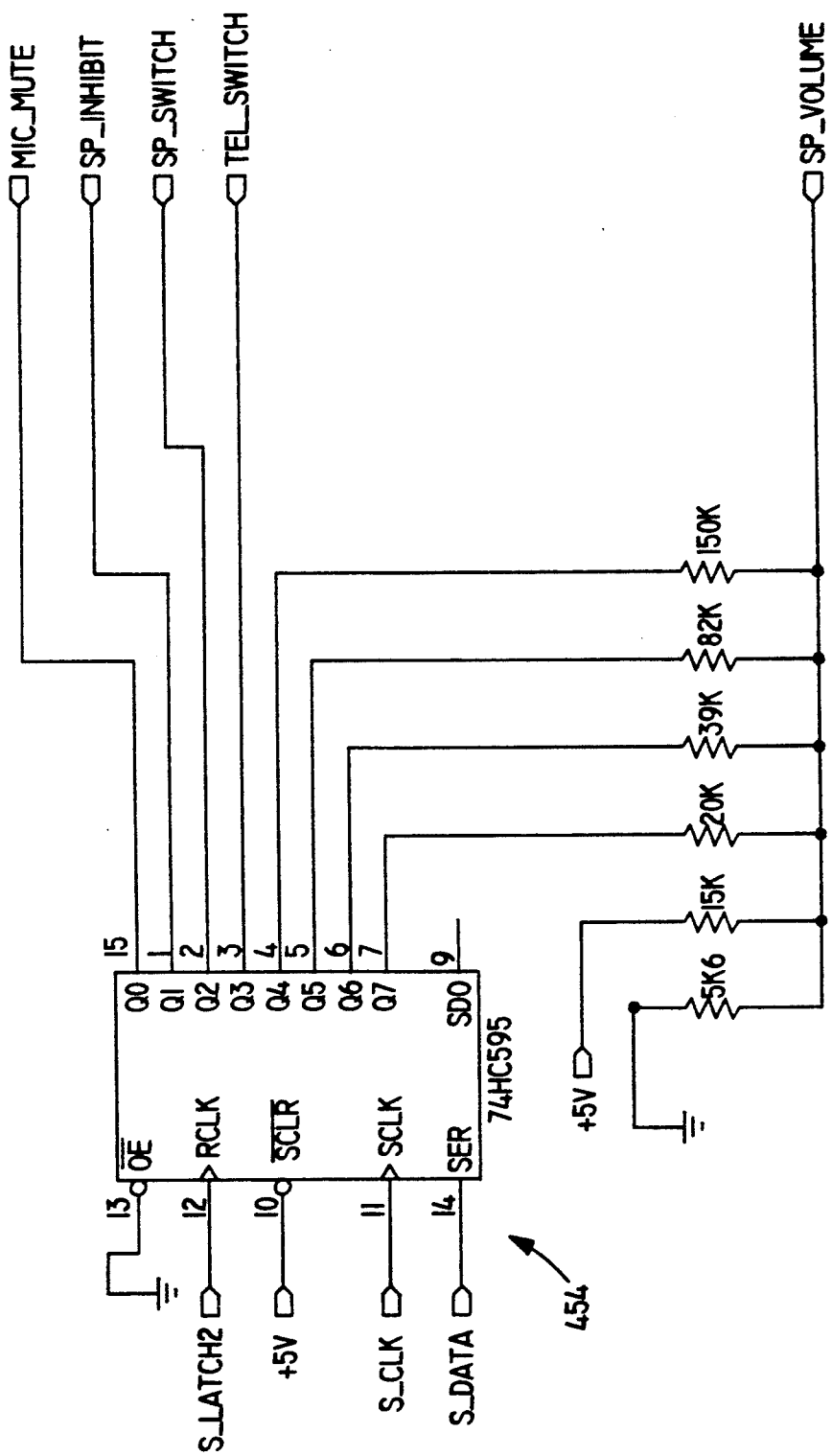
FIG. 21A of the drawings is a portion of a schematic circuit diagram of the volume control and power regulator circuits of the base unit.
Figure 21B:
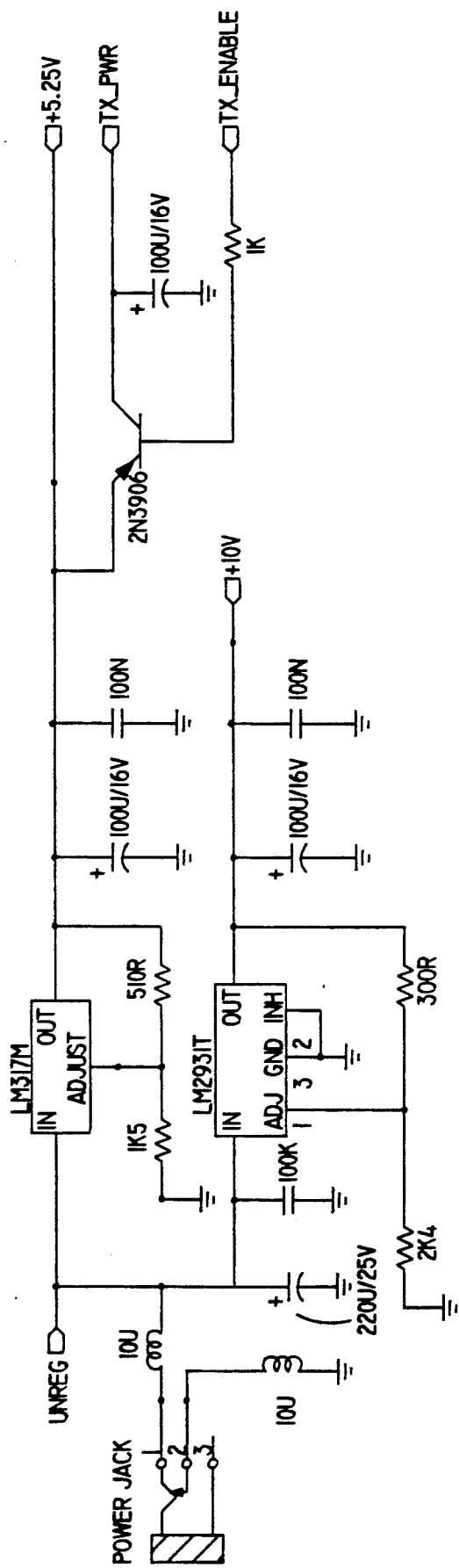
FIG. 21B of the drawings is a portion of a schematic circuit diagram of the volume control and power regulator circuits of the base unit.

FIG. 21 of the drawings illustrates the schematic circuit diagrams for digital volume control 454 as well as voltage regulator circuit 456 for providing power to the componentry of base unit 110.

The foregoing discussion and description of drawings while relevant to the flow of digital voice data also applies to the flow of digital command data through handset unit 101. The following description of FIGS. 22–35 further illustrate and describe the flow of digital command data through handset unit 101.

Figure 22A:
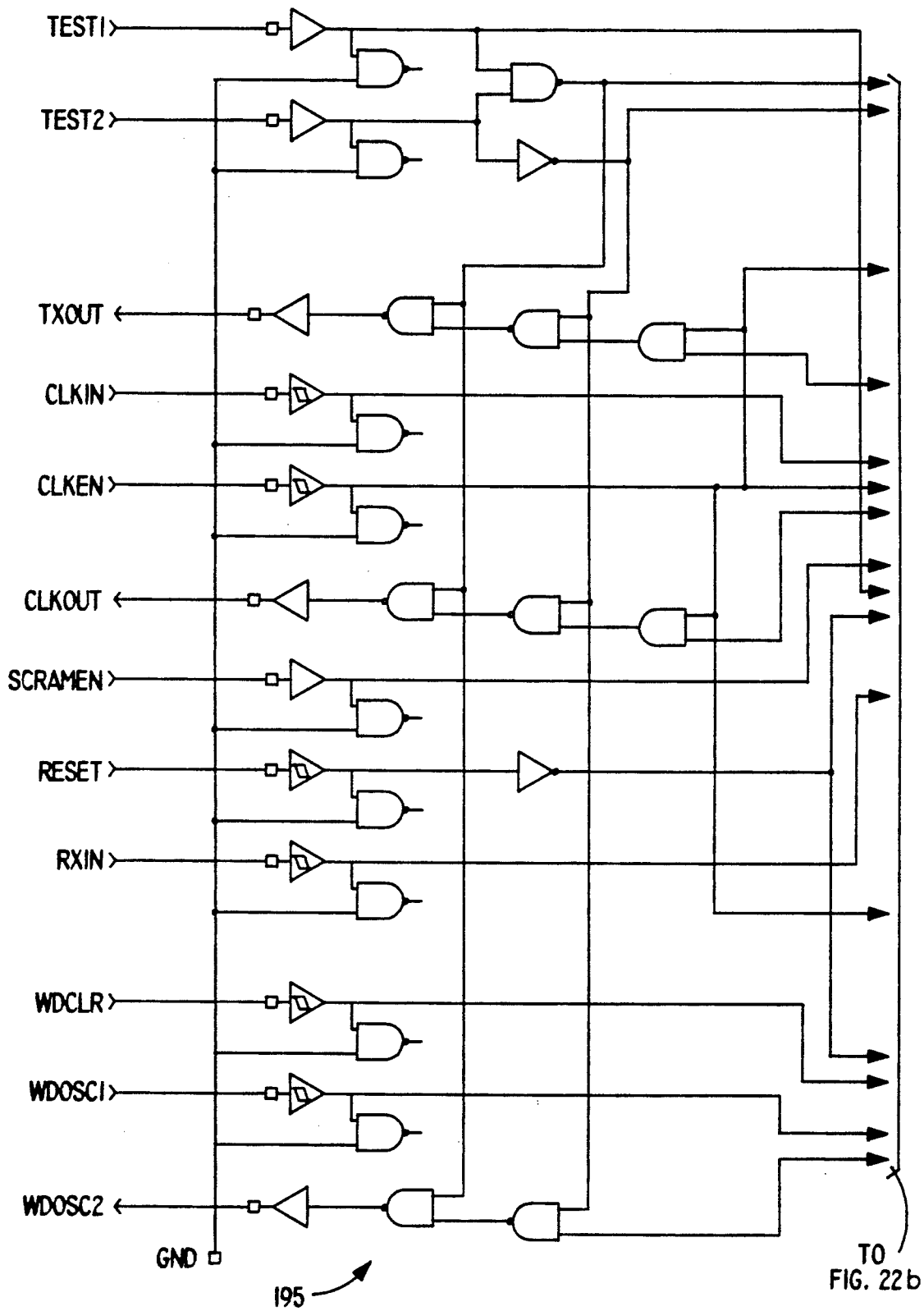
FIG. 22A of the drawings is a portion of a schematic block diagram of the command data-voice data interface implemented as an application specific integrated circuit, and watchdog timer.
Figure 22B:
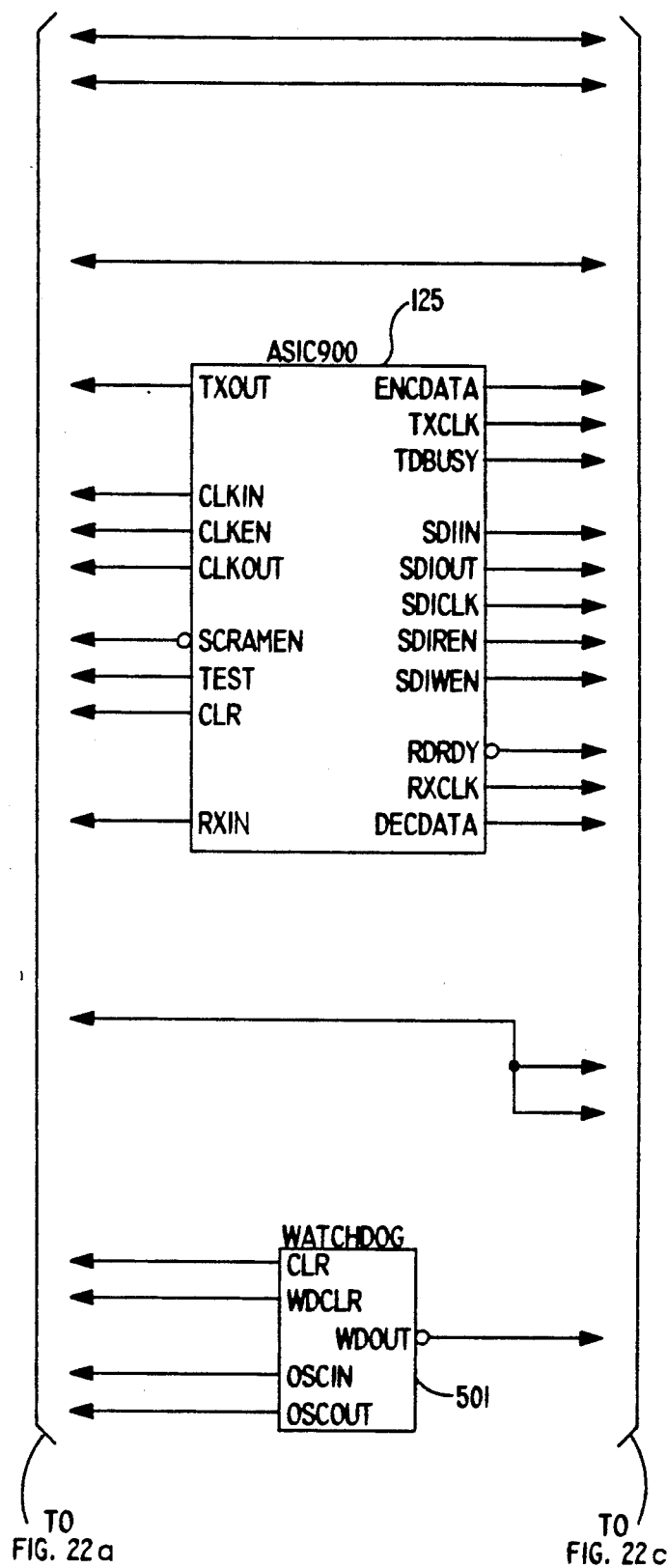
FIG. 22B of the drawings is a portion of a schematic block diagram of the command data-voice data interface implemented as an application specific integrated circuit, and watchdog timer.
Figure 22C:
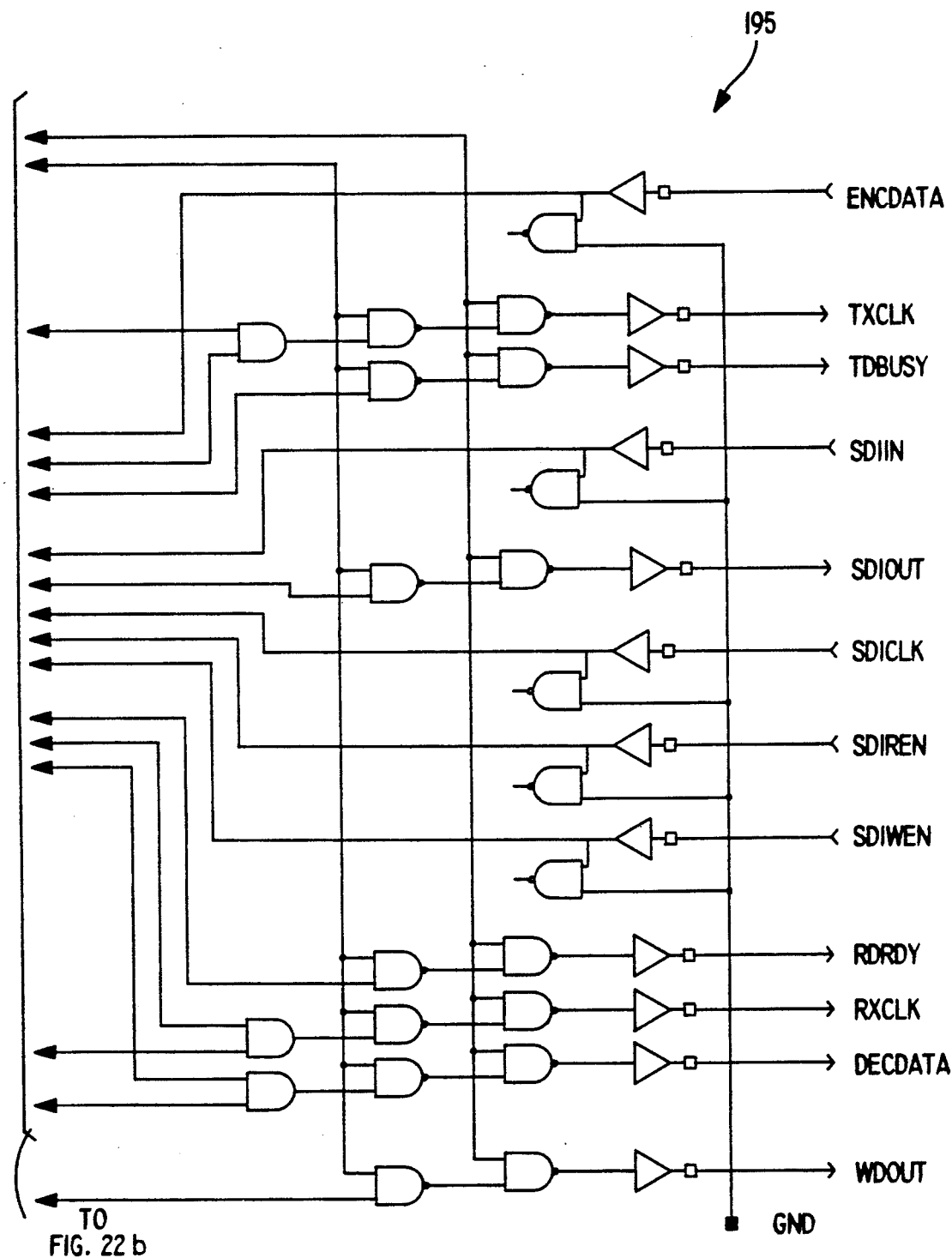
FIG. 22C of the drawings is a portion of a schematic block diagram of the command data-voice data interface implemented as an application specific integrated circuit, and watchdog timer.

FIG. 22 of the drawings is a schematic circuit diagram of the command data - voice data interface circuit 125 which in the present invention is fabricated as an application specific integrated circuit 195. In the present apparatus 100, the functions of scrambling, descrambling, and data and clock recovery and digital command data communication are performed by this single integrated circuit. FIG. 22 illustrates a watchdog timer 501 whose function is in part to provide an escape in the event that microprocessor 183 "hangs up". In such event, watchdog timer 501 will time out and cause a reset of microprocessor 183 thereby reinitializing the software. While this will result in any call in progress being disconnected it does serve to obviate the need for the user to return to base unit 110 to perform a manual reset.

In addition, watchdog timer 501 performs an essential function relative the power saving mode. The software of handset 101 is designed to place the unit into a power saving mode whenever a call is not in progress or handset 101 is placed in the phone off mode by the user pressing off key 223. By shutting down microprocessor 183 there results a saving of power thus extending the battery life. Watchdog timer 501 causes microprocessor 183 to periodically "wake up" to look to see if the user has depressed keypad 104, if there is an incoming call from base unit 110 or if a link check command has been received. Watchdog timer 501 may functioning a en percent duty cycle, thus waking the microprocessor once a second for a tenth of a second.

Figure 24A:
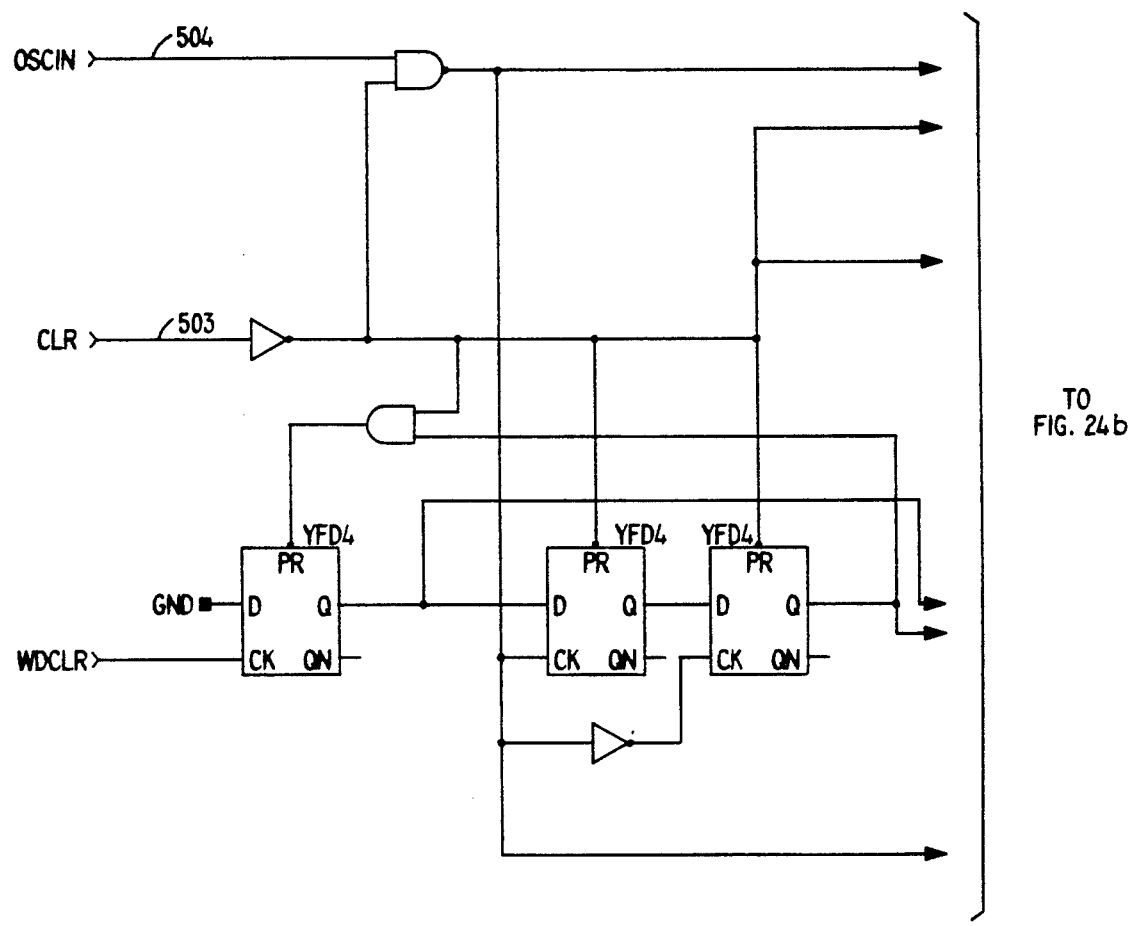
FIG. 24A of the drawings is a portion of a schematic circuit diagram of the watchdog timer.
Figure 24B:
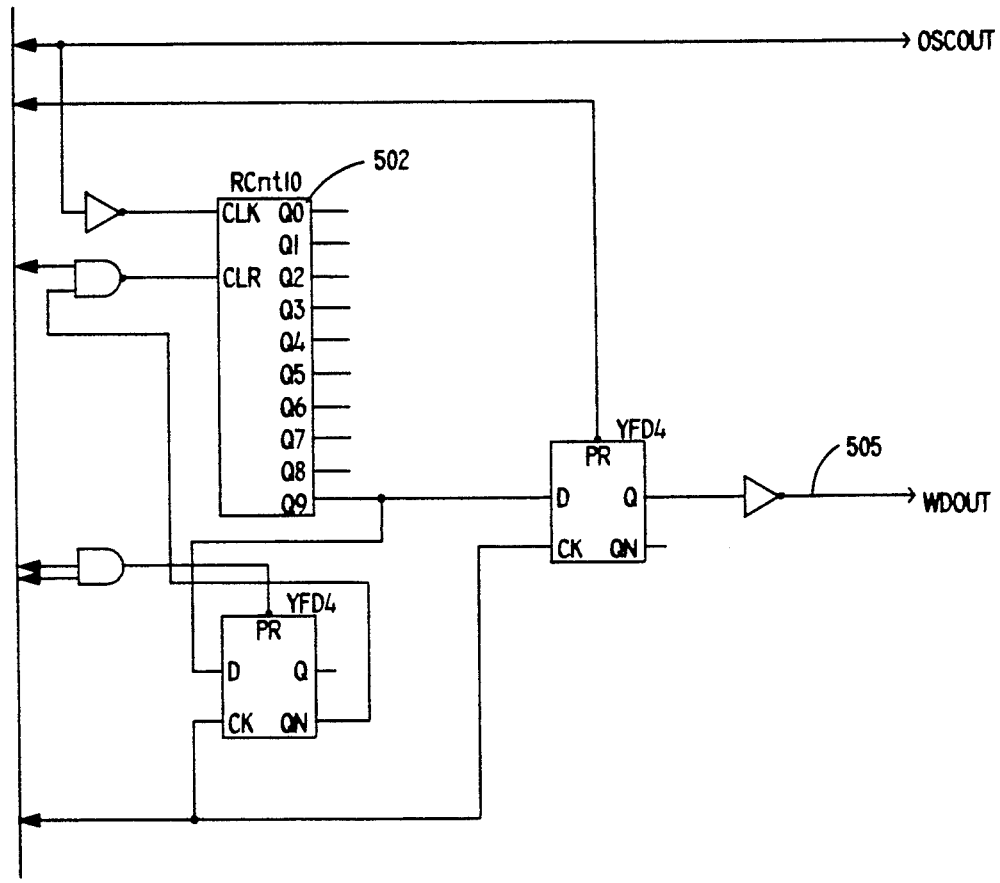
FIG. 24B of the drawings is a portion of a schematic circuit diagram of the watchdog timer.

The circuit for watchdog timer 501 is illustrated in FIG. 24. In operation watchdog timer 501 utilizes an oscillator clock signal on line 504 to drive counter 502 which counts from zero to five hundred twelve. Counter 502 is a ten bit ripple counter designated RCnt10. If counter 502 gets to five hundred twelve the microprocessor is reset by line 505. If counter 502 is cleared by line 503 before counter 502 gets to five hundred twelve the reset will not occur and the counter resets to zero. A clear is signaled when a call is in progress with the software in microprocessor 183 serving to reset counter 502 periodically and prevent a microprocessor reset from occurring. Accordingly if the microprocessor gets hung up counter 502 will time out and a rest will occur but if a call is in progress or some other active function is taking place the counter 502 will be reset to zero before a time out can occur and no master reset will take place.

Figure 23A:
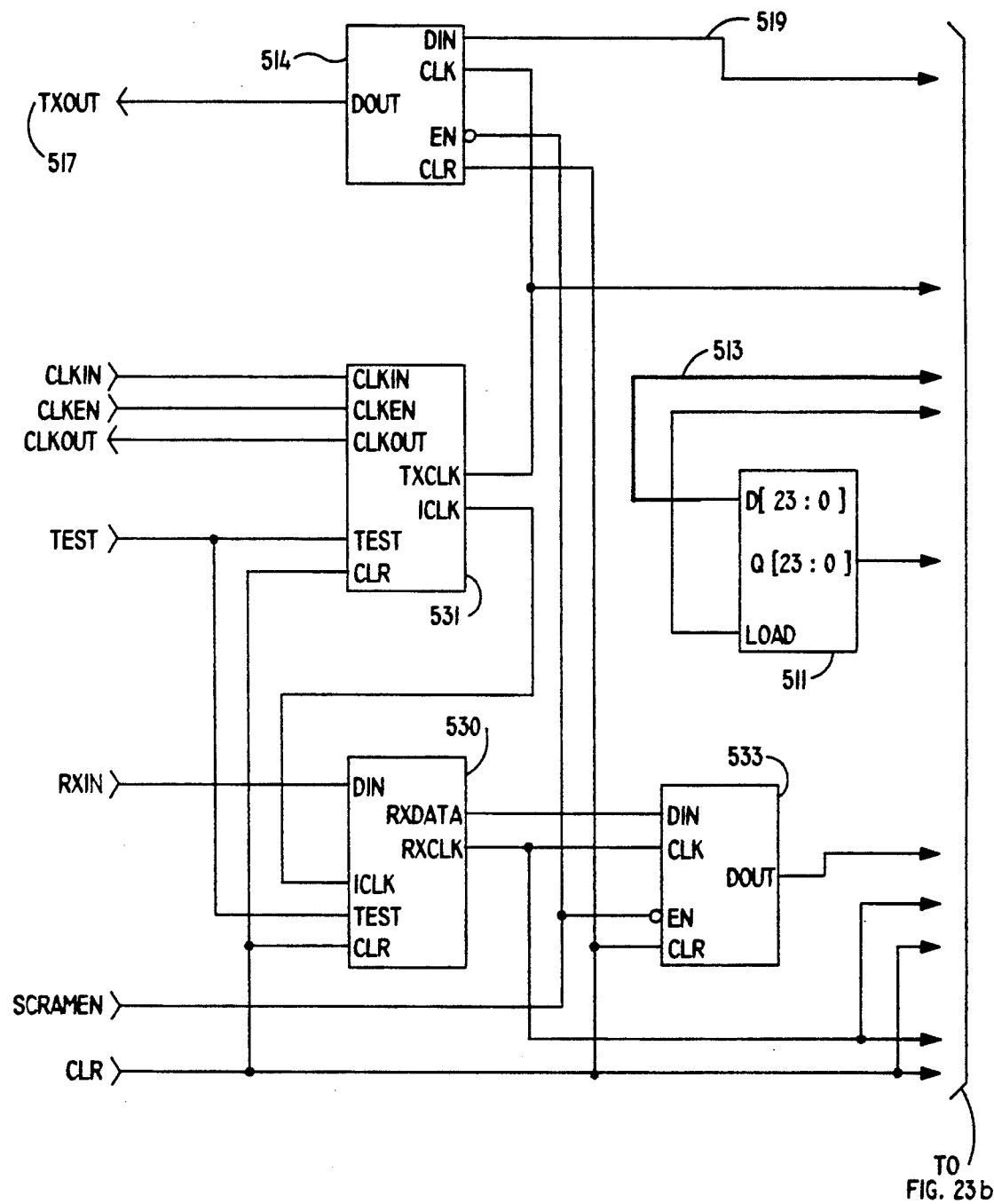
FIG. 23A of the drawings is a portion of a schematic block diagram of the command data-voice data interface.
Figure 23B:
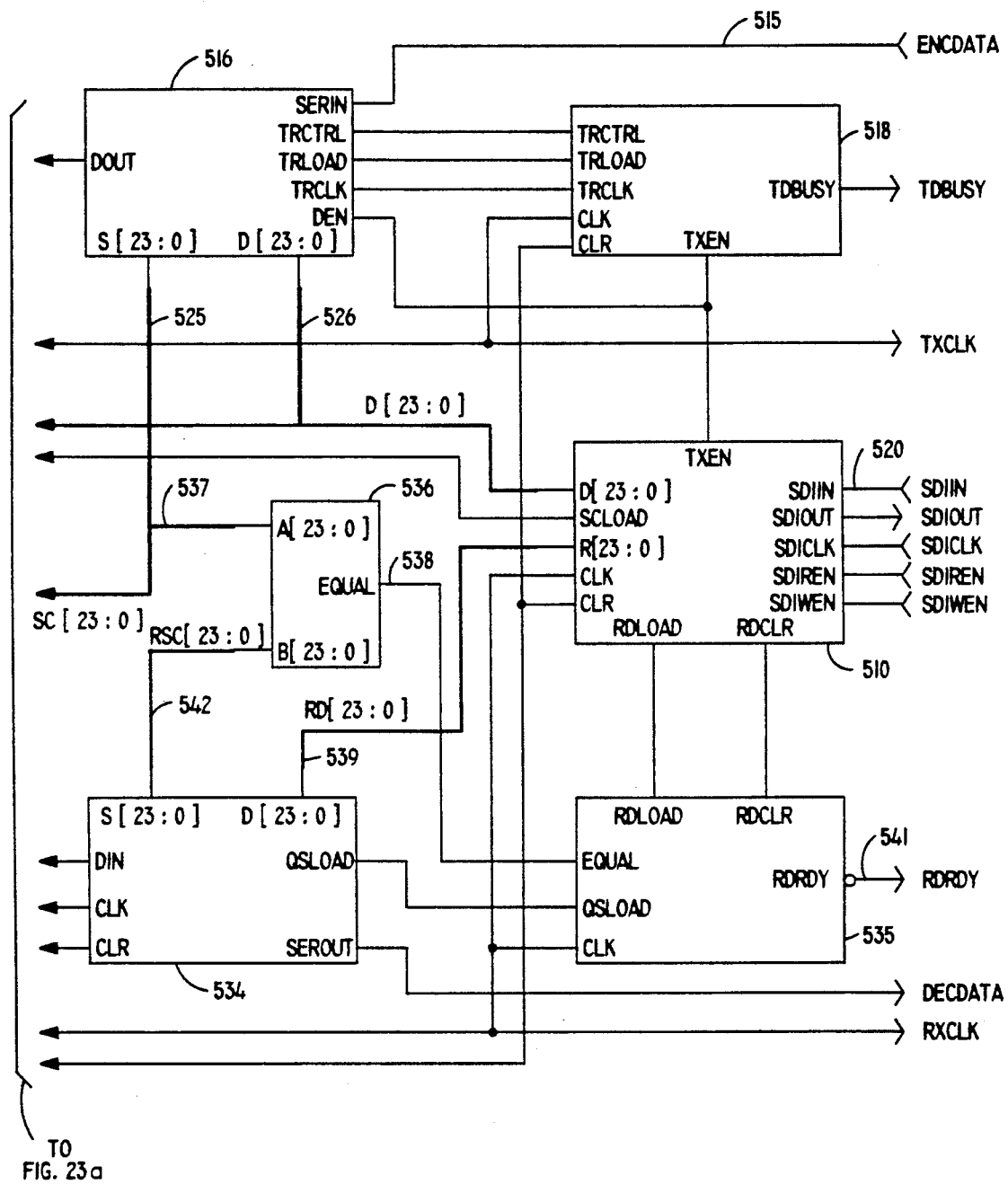
FIG. 23B of the drawings is a portion of a schematic block diagram of the command data-voice data interface.

The remainder of command data - voice data interface 125 resides in block 502 the diagram of which is illustrated in FIG. 23. Functionally the circuitry of FIG. 23 serves to detect the presence of a command data packet, capture the digital command data and replace the command data packet with a silence data sequence as well as to interrupt the flow of digital voice data and insert a command data packet for transmission to the target unit.

Figure 25A:
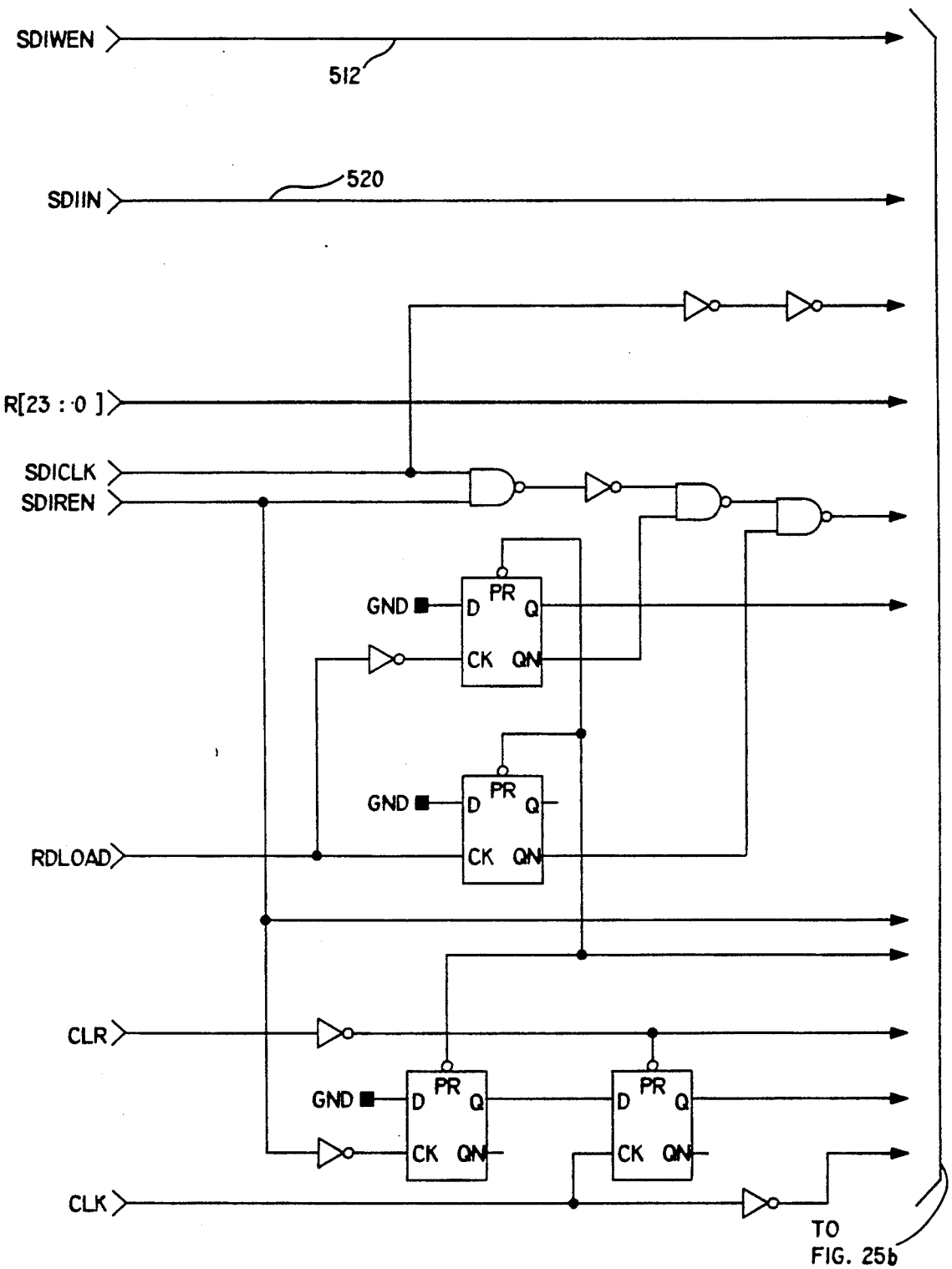
FIG. 25A of the drawings is a portion of a schematic circuit diagram of the microprocessor interface of the command data-voice data interface.
Figure 25B:
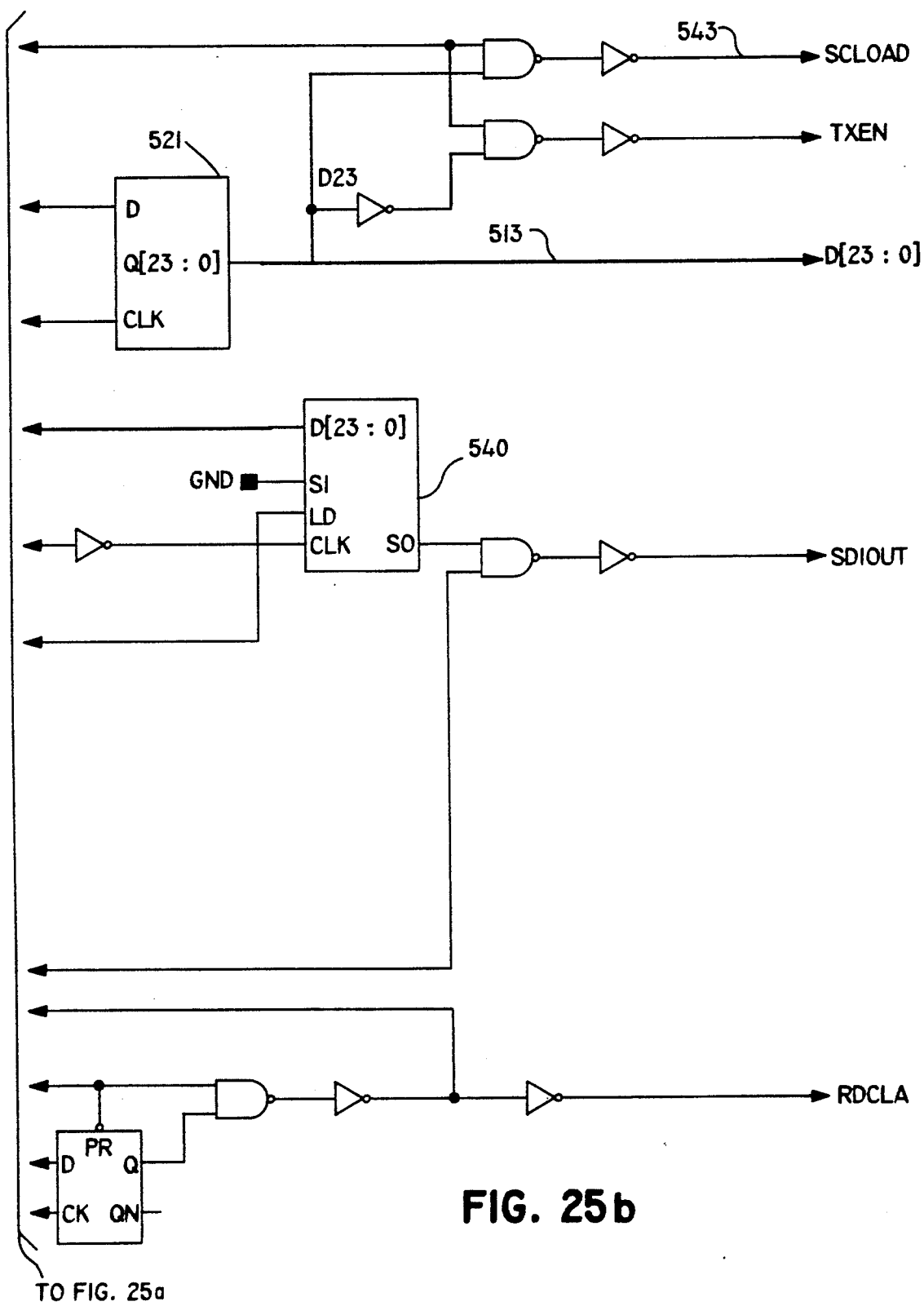
FIG. 25B of the drawings is a portion of a schematic circuit diagram of the microprocessor interface of the command data-voice data interface.
Figure 26:
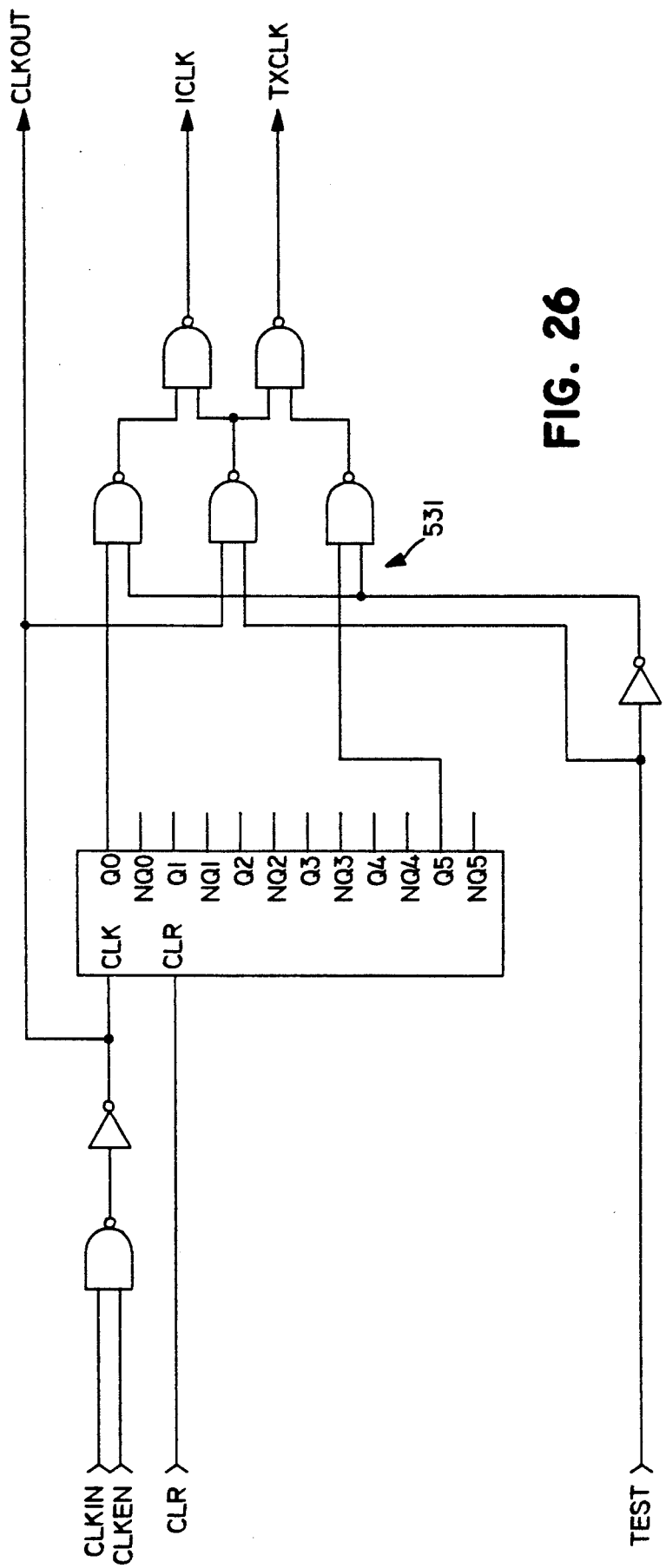
FIG. 26 of the drawings is a schematic circuit diagram of the clock generator of the command data - voice data interface.
Figure 27A:
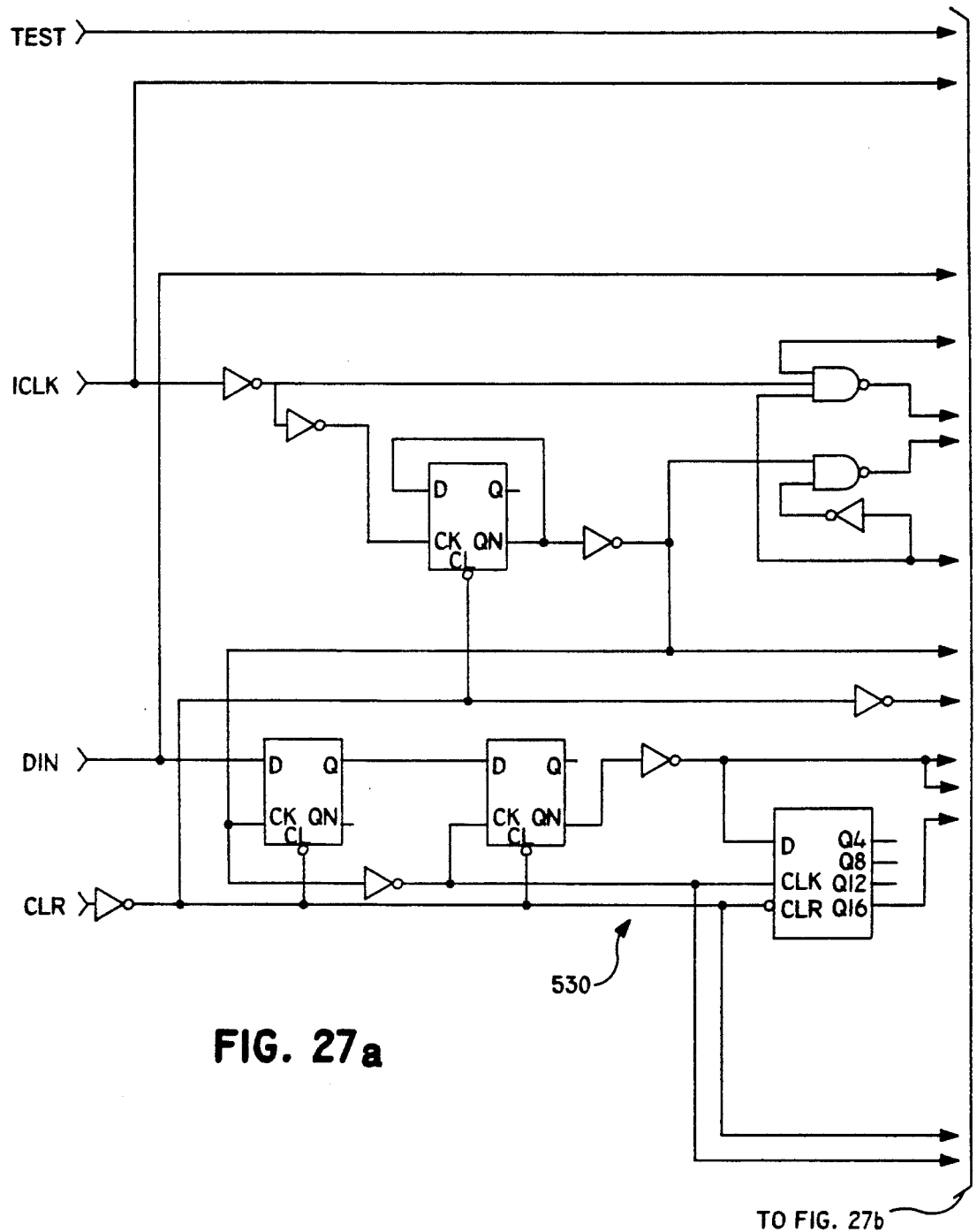
FIG. 27A of the drawings is a portion of a schematic circuit diagram of the clock data recovery circuitry of the command data - voice at interface.
Figure 27B:
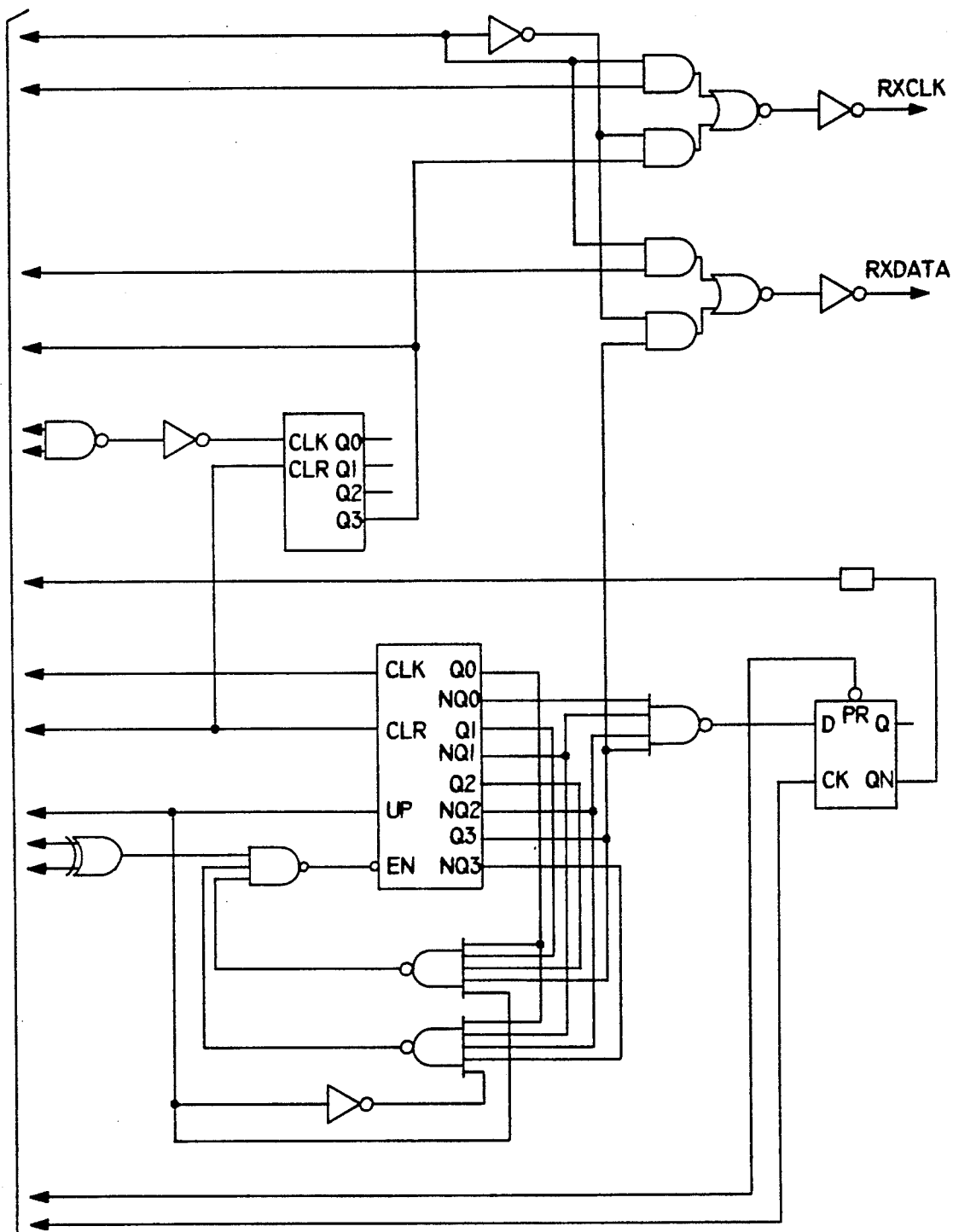
FIG. 27B of the drawings is a portion of a schematic circuit diagram of the clock data recovery circuitry of the command data-voice data interface.
Figure 28A:
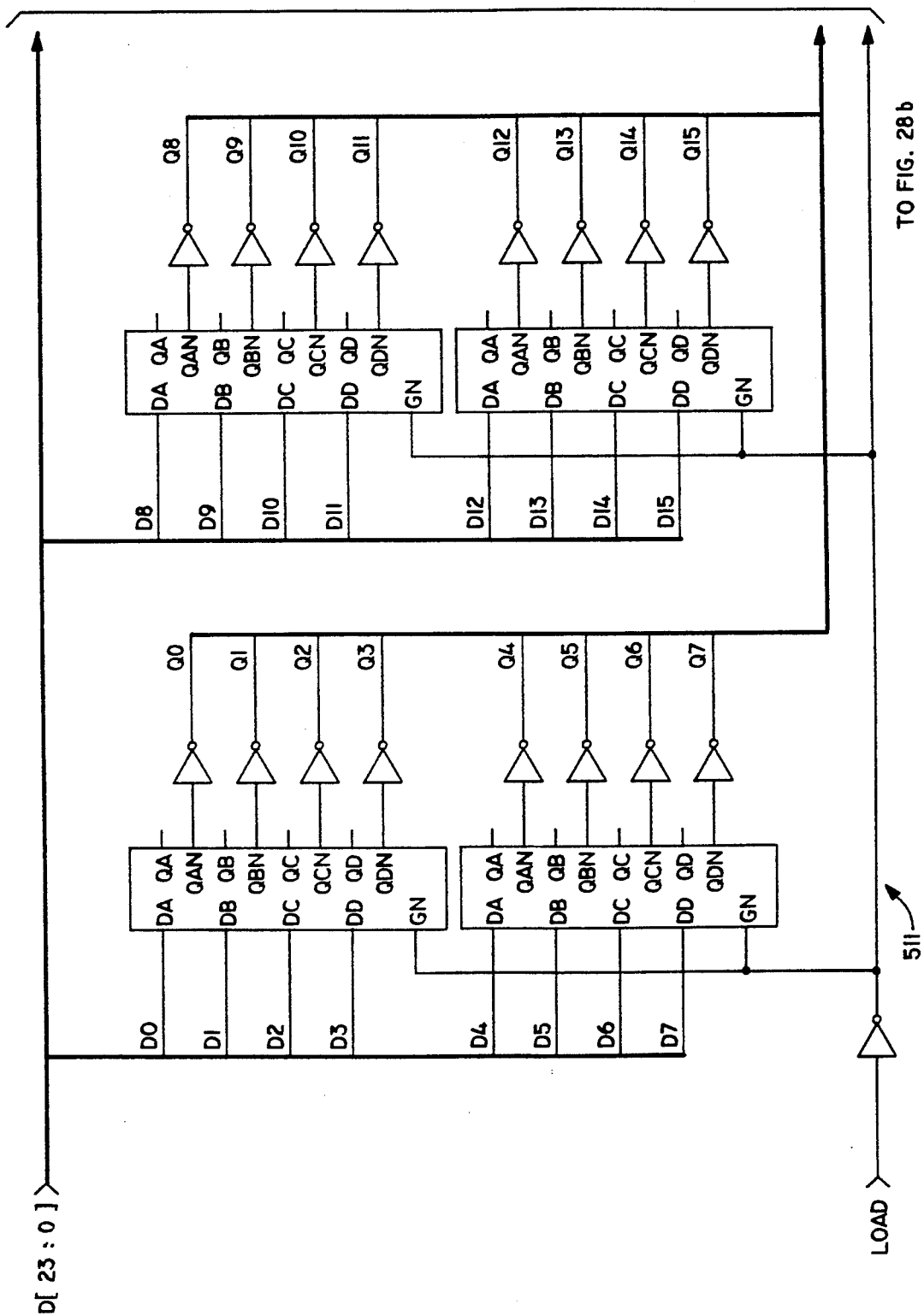
FIG. 28A of the drawings is a portion of a schematic circuit diagram of the security code register of the command data - voice data interface.

When handset unit 101 is placed in handset storage cradle 111, contact 107 abuts contact 113 and an initialization cycle is activated. The software resident in microprocessor 183 generates a twenty four bit security code (including a 8-bit preamble) which is loaded into security code resister 511 by microprocessor interface 510. The circuit diagram of microprocessor interface 510 is illustrated in FIG. 25. The security code is passed serially by microprocessor 183 into microprocessor interface 510 on SDIIN line 520 into twenty four bit shift register 521. All security codes begin with a "1" and all first data words begin with a "0". Microprocessor 183 toggles the write enable line SDIWEN 512 which combined with the preceding "1" toggles line SCLOAD 543 shown in FIG. 25 which loads the contents of twenty four bit shift register 521 into security code register 511 via Data bus 513. Thus, security code register 511 serves as the security code memory of handset 101. A diagram of security code register 511 is shown in FIG. 28.

Figure 30:
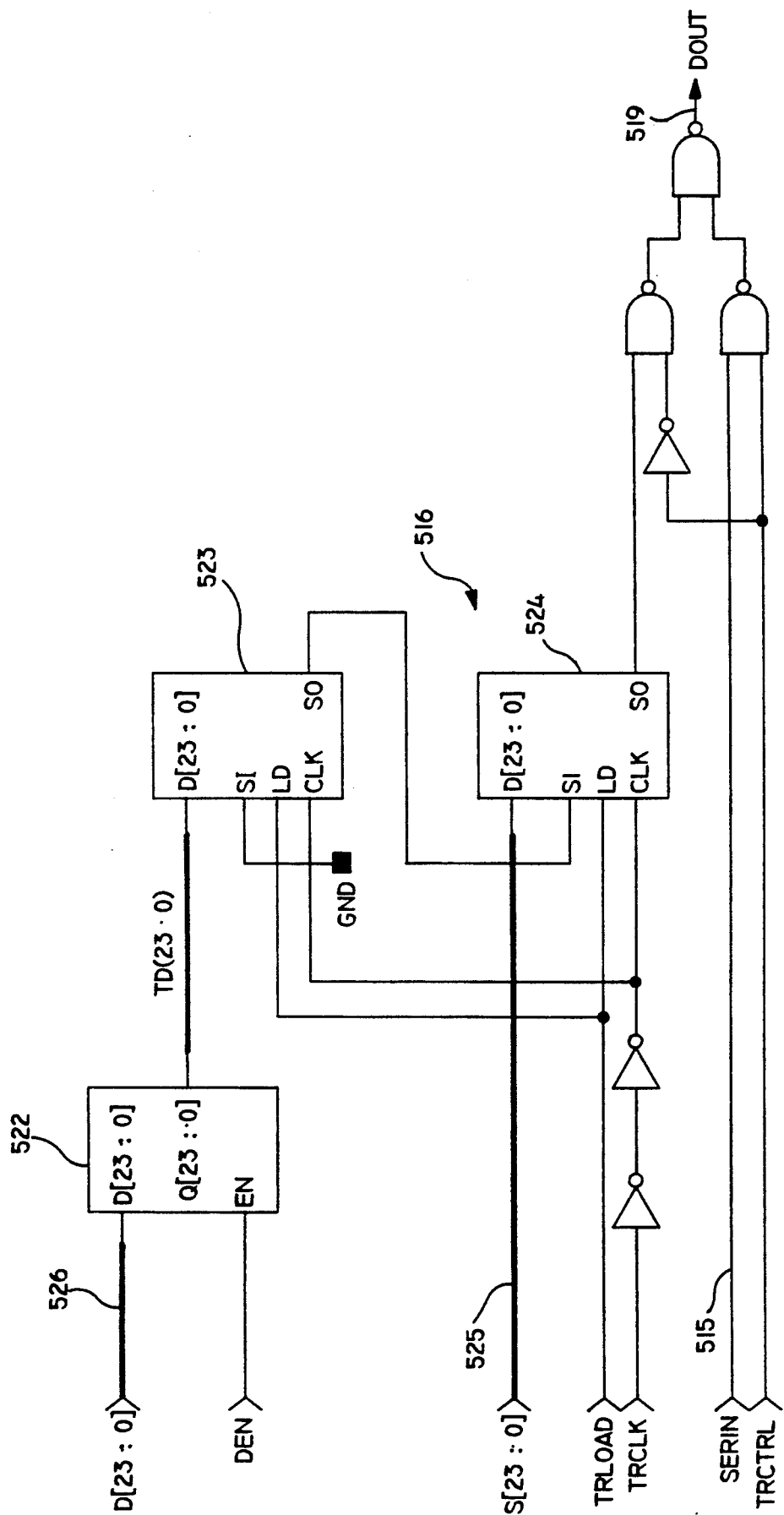
FIG. 30 of the drawings is a schematic circuit diagram of the transmitter register of the command data - voice data interface.
Figure 32:
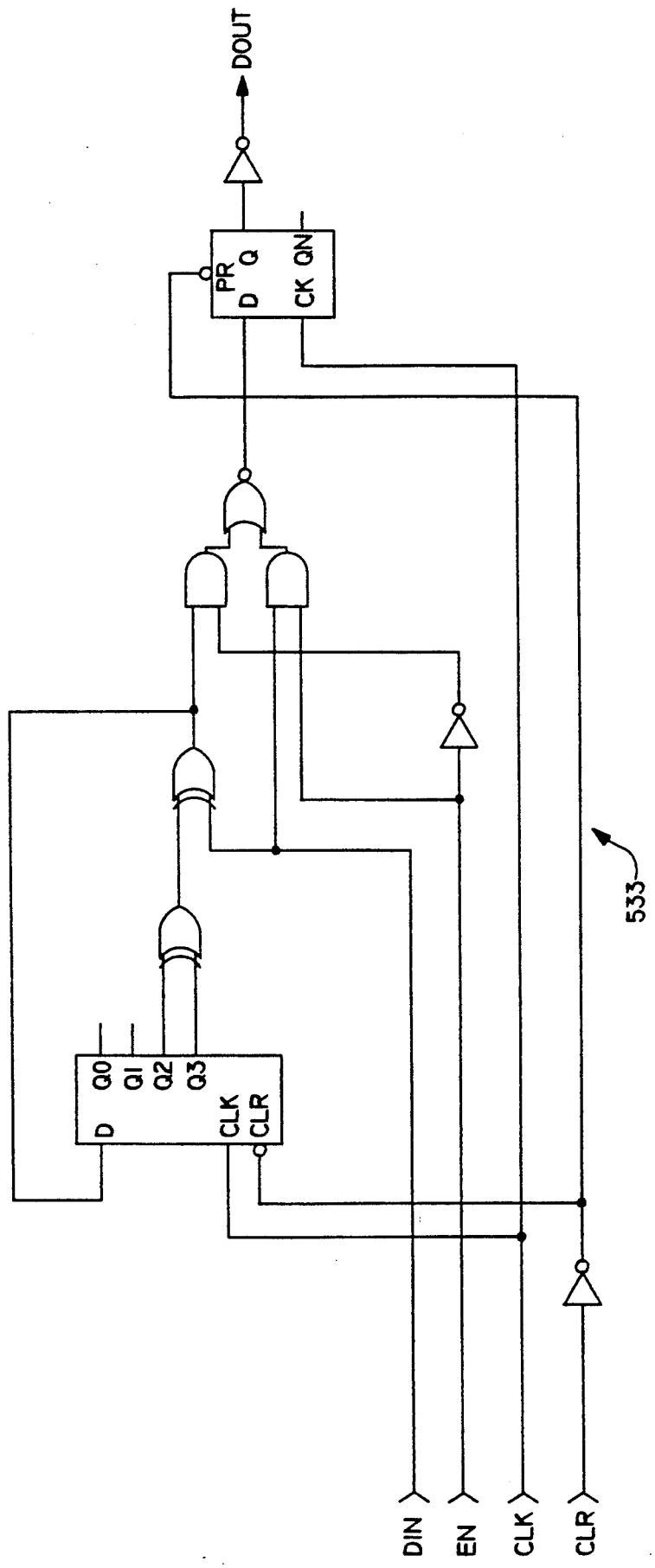
FIG. 32 of the drawings is a schematic circuit diagram of the scrambler circuitry of the command data - voice data interface.

During the transmission of digital voice data the command data - voice data interface 125 is essentially passive except for the scrambling function performed by scrambler 514. The output of analog-to-digital converter 142 enters interface 125 on ENCDATA line 515. The digitized voice data passes serially through transmitter register 516 to scrambler 514. A schematic diagram of the transmitter register 516 is shown in FIG. 30. The output of scrambler 514 is passed to VCO 145 on TXOUT line 517. Schematic diagram of scrambler 514 is shown in FIG. 32. Scrambler 514, and descrambler 533 are implemented to induce a "quasirandomness" to the digital data stream toward making it difficult to understand the data should it be intercepted. Scrambler 514 and descrambler 533 as implemented are self-synchronizing circuits.

Figure 29A:
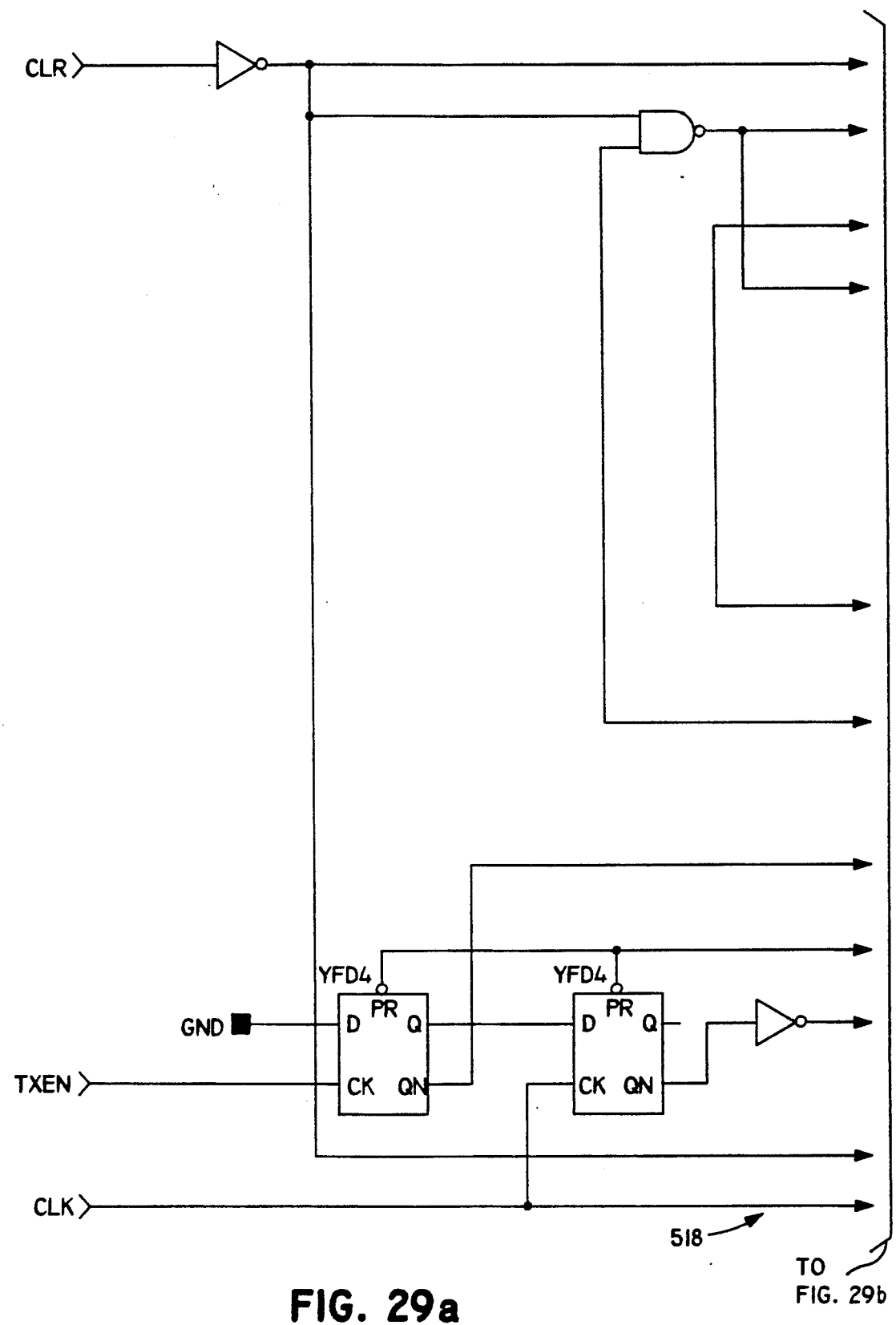
FIG. 29A of the drawings is a potion of a schematic circuit diagram of the transmitter register controller of the command data - voice data interface.
Figure 29B:
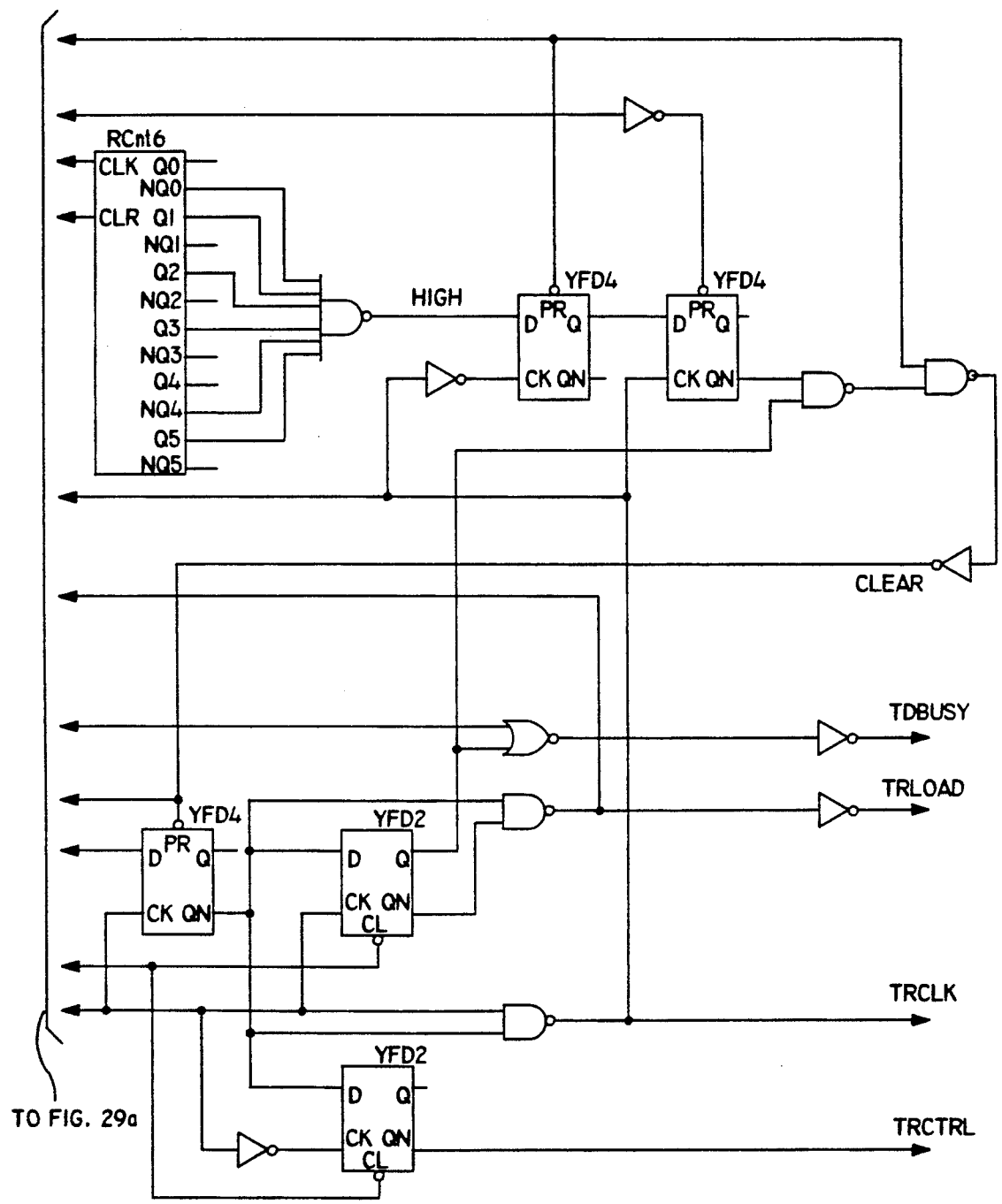
FIG. 29B of the drawings is a portion of a schematic circuit diagram of the transmitter resister controller of the command data - voice data interface.

When the user has actuated a command which requires a command data packet to be transmitted to the target unit microprocessor 183 serially shifts the twenty four bit command data (eight bits repeated three times) into shift register 521 upon toggling of SDIWEN serial data write enable line 512. The incoming twenty four bit word is recognized as command data since the initial bit is a "0" whereas security codes begins with a "1". Transmitter register controller 518 is activated to control transmitter register 516. The circuit diagrams of transmitter controller 518 and transmitter register 516 are illustrated in FIGS. 29 and 30 respectively. The security code stored in security code register 511 is retrieved by transmitter register 516 via bus 525 towards forming the first twenty four bits of the forty eight bit command data packet. The last twenty four bits of the command data packet are formed from the command data stored in shift register 521 in microprocessor interface 510. The command data is transferred into twenty four bit latch 522 of transmitter register 516 and in turn transferred into register 523 a parallel loading twenty four bit shift register. With the security code stored in shift register 524 and the command data stored in shift register 523 transmitter controller 518 generates forty eight clock cycles and serially shifts the security code and command data out on DOUT line 519 to scrambler 514 thus inserting into the steam of digital voice data the forty eight bit command data packet.

Transmitter controller 518 effectively turns off the incoming stream of digital voice data. Since the voice data is clocked at a high rate the "loss" of forty eight bits of digital voice data results in only a one millisecond dropout of the voice. Such a small dropout goes unnoticed by the user.

Figure 31:
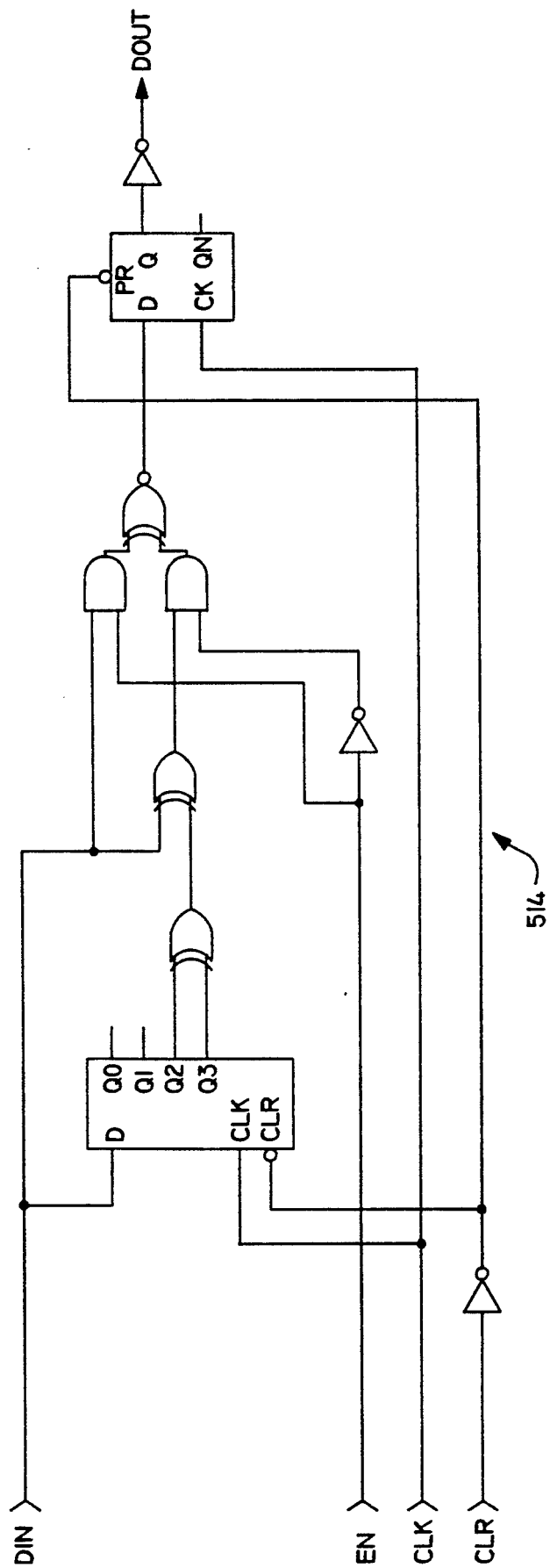
FIG. 31 of the drawings is a schematic circuit diagram of the descrambled circuitry of the command data - voice data interface.
Figure 34A:
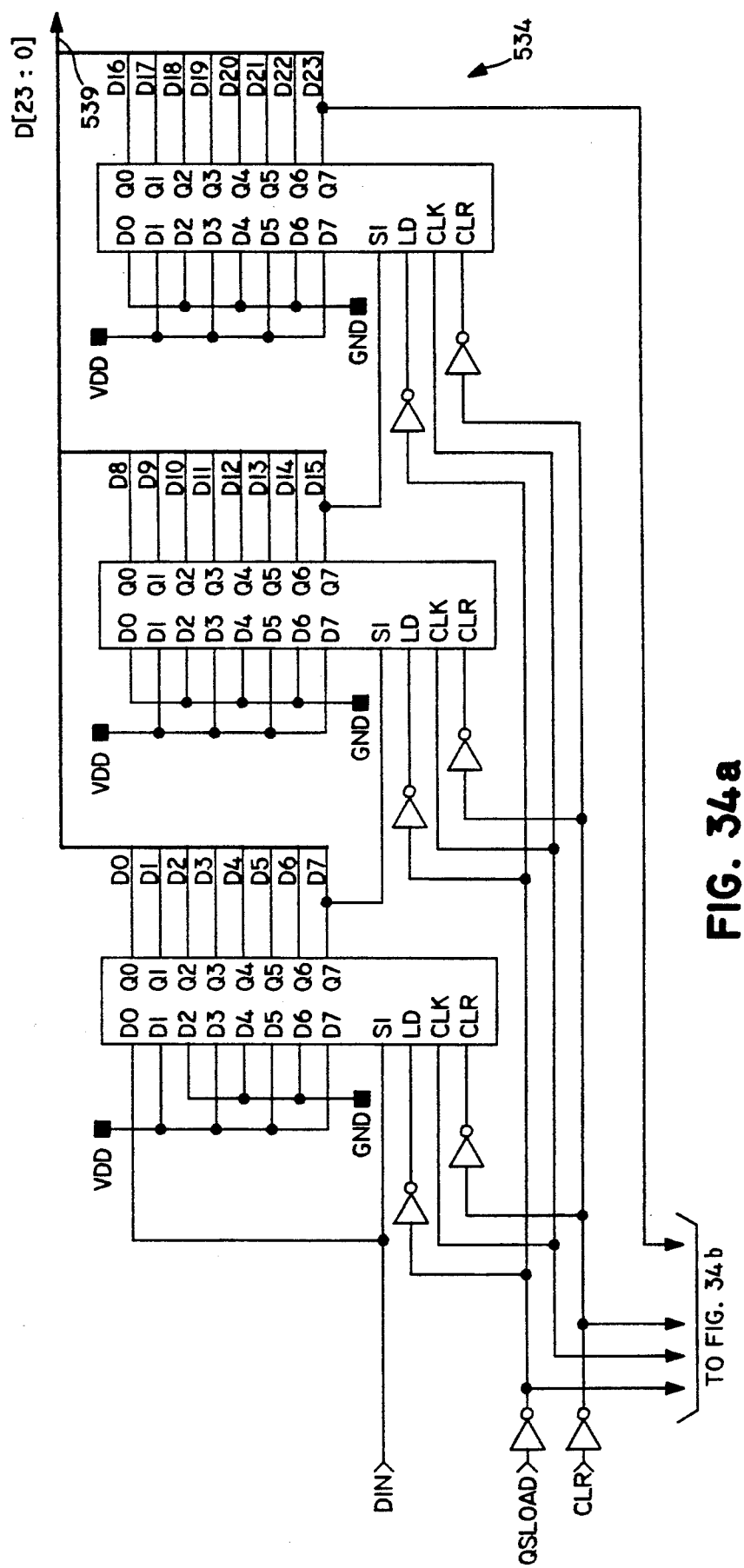
FIG. 34A of the drawings is a portion of a schematic circuit diagram of the receiver register of the command data - voice data interface.
Figure 34B:
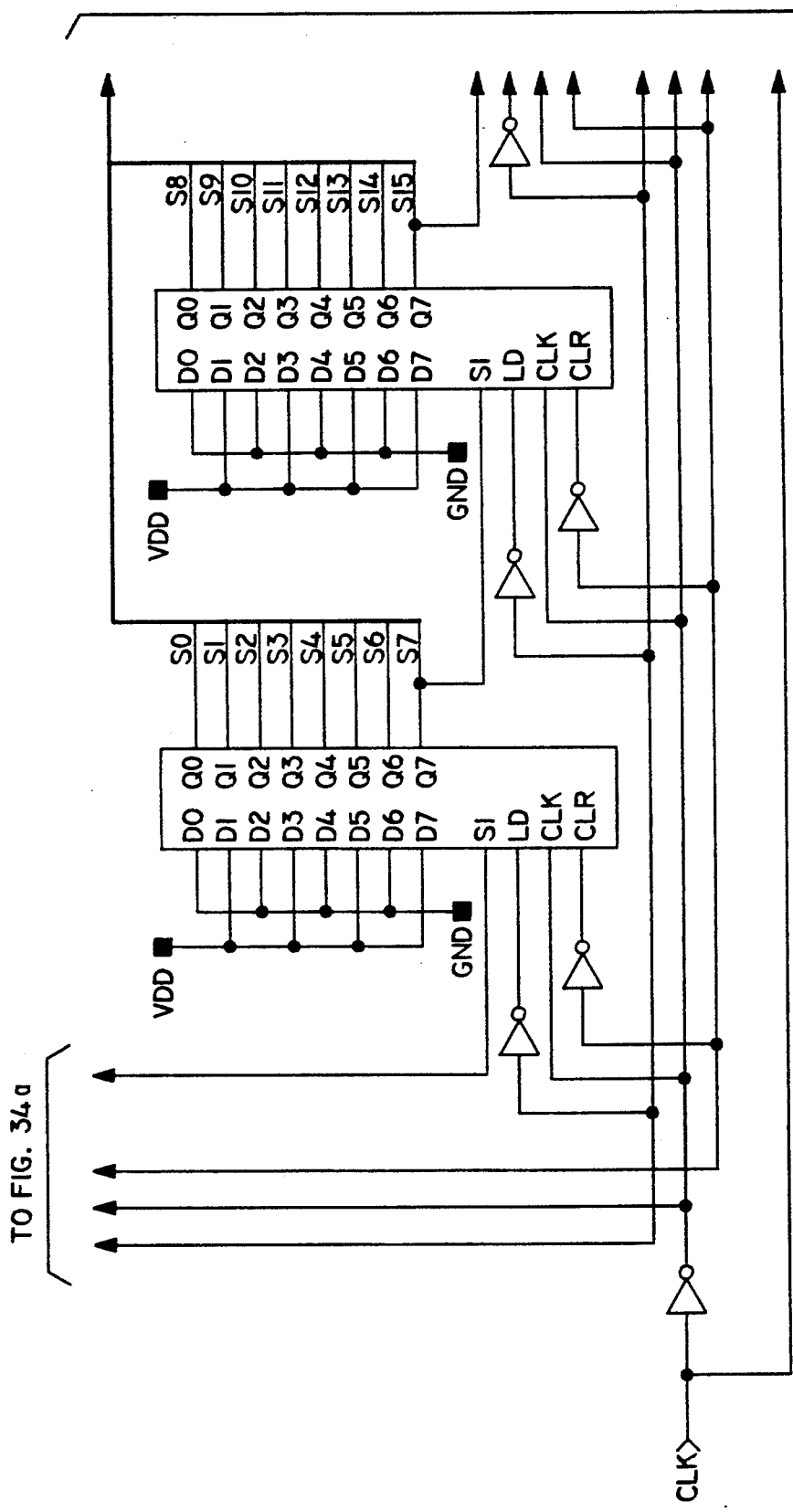
FIG. 34B of the drawings is a portion of a schematic circuit diagram of the receiver register of the command data - voice data interface.
Figure 34C:
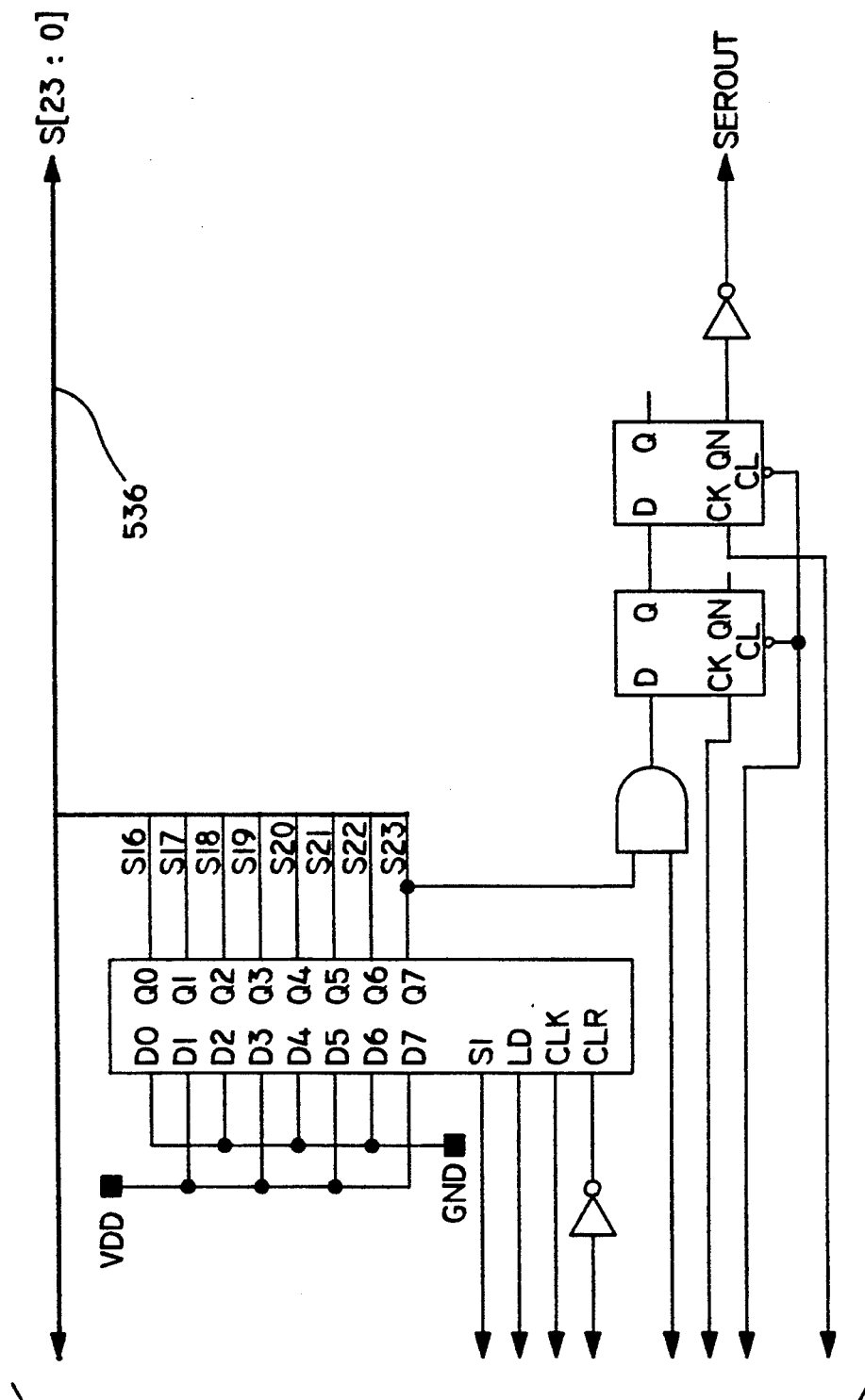
FIG. 34C of the drawings is a portion of a schematic circuit diagram of the receiver register of the command data - voice data interface.

When handset 101 is receiving digital data, the command data - voice data interface operates as follows. The demodulated digital data output of demodulator 175 is connected to clock data recovery stage 530 which recovers the clock signal and data signal from the incoming digital signal. Clock generator 531 and clock-data recovery stage 530 are illustrated in schematic diagrams in FIGS. 26 and 27 of the drawings, respectively. The recovered data signal is descrambled by descrambler 533 the output of which is descrambled digital voice data with intermittently placed forty eight bit command data packets. Circuit diagram of descrambler is illustrated in FIG. 31. The incoming digital data flows into receiver register 534 and specifically into the forty eight bit shift register contained therein. The circuit diagram of receiver register 534 is illustrated in FIG. 34 wherein it can be seen that the forty eight bit shift register is composed of six eight bit serial and parallel loading clear able shift registers At each clock cycle the first twenty four bits contained in the "last" three eight bit shift registers are compared to the security code. When a match is found by design the trailing twenty four bits represent the command data portion of the command data packet.

Figure 33A:
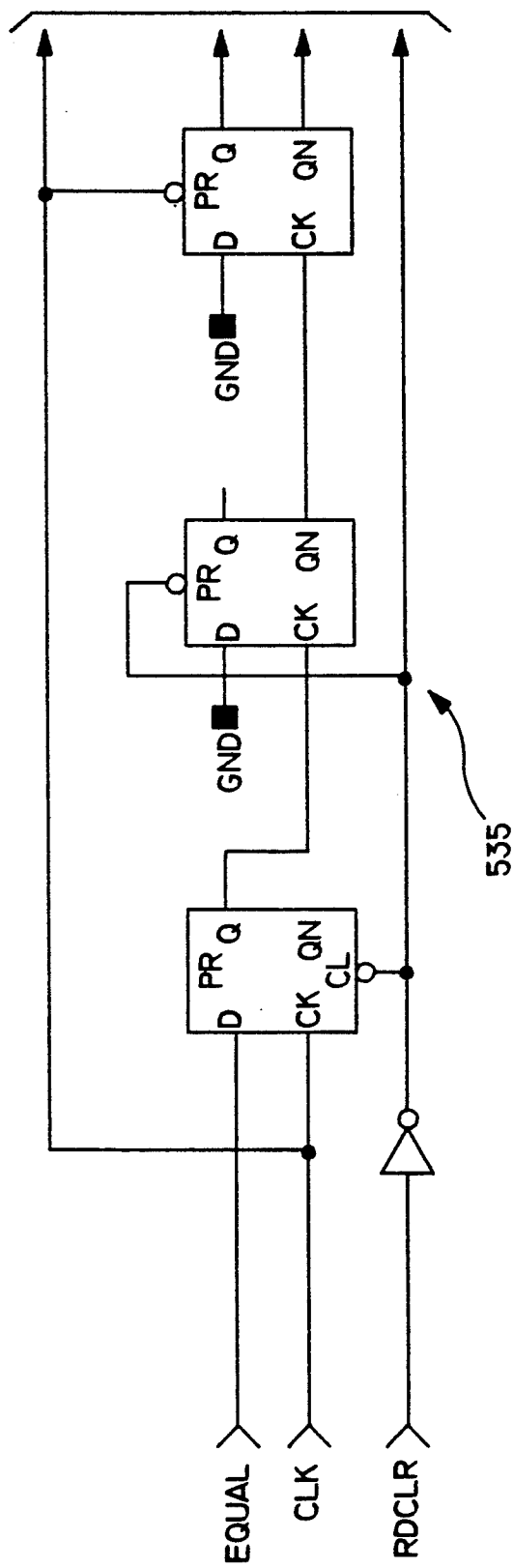
FIG. 33A of the drawings is a portion of a schematic circuit diagram of the receiver register controller of the command data - voice data interface.
Figure 33B:
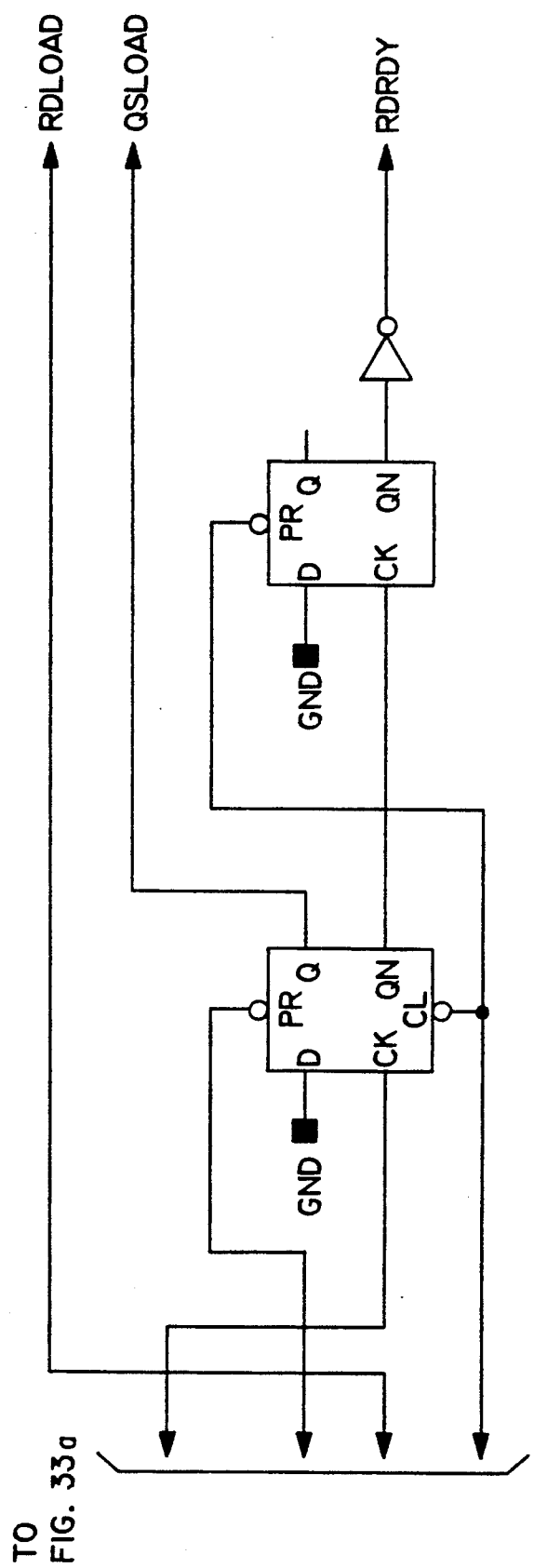
FIG. 33B of the drawings is a portion of a schematic circuit diagram of the receiver register controller of the command data - voice data interface.
Figure 35:
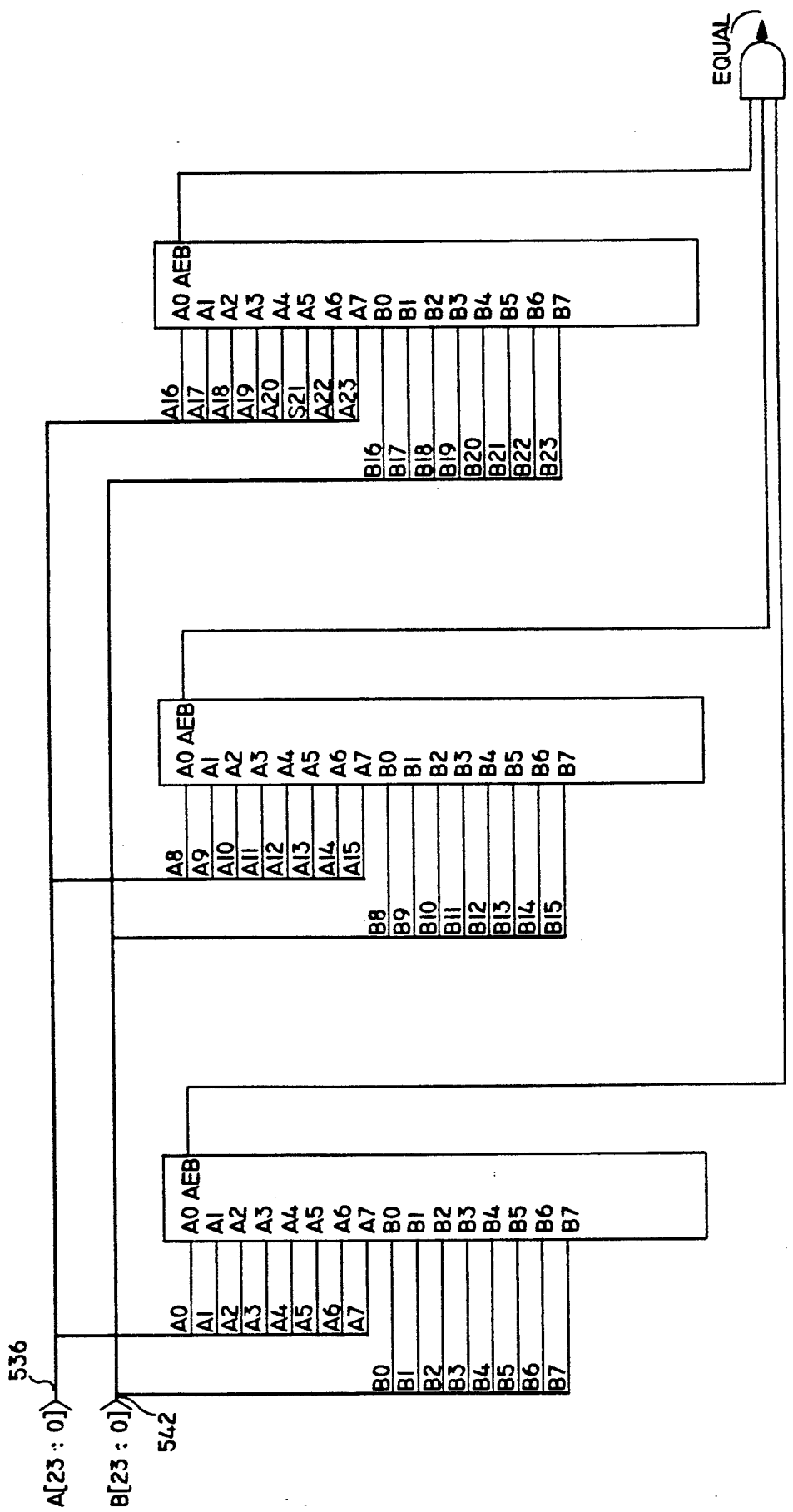
FIG. 35 of the drawings is a schematic circuit diagram of the security code comparator circuitry of the command data voice data interface.

The contents of the first twenty four bits of the forty eight bits contained in receiver register 534 are accessed by security code comparator 536 via bus 542. The security code stored in security code register 511 is likewise accessed by security code comparator 536 via bus 537. Security code comparator 536 compares the two twenty four bit words by exclusive OR'ing the two words. A circuit diagram of security code comparator 536 is shown in FIG. 35 of the drawings. The comparison is made for each clock cycle thus effectively scanning for a security code which would signal the presence and position of a command data packet. When security code comparator 536 finds a match the EQUAL line 538 goes high to signal receiver register controller 535. Receiver register controller 535 latches the twenty four bits residing in the "last" three eight bit shift registers of receiver register 534 into microprocessor interface 510, and specifically into twenty four bit shift register 540 via bus 539. The receive data ready line RDRDY 541 of receiver register controller 535 goes low to signal microprocessor 183 that data is there such that the microprocessor interface 510 may serially shift the command data out to microprocessor 183. A circuit diagram of receiver register controller 535 is shown in FIG. 33.

As the twenty four bits of command data are shifted out of receiver register 534 the six eight bit shift registers are each parallel loaded with a quiet sequence consisting of an eight bit word of alternating "1's" and "0's". The end result is that the forty eight bits of digital voice data which were "lost" are replaced with a forty eight bit pattern of alternating "1's and 0's" which are interpreted by the digital-to-analog converter as silence. The user thus "hears" a one millisecond dropout or moment of silence which is not actually perceived by the user. Through this mechanism there is no loss of command data and no perceivable loss of voice due to the high voice data rate.

FIGS. 36-47 are flow diagrams of various software routines contained within either the handset microprocessor, the base unit microprocessor, or both. The various flow diagrams are provided and are explained with such detail that one skilled in the relevant art having these software flow diagrams and descriptions would be able to implement the software routines with relative ease.

Figure 36:
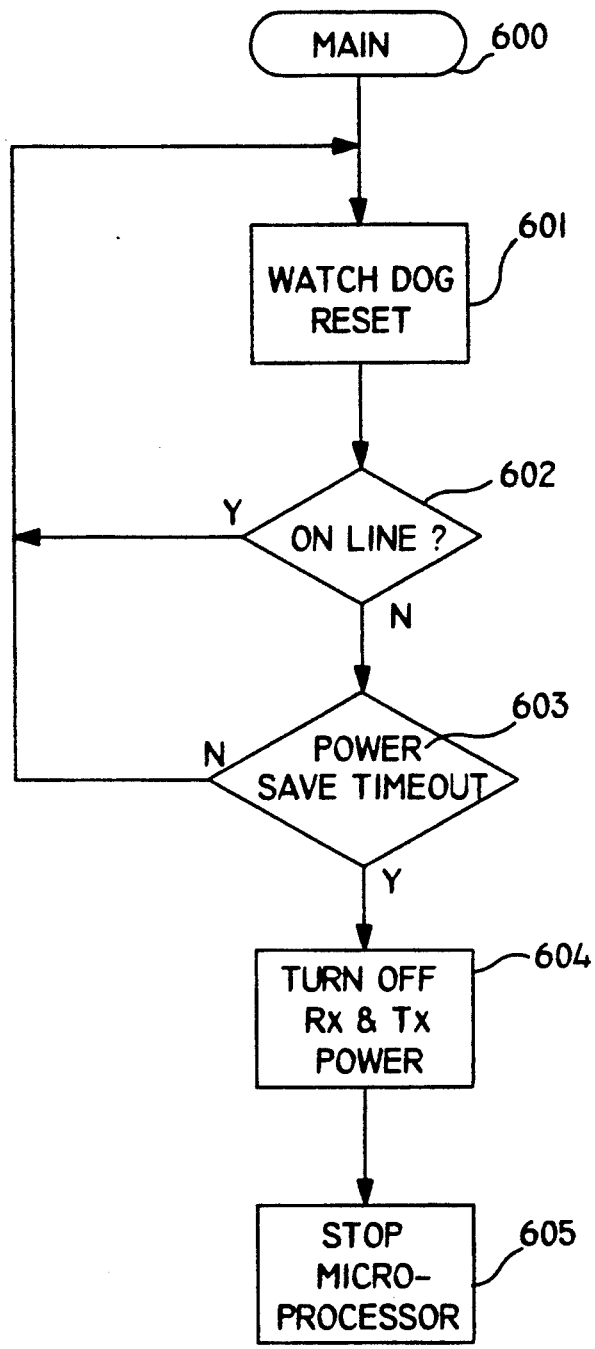
FIG. 36 of the drawings is a flow diagram of the software routine for the power saving mode of the handset of the invention.

FIG. 36 of the drawings is a flow diagram of the software routine for the power saving mode of the present invention. The power saving software routine begins at entry point 600 having branched from the main software program and initially resets the watch dog timer, operation 601. The routine then checks to see if a RF link is currently established, i.e. is the phone "on-line", operation 602. The main program will set a flag to true if an on-line condition exists. If an RF link exists and the phone is on-line the watch dog timer is reset. If no RF link is established and the handset unit is off-line the routine checks to see of the power saving timer has timed out, operation 603. If the timer has not timed out the watch dog timer is reset. If the power saving timer has timed out the routine turns off the power supply to the transmitter and the receiver of the handset unit and then the microprocessor is halted, operations 604 and 605, respectively.

Figure 37:
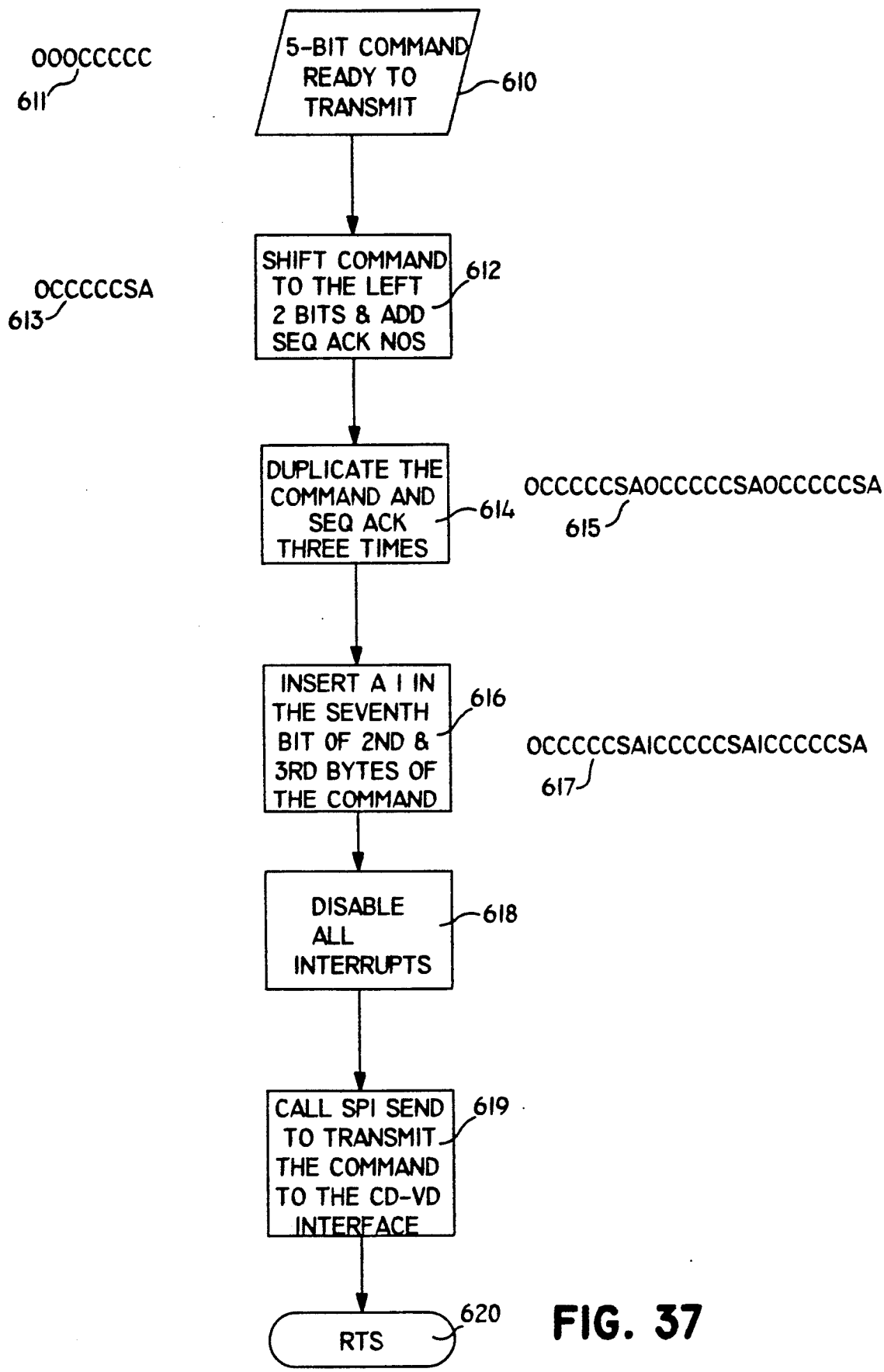
FIG. 37 of the drawings is a flow diagram of the software routine for writing command code data to the command data - voice data interface of the invention.

FIG. 37 of the drawings is a flow diagram of the software routine for writing command data to the command data - voice date interface. When the user has pressed the keypad actuating a function which necessitates that a command code be transmitted, the microprocessor generates a five bit command code which is provided to the software routine, operation 610. The routine then commences to assemble the command data portion of the command data packet which will be transmitted. The command word is converted into an eight bit sequence 611, "000CCCCC", with "C" equaling a bit of command code data. The eight bit code is then shifted to the left two bits and the sequence and acknowledgement bits are added, operation 612 as represented by the eight bit sequence, 613, "0CCCCCSA", where "S" is the sequence bit and "A" is the acknowledgment bit. The eight bit command word sequence is then duplicated three times, operation 614, to generate sequence 615. In base unit 110, the first bits of the second and third bytes are set to "1" in place of "0" in order to identify base unit 110 as the source of the transmission and sequence 617 is generated. In handset 101, the first bits of the second and third bytes are left as "0" to identify handset 101 as the source of that command data packet. The software then disables all of the microprocessor interrupts, 618, and then calls the serial peripheral interface (SPI) send routine to transmit the twenty four bit command code to the command data - voice data interface, operation 619. The routine then returns to the main program. As previously described the twenty four bit command data sequence is transferred from the microprocessor via the serial peripheral interface to the microprocessor interface of the command data voice data interface. Thereafter a command data packet is assembled within the command data - voice data interface by mating the security code to the twenty four bit command code sequence within the transmitter receiver toward insertion into the stream of digital voice data flowing through the command data - voice data interface for transmission.

Figure 38:
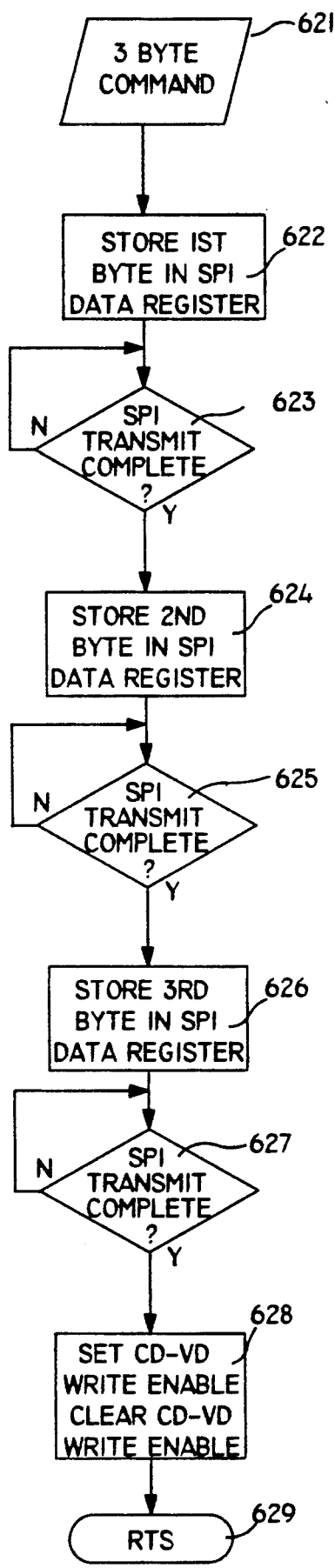
FIG. 38 of the drawings is a flow diagram of the software routine for sending data to the serial peripheral interface of the handset unit and base unit microprocessors of the invention.

FIG. 38 illustrates the flow diagram of the SPI Send routine. When the routine is called the three byte command sequence 617 of FIG. 37 is passed to the SPI Send routine, operation 621. The routine sends the first byte of the command through the serial peripheral interface one bit at a time, operation 622, continually checking to see if the transmission of the first byte is complete, operation 623. If not, the transmission of the first byte continues. If complete, the second byte is sent one bit at a time, operation 624, until transmission through the serial peripheral interface of the microprocessor is complete, operation 625. Processes 626 and 627 are repeated for the third byte. Once the complete third byte of the command code sequence has been sent the software routine activates and then deactivates the write enable line of the command data - voice data interface to initiate operation of the interface as previously described, operation 628 and the routine ends, 629.

Figure 39:
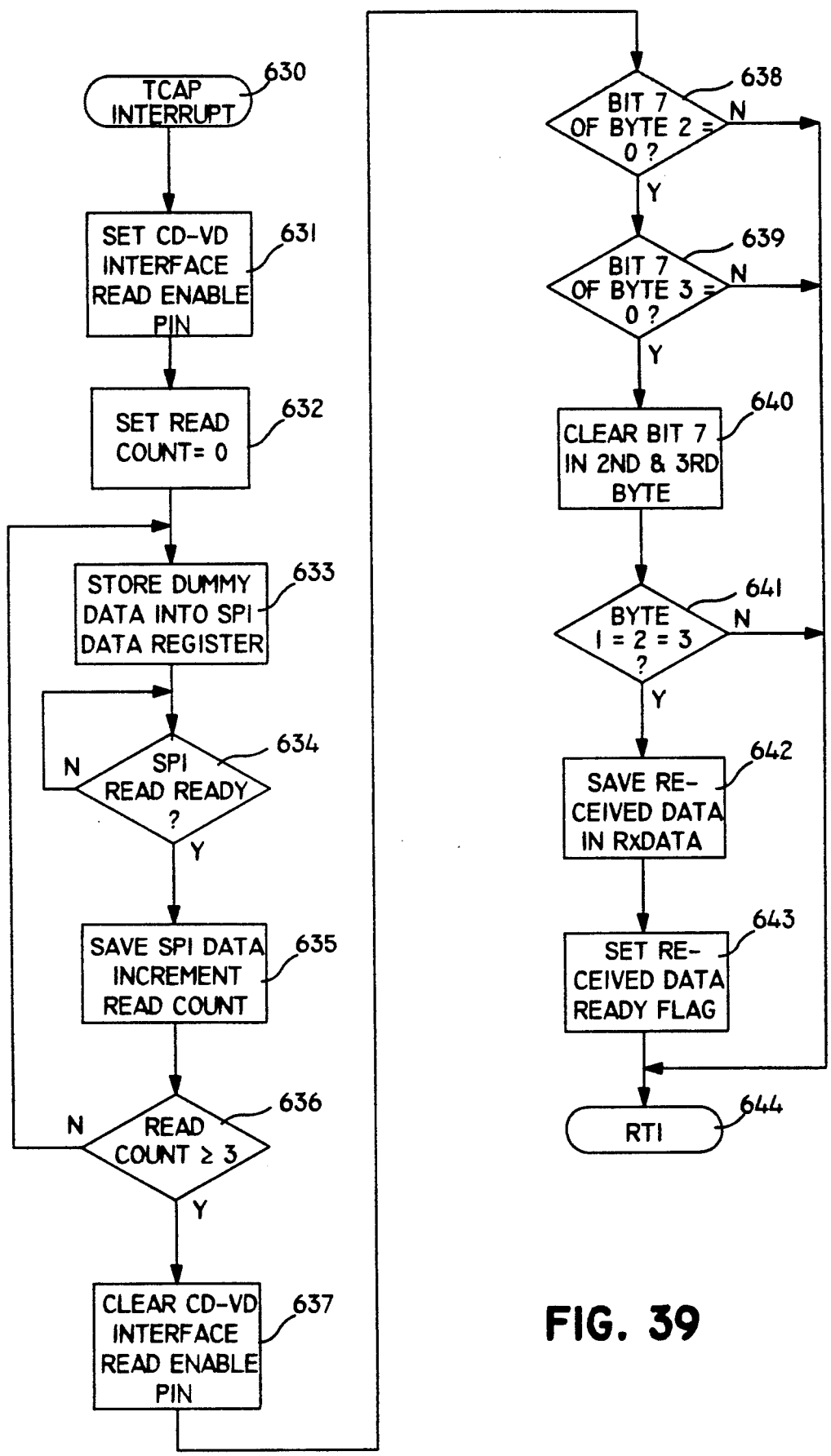
FIG. 39 of the drawings is a flow diagram of the software routine for reading command code data from the command data voice data interface of the invention.

FIG. 39 of the drawings is a flow diagram for reading data from the command data - voice data interface. When data is present in the interface and ready for transmission to the microprocessor the interface signal an interrupt, TCAP Interrupt 630. This activates the routine which sets the command data - voice data interface read enable pin to high, operation 631, and sets the read counter to 0, operation 632. Dummy data is stored into the SPI data register. If the SPI read is ready, 634, the data is saved to the SPI data register and the read counter is incremented, operation 635. If the read counter is less than three the process is repeated. Once the read counter is greater than or equal to 3 the command data - voice data interface read enable pin is cleared, set low, operation 637. Within base unit 110, the seventh bit of the second and third bytes are examined to see if they equal "0". If so an error has occurred since base 110 unit has received its own transmission. If the bits are equal to "1" they are cleared, operation 640, and the first byte is checked against the second and third to see that all three are the same, operation 641. If not, an error is assumed to have occurred in transmission and the routine is exited, 644. In handset 101 the bits are checked to they are equal to "0", if so the routine proceeds. If not, handset 101 has received its own transmission and the routine is exited. If the three bytes are the same the data is received into the receiver data register, operation 642, and the data ready flag is set, operation 643, to indicate to the microprocessor that data is ready to be processed. The routine is then exited 644.

Figure 40:
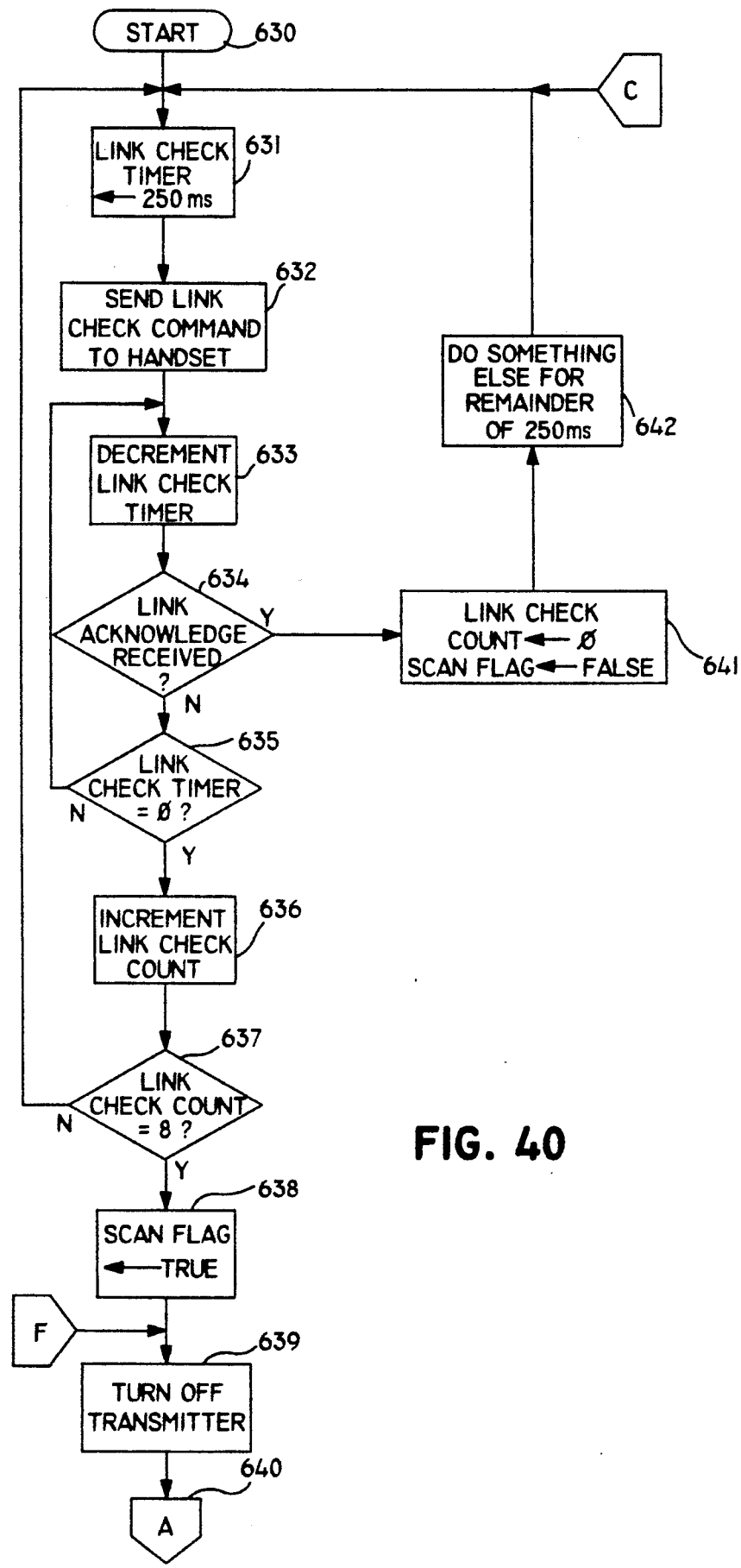
FIGS. 40, 41 and 42 of the drawings are diagrams of the software routine resident in the base unit for performing the link check function while a call is in progress.
Figure 41:
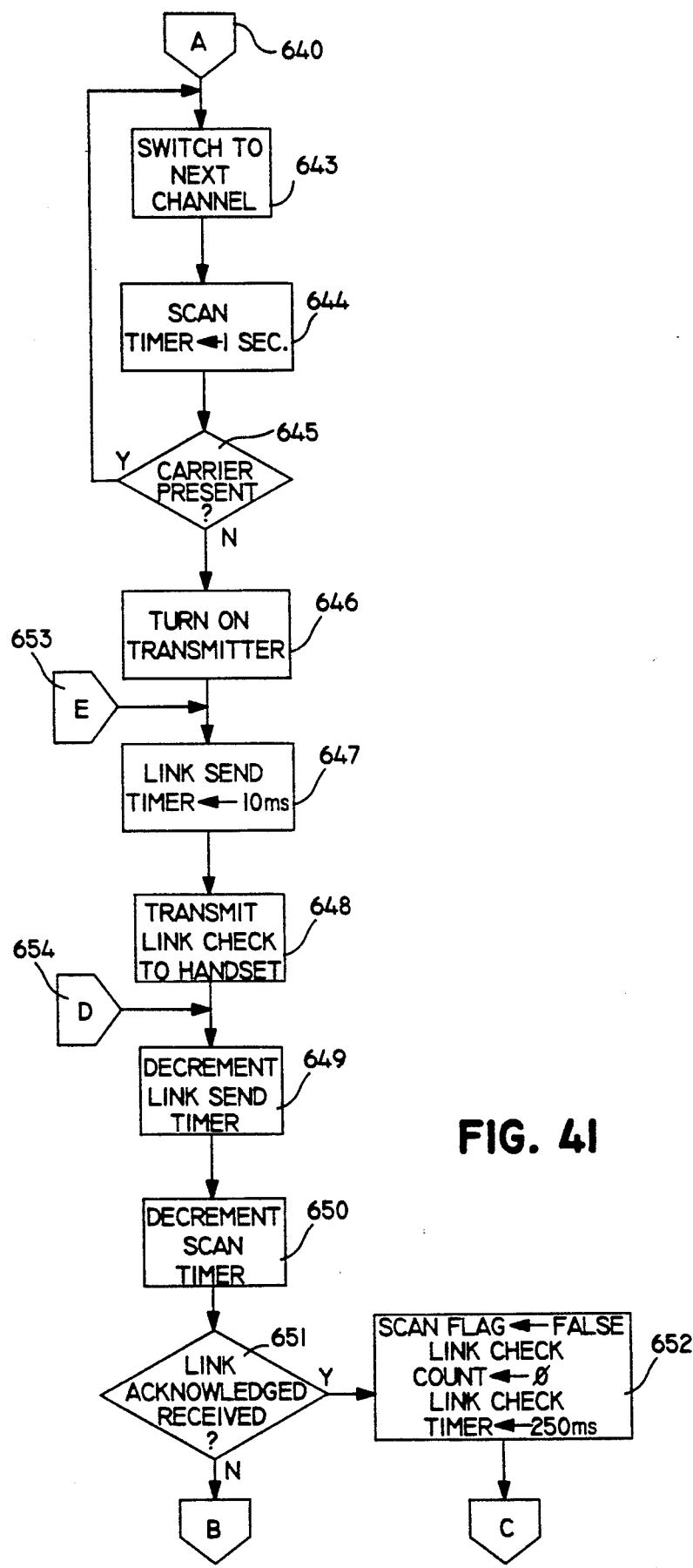
Figure 42:
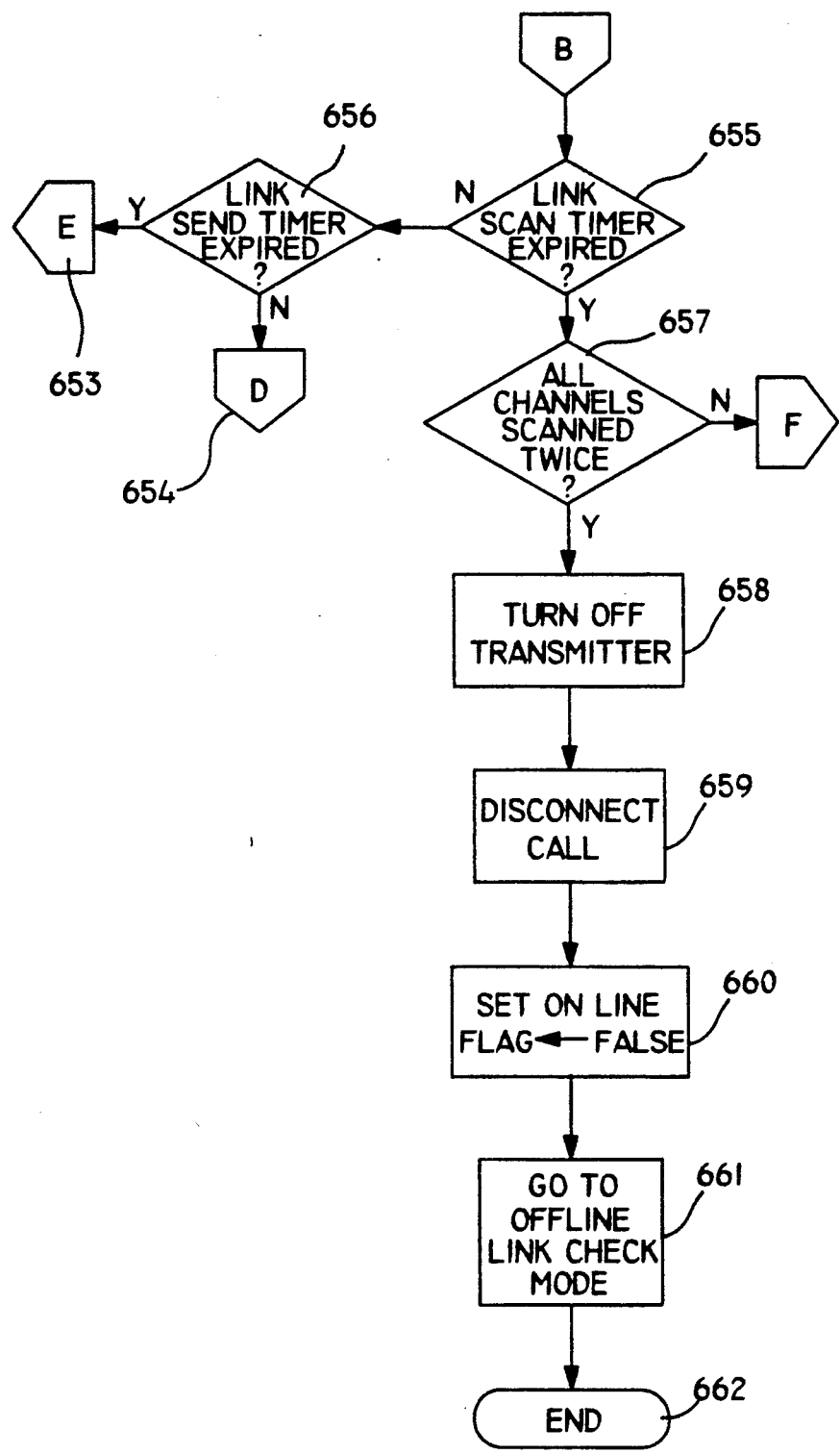

FIGS. 40, 41 and 42 of the drawings illustrate the flow diagram of the software routine resident in the base unit for performing the link check function while a call is in progress, i.e. the phone is "on-line". Upon entry at 630 the routine initializes the link check timer, operation 631. The link check timer measures the interval between link check transmissions to the handset unit. When link check timer times out a link check is sent, operation 632, to the handset and the link check timer is decremented, operation 633. The routine then looks to see if a link check acknowledgment has been received from the handset unit, operation 634. If not the link check timer is examined to see if it has timed out by reaching zero. If not, the routine continues to decrement the link check timer and looks to see if a link check acknowledgement has been received. If a link check acknowledgement has been received the link check count is set to zero and the scan flag is set to false, operation 641. The link check count counts the number of consecutive missed link check acknowledgements up to a maximum of eight (8). Thereafter the microprocessor is freed to perform some other function of the remainder of 250 ms left on the link check timer, operation 642. The scan flag is set to true if the microprocessor is in the scan mode and is looking for the handset unit. In the false mode no scanning is done.

If the link check timer has timed out to zero the link check count is incremented, operation 636, and the counter is checked to see if it is equal to eight, operation 637. If the count is not equal to eight the process of sending link checks and listening for link check acknowledgements is repeated by returning to operation 631. If the link check count is equal to eight then eight consecutive link check signals have been sent to the handset and none have been acknowledged. In this case the scan flag is set to true, operation 638, and scanning begins after the transmitter is turned off, operation 639. The process continues on FIG. 41.

Since eight link checks have gone unacknowledged the channel is assumed to be unusable and automatic channel chance takes place by entering the scanning mode. The scanning mode, shown on FIG. 41 starts with operation 643 which causes the microprocessor to switch to the next channel in the channel group loaded into the base unit and handset unit upon initialization. The scan timer is initialized and counts down from one second, operation 644. The scan timer governs the amount of time that the transmitter will stay on one channel waiting for a link check acknowledgement during the scan mode. The routine then looks to see if a carrier is present, operation 645, and if not the transmitter is turned on, operation 646. If a carrier is present then the channel is in use by another device and is unavailable and the routine switches to the next channel. Once the transmitter is turned on link send timer is initialized to 10 ms such that link check signals are transmitted, operation 648. The link send timer governs the time between consecutive link check commands in the scan mode.

The link send timer is decremented and the scan timer is decremented, operations 649 and 650. If a link check acknowledgement has been received the scan flag is set to false, the link check count and link check timer are reinitialized and the routine returns to transmitting link check signals once every 250 ms, operation 652. Continuing on FIG. 42, if no link check acknowledgement has been received the link scan timer is checked to see if it has expired, operation 655. If not, the link send timer is checked to see if it has expired, operation 656. If it has expired the routine branches on "E", 653, and commences to send link check signals beginning with operation 647. If the link check timer has not expired the routine branches to "D" 654 and repeats as before from operation 649.

If the link scan timer has expired, the routine checks to see if all of the channels in the channel group have been scanned twice, operation 657. If not, the routine branches on "F", to operation 641, and repeats as before until a link check acknowledgement is received or all channels are scanned twice, which ever occurs first. If the all channels have been scanned twice the transmitter is turned off, operation 658, and the call is disconnected, operation 659. The on-line flag is set to false indicating that no conversation is taking place and the off-line link check mode is entered, operations 660 and 661. The routine then ends, operation 662.

Figure 43:
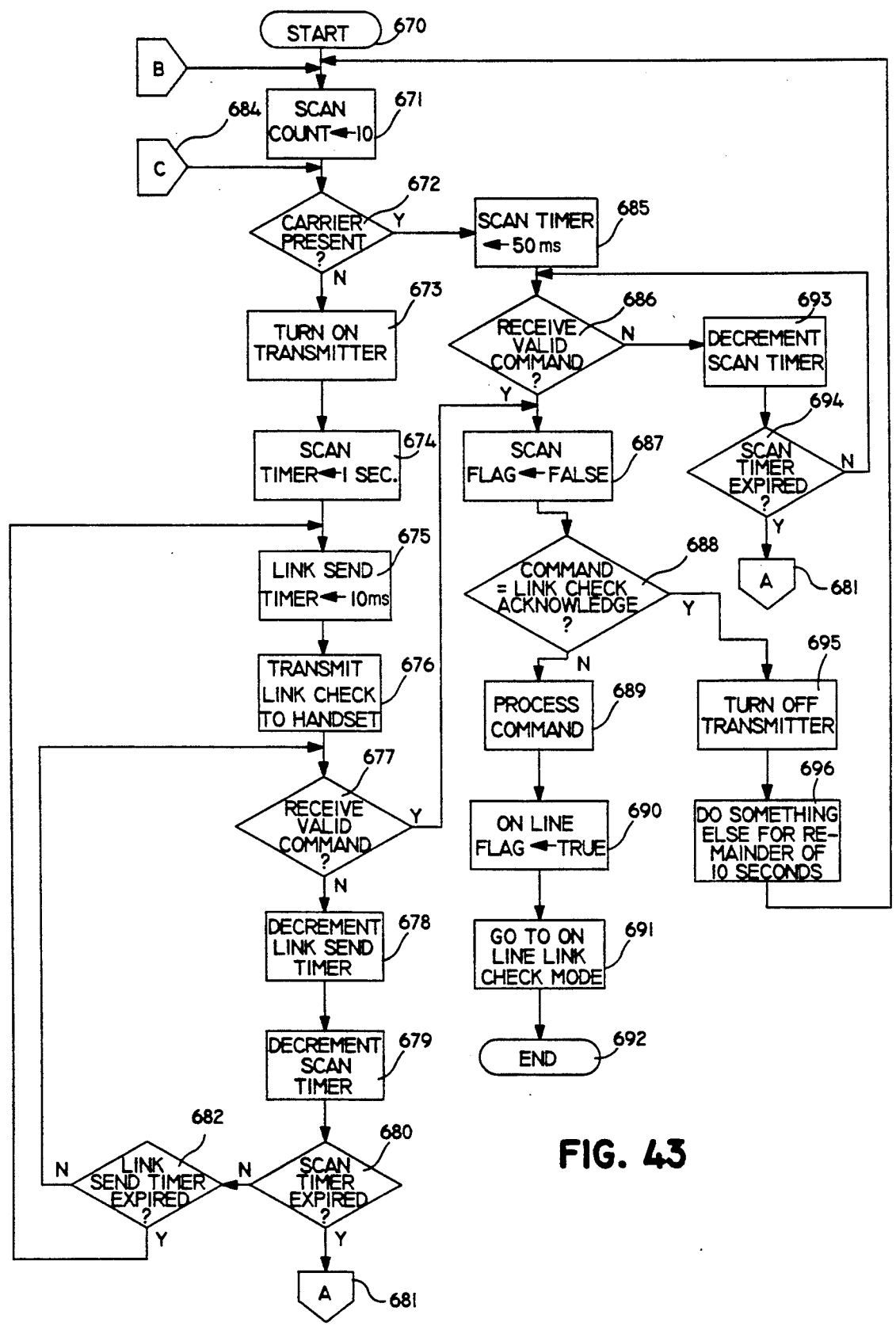
FIGS. 43 and 44 of the drawings are flow diagrams of the software routine resident in the base unit for performing the link check function when there is no call in progress.
Figure 44:
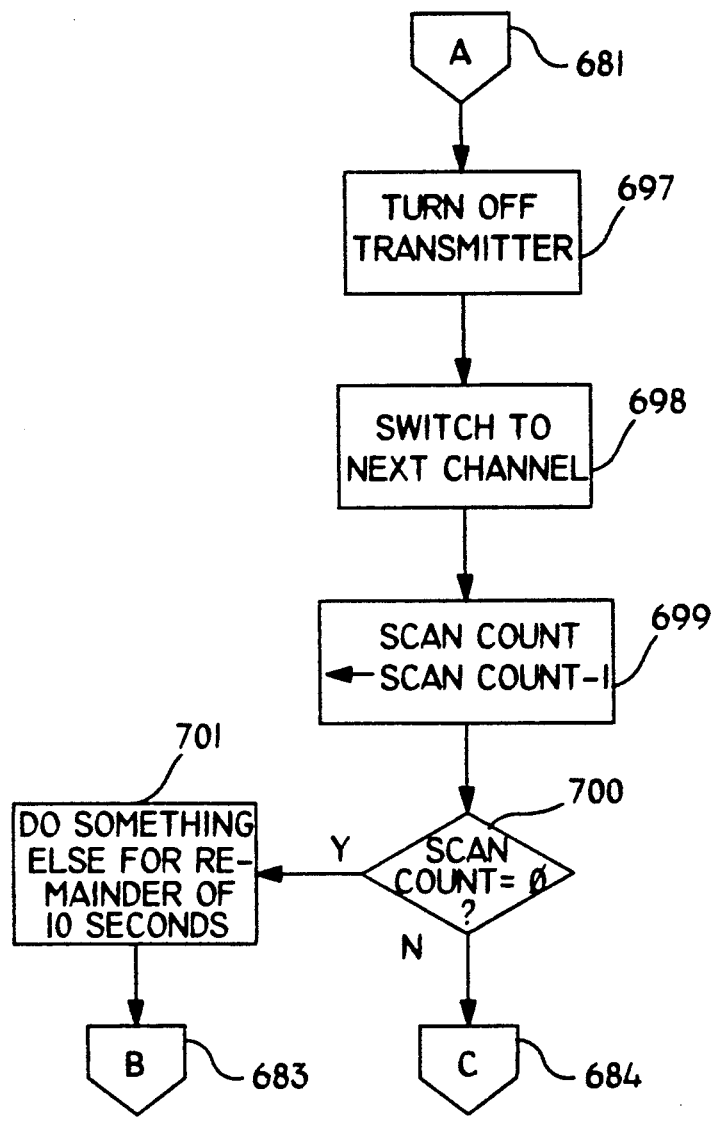

FIGS. 43 and 44 of the drawings illustrate the flow diagram of the software routine resident in the base unit for performing the link check function when there is no call in progress, i.e. when the phone is "off-line". Upon entry at 670 the routine initializes the scan count to 10, operation 671. The scan count is the maximum number of times channel switching will take place before giving up. The routine looks to see if a carrier is present, operation 672 and if not the transmitter is turned on, operation 673. The scan timer is set to 1 second, 674, the link send timer is sent to 10 ms and a link check signal is transmitted by operation 676.

If a carrier is present the scan timer is initialized to 50 ms and the routine looks to see if a valid command has been received, operations 685 and 686. If a valid command has been received the scan flag is set to false, operation 687, and the command is examined to see if it is a link check acknowledgement, operation 688. If so the transmitter is turned off, operation 695, and the microprocessor is freed to do other things for 10 seconds, and the process at operation 671 is begun again. If the command is not a link check acknowledgement the command is processed, operation 689, and the on link flag is set to true, operation 690, indicating that an on-line condition exists. The on-line link check mode is then begun, operation 691 and the routine ends, 692.

After operation 676 which sends a link check to the handset, the routine checks to see if a valid command was received, operation 677, and if so the routine branches to operation 687 and proceeds as indicated. If the command is not valid the link send timer is decremented, operation 678, and the scan timer is decremented, operation 679. The scan timer is examined to see if it has expired, operation 680, and if not the link send timer is examined, operation 682. If it has not expired the routine branches and operation 677 is begun again. If the link send timer has expired the link send timer is restarted and link checks are sent again, operations 675 and 676.

Continuing on FIG. 44, if the scan timer has expired the transmitter is turned off, operation 697, and the next channel in the channel group is selected, operation 698. The scan count is decremented, operation 699, and examined, operation 700. If the scan count is "0" the microprocessor is freed up to do other operations for 10 seconds, operation 701, and the routine begins again at the start, 670. If the scan count is not equal to "0" the routine begins again at operation 672.

Figure 45:
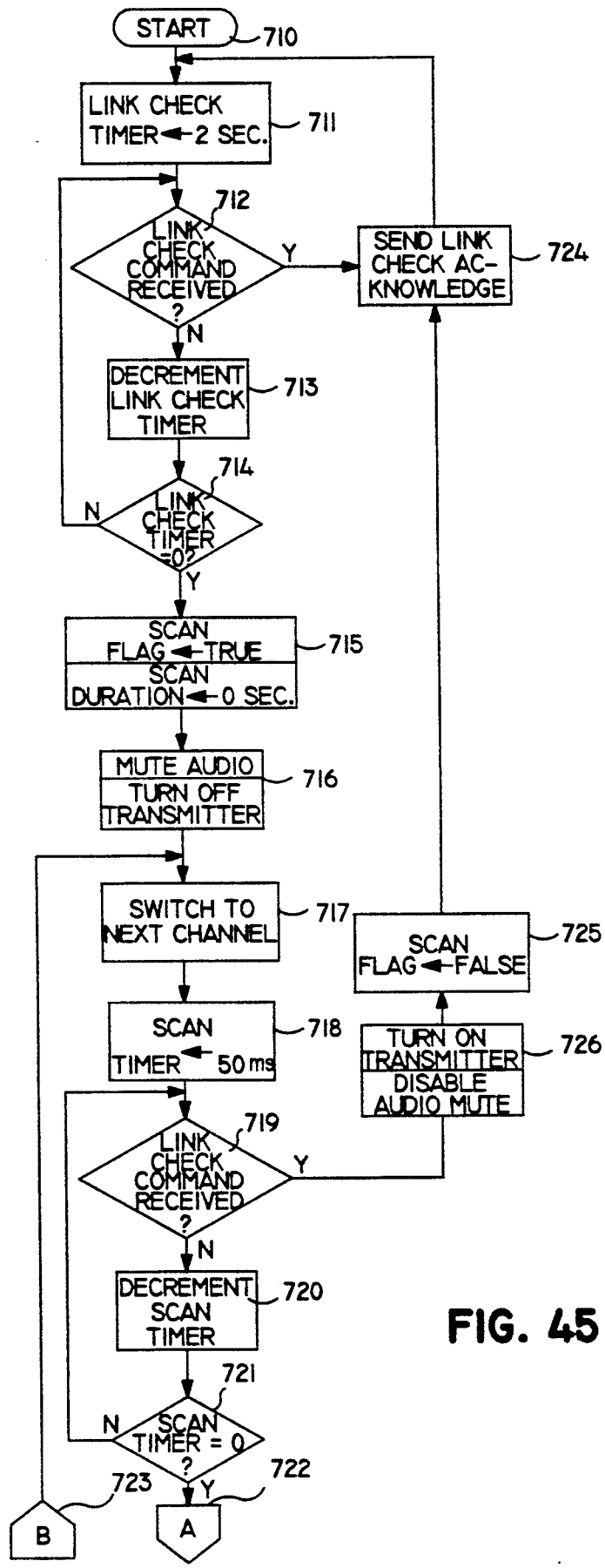
FIGS. 45 and 46 of the drawings are flow diagrams of the software routine resident in the handset unit for performing the link check function while a call is in progress.
Figure 46:
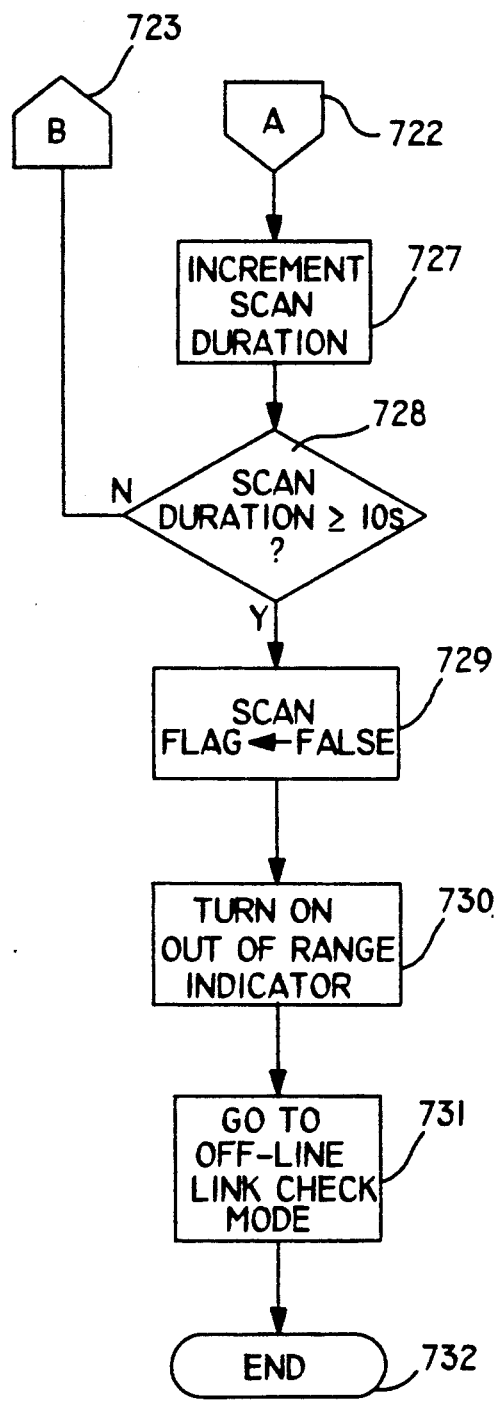

FIGS. 45 and 46 of the drawings illustrate the flow diagram of the software routine resident in the handset unit for performing the link check function while a call is in progress, "on-line". The handset unit performs link checks in the on-line and off-line modes. In the on-line mode the link check routine starts at point 710 and initializes the link check timer to 2 seconds, operation 711. The routine then examines to see if a link check command has been received by the handset unit, operation 712, and if so a link check acknowledge is sent to the base unit, operation 724. If no link check command was received the link check timer is decremented, operation 713. If the link check timer has not reached zero the routine continues to check if a link check command has been received, operation 714.

If the link check timer reaches zero, the scan flag is set to true signifying that a "on-line" mode exists and the scan duration is initialized, operation 715. Operation 716 then mutes the audio and turns off the transmitter after which the channel is changed, operation 717. The scan timer is set to 50 ms and the routine again looks to see if a link check command has been received, operations 718 and 719. If so, the audio mute is disabled and the transmitter is turned on, operation 726. The scan flag is then set to false and a link check acknowledgment is sent to the base unit, operations 725 and 724. If no link check command has been received the scan timer is decremented, operation 720. If the scan timer then still does not equal zero the unit continues to "listen" for an incoming link check command, operation 721.

Continuing on FIG. 46, once the scan timer reaches zero the scan duration is incremented, operation 727. If the scan duration is not greater than or equal to 10 seconds the routine causes the channel to change, operation 717 and the routine begins again from that point. If the scan duration is greater than or equal to 10 ms the scan flag is sent to false, operation 729, the out of range indicator is turned on, operation 730 and the off-line link check mode is entered, operation 731. The routine then ends, operation 732.

Figure 47:
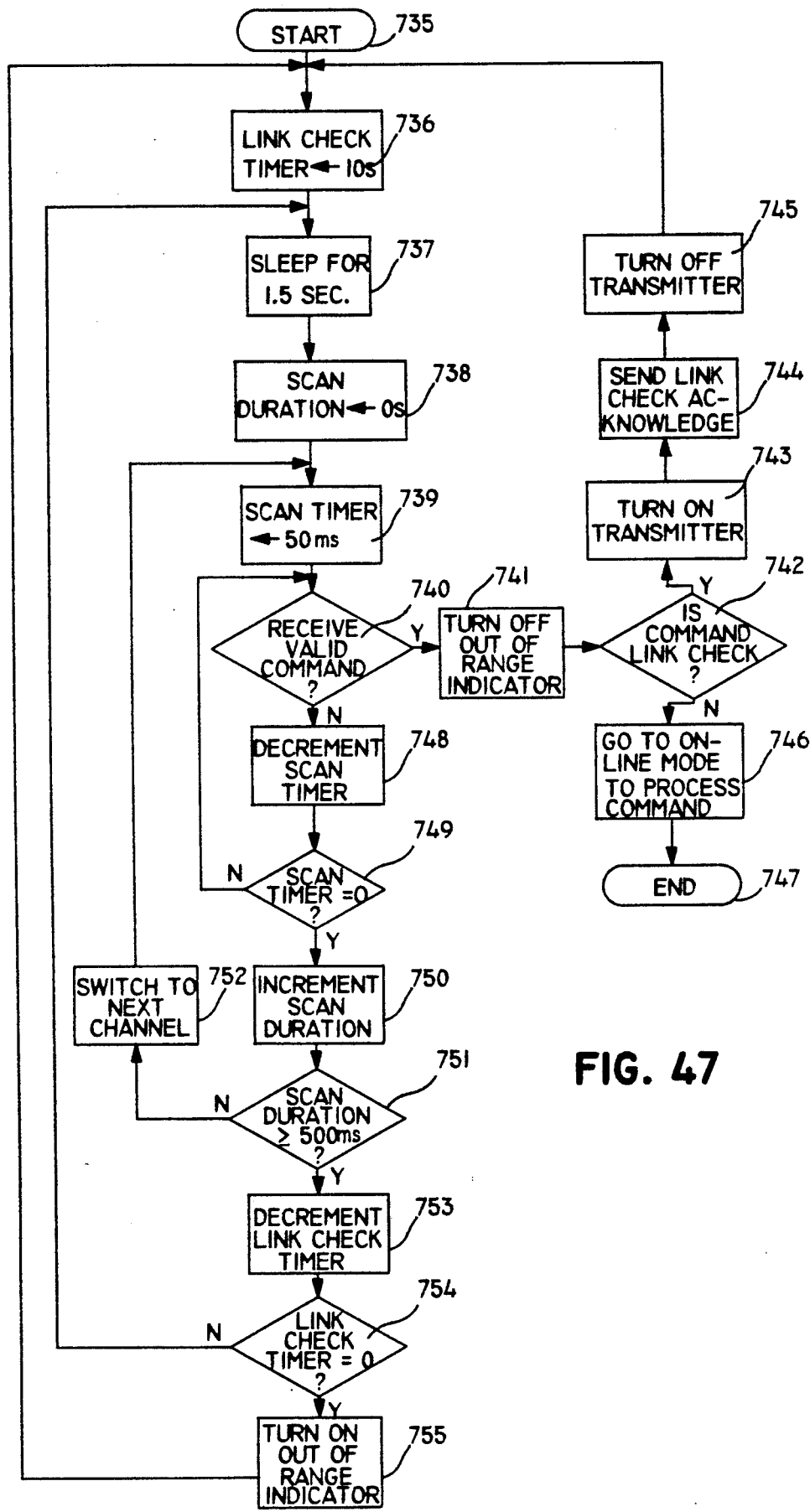
FIG. 47 of the drawings is a flow diagram of the software routine resident in the handset unit for performing the ink check function when there is not call in progress.

FIG. 47 of the drawings illustrates the flow diagram of the software routine resident in the handset unit for performing the link check function when there is not a call in progress. The routine received link check command and transmits link check acknowledgements in the off-line mode. The link check timer is first initialized to 10 ms, operation 736. The link check timer is the maximum interval allowed between receiving link check commands from the base unit. The routine then sleeps for 1.5 seconds, operation 737, after which the scan duration is initialized to zero, operation 738. The scan duration is the total time spend in the scanning mode and equals the number of channels scanned times the time spend on each channel.

The scan timer is then initialized to 50 ms, operation 739. The scan timer corresponds to the maximum time interval allowed on one channel during scanning while waiting for a command from the base unit. The routine checks to see if a valid command has been received, operation 740. If so, the out of range indicator is turned off, operation 741. If the received command is a link check the transmitter is turned on and a link check acknowledgement is sent to the base unit, operations 743 and 744 . The transmitter is then turned off, operation 745. The off-line link check mode then begins again. If the received command received is not a link check command the on-line mode is entered in order that the command may be processed by the handset microprocessor, operation 746, and the routine ends, 747.

If at operation 740 no valid command is received the scan timer is decremented and then is examined to see if it has reached zero, operations 748 and 749. If not, the handset continues to listen for a valid command by starting again with operation 740. If the scan timer has reached zero the scan duration is incremented and if it is not greater than or equal to 500 ms the next channel will be selected and the scan timer reset by restarting at operation 739, operations 750, 751 and 752. If the scan duration timer has been exceeded the link check timer is decremented, operation 753, and is examined to see if it is equal to zero, operation 754. If not operation 737 is re-executed. If the link check timer is zero, the out of range indicator is turned on, operation 755.

What is claimed is:

1. An improved digital cordless telephone apparatus of the type having a microprocessor based battery powered portable handset unit and a microprocessor based stationary base unit which each transmit and receive distinct digital voice data and digital command data to and from one another over a radio frequency link, wherein the improvement includes a command data - voice data interface means or inserting said digital command data, int the form of a command data packet, into a stream of said digital voice data transmitted between said handset unit and said base unit and for locating and capturing said command data packet from a received digital voice data signal stream, and comprising:

security code register means associated with said portable handset unit for storing said security code generated by said base unit microprocessor;

firs microprocessor interface means associated with said portable handset unit for receiving from said base unit microprocessor said security code toward transferring said security code to said security code register means and for receiving a digital command code from said handset unit microprocessor for transmission to said base unit;

transmitter register means associated with said portable handset unit for receiving as an input said digital voice data to be transmitted to said base unit;

transmitter register controller means associated with said portable handset unit for controlling the transfer of said digital voice data to said transmitter register means, said transmitter register controller means further serving to transfer said security code from said security code register means to said transmitter register means, and to transfer said digital command code from said first microprocessor interface means to said transmitter register means, said security code and said digital command code together forming said command data packet, said transmitter register controller means further causing the flow of said digital voice data through said transmitter register means to be interrupted and said command data packet to be inserted into said stream of said digital voice data for transmission to said base unit;

receiver register means associated with said base unit for receiving as an input said stream of said digital voice data intermixed with said command data packets;

receiver register controller means associated with said base unit for controlling the transfer of said stream of digital voice data intermixed with said command data packets into said receiver register means, said receiver register controller means further serving to transfer said stream of digital voice data intermixed with said command data packets to a security code comparator means;

said security code comparator means serving to locate and identify said command data packets intermixed within said stream of digital voice data toward causing said receiver register means to transfer said command data packets to a second microprocessor interface means associated with said base unit toward connection to said base unit microprocessor, said receiver register controller means further serving to replace said command data packet with a quiet sequence data packet, said digital voice data nd said quiet sequence data packet being transferred to the output of said receiver register controller means for further operation by said base unit.

2. In a digital cordless telephone apparatus of the type having a microprocessor based battery powered portable handset unit and a microprocessor based stationary base unit which each transmit and receive distinct digital voice data and digital command data to and from one another over a radio frequency link, each of said handset and base units including a command data - voice data interface means which includes a security code register means, microprocessor interface means, transmitter register means, transmitter register controller means, receiver register means and receiver register controller means, a method for transmitting said digital command data intermixed with said digital voice data, and for receiving said intermixed digital data nd recovering said digital command data, said method comprising the steps of:

transferring said digital voice data to a command data interface means connected between a voice signal digitizer and voice signal transmitter and between a voice signal receiver and a voice signal decoder within each of said handset unit and said base unit, transmitting said intermixed digital data by transferring a security code stored in said security code register to said transmitter register means;

transferring said digital command data from said microprocessor interface means to said transmitter register means, thereby forming a command data packet composed of said security code and said digital command data;

inserting said command data packet into a steam of said digital voice data generated by said voice signal digitizer prior to transmission by said voice signal transmitter;

receiving said intermixed digital data nd recovering said digital command data by transferring said intermixed digital data received by said voice signal receiver means to said receiver register means;

transferring said intermixed digital data from said receiver register means to said comparator means;

scanning said intermixed digital data transferred to said comparator means toward identifying a match between said security code stored in said security code register means and said intermixed digital data thereby locating said command data packets within said stream of said digital voice data, transferring located command data packets to said microprocessor interface means toward execution of said digital command data, resetting located command data packet in said receiver register means with a quiet sequence data packet, transferring said digital voice data intermixed with said quiet sequence data packet to said voice signal decoder mean which in turn treats said quiet sequence data packet intermixed with said digital voice data as silence thereby precluding the generation by said voice signal decoder means of an undesirable audible sound which should otherwise be generated by said voice signal decoder means if said command data packet were decoded by said voice signal decoder means.

3. The invention according to claim 2 wherein said method further includes the steps of:

scrambling said intermixed digital data comprising said stream of said digital voice data signals and said inserted command data packet prior to transmission by said voice signal transmitter to thereby minimize the potential that unintended persons listening to the transmission frequency of said radio frequency link may monitor said conversation; and unscrambling said intermixed digital data comprising said stream of said digital voice data signals and said inserted command data packet upon receipt by said voice signal receiver.

4. In a digital cordless telephone apparatus of the type having a microprocessor based battery powered portable handset unit and a microprocessor based stationary base unit which each transmit and receive distinct digital voice data and digital command data to and from one another over a radio frequency link, a method for transmitting said digital command data intermixed with said digital voice data, and for receiving said intermixed digital data and recovering said digital command data, said method comprising the steps of:

transferring said digital voice data to a command data-voice data interface mans connected between a voice signal digitizer an voice signal transmitter and between a voice signal receiver and voice signal decoder within each of said handset unit and said base unit;

transmitting said intermixed digital data by inserting said digital command data in the form of a command data packet into a stream of said digital voice data generated by said voice signal digitizer prior to transmission by said voice signal transmitter;

receiving and recovering said digital command data by locating said command data packets within said stream of said digital voice data received by said voice signal receiver, transferring located digital command data packets to said microprocessor for execution of said digital command data, replacing located command data packets with a quietly sequence data packet, transferring said digital voice data intermixed with said quiet sequence data packet to said voice signal decoder which treats said quiet sequence data packet as silence thereby precluding the generation by said voice signal decoder of a sound which would otherwise be generated by said voice signal decoder if said command data packet were decoded.

5. An improved digital cordless telephone apparatus of the type having a microprocessor based battery powered portable handset unit and a microprocessor based stationary base unit which each transmit and receive distinct digital voice data and digital command data to and from one another over a radio frequency link, wherein the improvement includes a command data - voice data interface means for inserting said digital command data is not a stream of said digital voice data transmitted between said handset unit and said base unit and for locating sand capturing said command data packet from a received said stream of said digital voice data signal stream and comprising:

microprocessor interface means for receiving a digital command data code from said handset unit microprocessor for transmission to said base unit;

transmitter register means for receiving as an input said digital voice data of be transmitted to said base unit;

transmitter register controller means for controlling the transfer of said digital voice data to said transmitter register means, said transmitter register controller means further serving to transfer said digital command data code from said microprocessor interface means to said transmitter register means, said transmitter register controller means further causing the flow of said digital voice data through said transmitter register means to be interrupted and said digital command data code to be inserted into said stream of said digital voice data for transmission to said base unit;

receiver register means for receiving as an input said digital voice data intermixed with said digital command data code;

receiver register controller means or controlling the transfer of said intermixed digital data into said receiver register means, said receiver register controlled further serving to transfer said intermixed digital data signal to a comparator means, said comparator means serving to locate and identify said command data code within said intermixed digital data toward causing said receiver register means to transfer said digital command data code to said microprocessor interface means toward connection to said base unit microprocessor, said receiver register controller means further serving to replace said digital command data code with a quiet sequence data packet, said digital voice data nd said quiet sequence data packet being transferred to the output of said receiver register controller means for further operation by said base unit.

6. An improved digital cordless telephone apparatus of the type having a microprocessor based battery powered portable handset unit and a microprocessor based stationary base unit which each transmit and receive distinct digital voice data nd digital command data to and from one another over a radio frequency link, wherein the improvement includes a command data - voice data interface means for inserting said digital command data, in the form of a command data packet, into a stream of said digital voice data transmitted between said handset unit and said base unit and for locating and capturing said command data packet from a received digital voice data signal stream, and comprising:

- security code register means associated with said base unit for storing said security code generated by said base unit microprocessor;
- first microprocessor interface means associated with said base unit for receiving from said base unit microprocessor said security code toward transferring said security code to said security code register means, and for receiving a digital command code from said handset unit microprocessor for transmission to said base unit;
- transmitter register means associated with said base unit for receiving as an input said digital voice data to be transmitted to said portable handset unit;
- transmitter register controller means associated with said base unit for controlling the transfer of said digital voice data to said transmitter register means, said transmitter register controller means further serving to transfer said security code from said security code register means to said transmitter register means, and to transfer said digital command code from said first microprocessor interface means to said transmitter register means, said security code and said digital command code together forming said command data packet, said transmitter register controller means further causing the flow of said digital voice data through said transmitter register means to be interrupted and said command data packet to be inserted into said stream of id digital voice data for transmission to said base unit;
- receiver register means associated with said portable handset unit for receiving as an input said stream of said digital voice data mixed with said command data packets;
- receiver register controller means associated with said portable handset unit for controlling the transfer of said stream of digital voice data intermixed with said command data packets into said receiver register means, said receiver register controller means further serving to transfer said stream of digital voice data intermixed with said command data packets to a security code comparator means;
- said security code comparator means serving to locate and identify said command data packets intermixed within said stream of digital voice data toward causing said receiver register means to transfer said command data packets to a second microprocessor interface means associated with said portable handset unit toward connection to said portable handset unit microprocessor; and
- said receiver register controller means further serving to replace said command data packet with a quiet sequence data packet, said digital voice data and said quiet sequence data packet being transferred to the output of said receiver register controller means for further operation by said base unit.

* * * * *